(12) United States Patent
Tulsyan et al.

(10) Patent No.: US 12,119,465 B2
(45) Date of Patent: Oct. 15, 2024

(54) HEAT EXCHANGER ASSEMBLIES AND COOLING SYSTEMS FOR EVTOL AIRCRAFT

(71) Applicant: Archer Aviation, Inc., San Jose, CA (US)

(72) Inventors: Bharat Tulsyan, San Jose, CA (US); Weiyu Cao, Sunnyvale, CA (US); Pablo Ramaswamy, Newark, CA (US); Ryan Cherniak, Sunnyvale, CA (US); Alex Clarabut, Santa Clara, CA (US)

(73) Assignee: Archer Aviation Inc., San Jose, CA (US)

( * ) Notice: Subject to any disclaimer, the term of this patent is extended or adjusted under 35 U.S.C. 154(b) by 0 days.

(21) Appl. No.: 18/460,463

(22) Filed: Sep. 1, 2023

(65) Prior Publication Data

US 2024/0162520 A1    May 16, 2024

Related U.S. Application Data

(60) Provisional application No. 63/383,660, filed on Nov. 14, 2022.

(51) Int. Cl.
*H01M 10/613* (2014.01)
*B60L 50/60* (2019.01)
(Continued)

(52) U.S. Cl.
CPC ........... *H01M 10/613* (2015.04); *B60L 50/60* (2019.02); *B60L 58/26* (2019.02); *B64D 33/08* (2013.01);
(Continued)

(58) Field of Classification Search
CPC ............. H01M 10/613; H01M 10/625; H01M 10/6554; H01M 10/6556; H01M 10/6568;
(Continued)

(56) References Cited

U.S. PATENT DOCUMENTS

| 11,433,775 B1 | 9/2022 | Hinman et al. |
| 11,603,210 B2 | 3/2023 | Tal et al. |

(Continued)

FOREIGN PATENT DOCUMENTS

| DE | 102012209302 A1 | 12/2013 | |
| DE | 102018112519 A1 * | 11/2019 | ............. B21D 53/06 |

(Continued)

OTHER PUBLICATIONS

PCT communication of the Annex to the invitation to pay additional fees, corresponding with a PCT Application No. PCT/US2023/079599, mailed on Feb. 21, 2024. (17 pages).
(Continued)

*Primary Examiner* — James M Erwin
*Assistant Examiner* — John S Medley
(74) *Attorney, Agent, or Firm* — Finnegan, Henderson, Farabow, Garrett & Dunner, LLP

(57) ABSTRACT

A cooling system includes a plurality of heat exchanger assemblies corresponding to a plurality of battery packs and a fluid conveyance assembly. Each heat exchanger assembly includes a first heat exchanger inlet-outlet and a second heat exchanger inlet-outlet configured to receive a heat transfer fluid or discharge the heat transfer fluid. The fluid conveyance assembly is coupled to the heat exchanger assemblies and configured to circulate the heat transfer fluid in parallel to the heat exchanger assemblies in a U-flow scheme with an inlet and an outlet of the heat transfer fluid arranged at the same location. The fluid conveyance assembly includes a plurality of flow restrictors configured to balance the heat transfer fluid flowing into the heat exchanger assemblies. The heat transfer fluid flows through the corresponding flow restrictor before flowing into the corresponding heat exchanger assembly of the battery pack.

54 Claims, 38 Drawing Sheets

(51) Int. Cl.
  *B60L 58/26* (2019.01)
  *B64D 33/08* (2006.01)
  *H01M 10/625* (2014.01)
  *H01M 10/6554* (2014.01)
  *H01M 10/6556* (2014.01)
  *H01M 10/6568* (2014.01)
  *H01M 50/204* (2021.01)
  *H01M 50/249* (2021.01)

(52) U.S. Cl.
  CPC ..... *H01M 10/625* (2015.04); *H01M 10/6554* (2015.04); *H01M 10/6556* (2015.04); *H01M 10/6568* (2015.04); *H01M 50/204* (2021.01); *H01M 50/249* (2021.01); *B60L 2200/10* (2013.01); *H01M 2220/20* (2013.01)

(58) Field of Classification Search
  CPC ... H01M 50/249; H01M 50/204; B60L 50/60; B60L 58/26; B64D 33/08
  USPC ......................................... 429/435
  See application file for complete search history.

(56) References Cited

U.S. PATENT DOCUMENTS

| | | | |
|---|---|---|---|
| 2006/0202661 A1 | 9/2006 | Kim et al. | |
| 2012/0107663 A1* | 5/2012 | Burgers ............ | H01M 10/6556 429/120 |
| 2012/0237805 A1* | 9/2012 | Abels ................ | H01M 10/6567 228/136 |
| 2013/0029193 A1 | 1/2013 | Dyer et al. | |
| 2016/0204486 A1* | 7/2016 | Kenney ............... | H01M 10/617 29/890.03 |
| 2018/0062228 A1 | 3/2018 | Wuensche et al. | |
| 2019/0366876 A1* | 12/2019 | Cheadle ................ | B60L 58/27 |
| 2020/0006827 A1* | 1/2020 | Filter ................ | H01M 10/6556 |
| 2020/0136214 A1* | 4/2020 | Graves ............. | H01M 10/6567 |
| 2020/0303789 A1* | 9/2020 | Macdonald ....... | H01M 10/6563 |
| 2020/0339010 A1* | 10/2020 | Villanueva .......... | H01M 10/625 |
| 2021/0170908 A1 | 6/2021 | Villanueva et al. | |
| 2021/0194073 A1* | 6/2021 | Mallard .................. | B60L 58/21 |
| 2021/0362849 A1 | 11/2021 | Bower et al. | |
| 2021/0391627 A1* | 12/2021 | Villanueva ............. | B64D 27/26 |
| 2022/0263148 A1 | 8/2022 | Ahunai et al. | |
| 2022/0402402 A1 | 12/2022 | Zagrodnik et al. | |
| 2022/0402620 A1 | 12/2022 | Zagrodnik et al. | |
| 2022/0407135 A1 | 12/2022 | Zagrodnik et al. | |
| 2022/0407144 A1 | 12/2022 | Zagrodnik et al. | |
| 2023/0113220 A1* | 4/2023 | Bessler ................ | H01M 10/60 429/120 |

FOREIGN PATENT DOCUMENTS

| | | | | |
|---|---|---|---|---|
| DE | 102020104892 A1 | 8/2021 | | |
| EP | 4106080 A1 | 12/2022 | | |
| EP | 4106082 A1 | 12/2022 | | |
| EP | 4106083 A1 | 12/2022 | | |
| EP | 4106084 A1 | 12/2022 | | |
| GB | 2587668 A * | 4/2021 | ............. | B64C 11/14 |
| KR | 100612239 B1 | 8/2006 | | |
| WO | WO-2013151526 A1 * | 10/2013 | ......... | F28D 15/0266 |

OTHER PUBLICATIONS

International Search Report and Written Opinion in PCT application No. PCT/US2023/079599, dated Apr. 11, 2024, 28 pages.

* cited by examiner

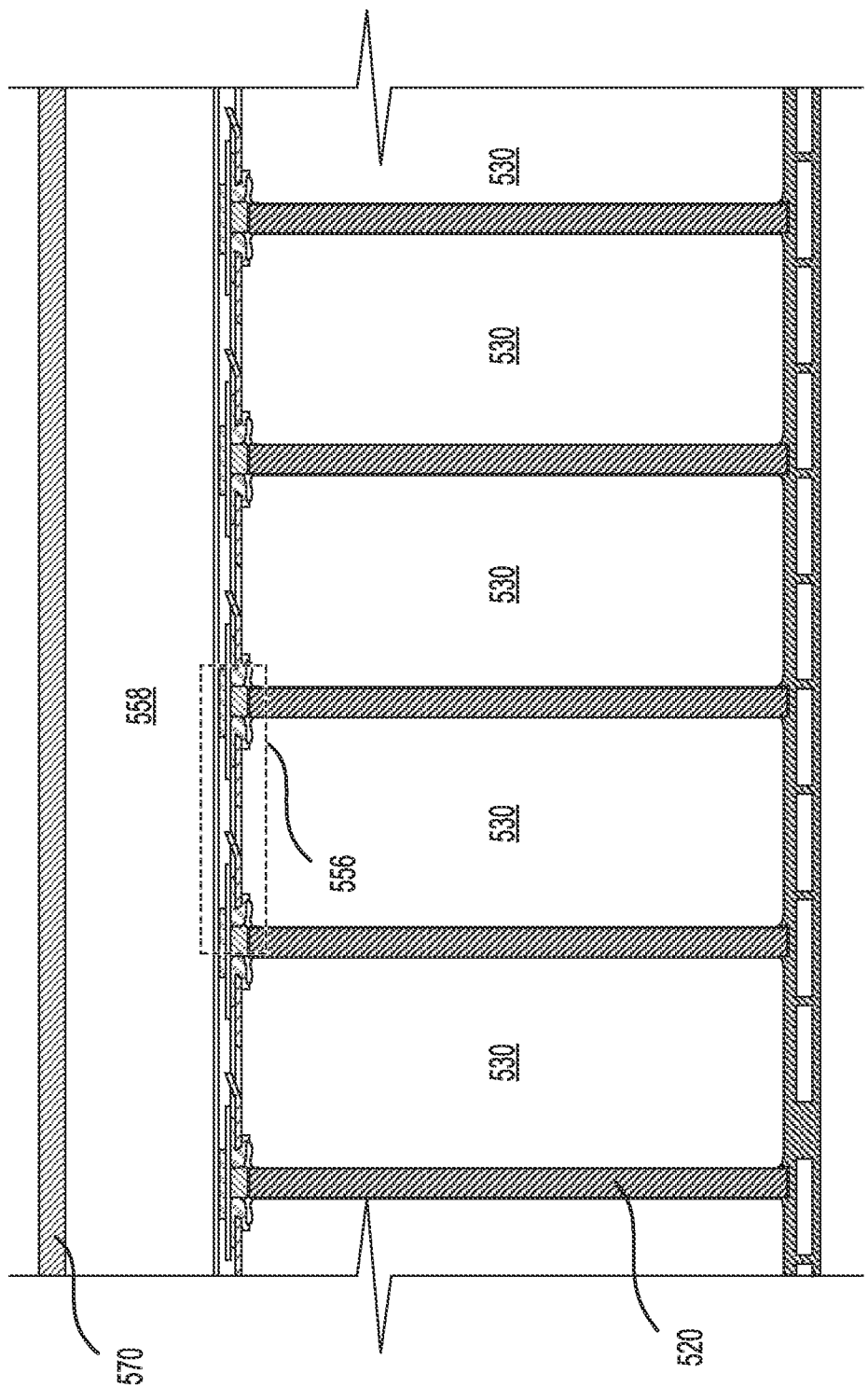

HEAT EXCHANGER ASSEMBLIES AND COOLING SYSTEMS FOR EVTOL AIRCRAFT

CROSS-REFERENCE TO RELATED APPLICATIONS

The present application claims priority to and the benefits of U.S. Provisional Patent Application Ser. No. 63/383,660, filed on Nov. 14, 2022, which is incorporated herein by reference in its entirety.

TECHNICAL FIELD

This disclosure relates generally to the field of powered aerial vehicles. More particularly, and without limitation, the present disclosure relates to innovations in aircraft that use electrical propulsion systems. Certain aspects of the present disclosure generally relate to the high voltage power supply (HVPS) systems and battery assemblies used in the aerial vehicles. Other aspects of the present disclosure generally relate to improvements in the cooling distribution system that may be used for other types of vehicles but can provide particular advantages for aerial vehicles.

SUMMARY

Consistent with some embodiments of the present disclosure, a cooling system is provided. The cooling system includes a plurality of heat exchanger assemblies corresponding to a plurality of battery packs and a fluid conveyance assembly. Each heat exchanger assembly includes a first heat exchanger inlet-outlet and a second heat exchanger inlet-outlet configured to receive a heat transfer fluid or discharge the heat transfer fluid. The fluid conveyance assembly is coupled to the heat exchanger assemblies and configured to circulate the heat transfer fluid in parallel to the heat exchanger assemblies in a U-flow scheme with an inlet and an outlet of the heat transfer fluid arranged on the same side. The fluid conveyance assembly includes a plurality of flow restrictors configured to balance the heat transfer fluid flowing into the heat exchanger assemblies. The heat transfer fluid flows through the corresponding flow restrictor before flowing into the corresponding heat exchanger assembly of the battery pack.

Consistent with some embodiments of the present disclosure, a power supply system for an aircraft is provided. The power supply system includes: a plurality of battery packs installed within a wing portion of the aircraft, in which each battery pack is connected to two electric engines of the aircraft to provide power, a plurality of heat exchanger assemblies respectively connected to battery pack enclosures of the plurality of battery packs, and a fluid conveyance assembly coupled to the plurality of heat exchanger assemblies and configured to circulate a heat transfer fluid to the heat exchanger assemblies. Each heat exchanger assembly includes a first heat exchanger inlet-outlet and a second heat exchanger inlet-outlet configured to receive or discharge the heat transfer fluid, and a heat exchanger plate including a plurality of triangular-shaped dimples configured to provide a turbulating flow of the heat transfer fluid.

Consistent with some embodiments of the present disclosure, a method for battery cooling is provided. The method includes: circulating, by a fluid conveyance assembly, a heat transfer fluid to a plurality of heat exchanger assemblies corresponding to a plurality of battery packs included in an electric aircraft, in which each heat exchanger assembly includes a first heat exchanger inlet-outlet and a second heat exchanger inlet-outlet configured to receive or discharge the heat transfer fluid, and a heat exchanger plate; and providing a turbulating flow of the heat transfer fluid through cooling channels of the heat exchanger plate by a plurality of triangular-shaped dimples. Operations of circulating the heat transfer fluid include: in a first operating period, receiving the heat transfer fluid from the first heat exchanger inlet-outlet and discharging the heat transfer fluid to the second heat exchanger inlet-outlet, and in a second operating period, receiving the heat transfer fluid from the second heat exchanger inlet-outlet and discharging the heat transfer fluid to the first heat exchanger inlet-outlet.

It is to be understood that both the foregoing general description and the following detailed description are exemplary and explanatory only and are not restrictive of the disclosed embodiments, as claimed.

BRIEF DESCRIPTION OF FIGURES AND APPENDIX IMAGES

FIG. 13B is a diagram illustrating a cross-sectional view along the line A-A of FIG. 13A, consistent with some embodiments of the present disclosure.

Figure 24A:
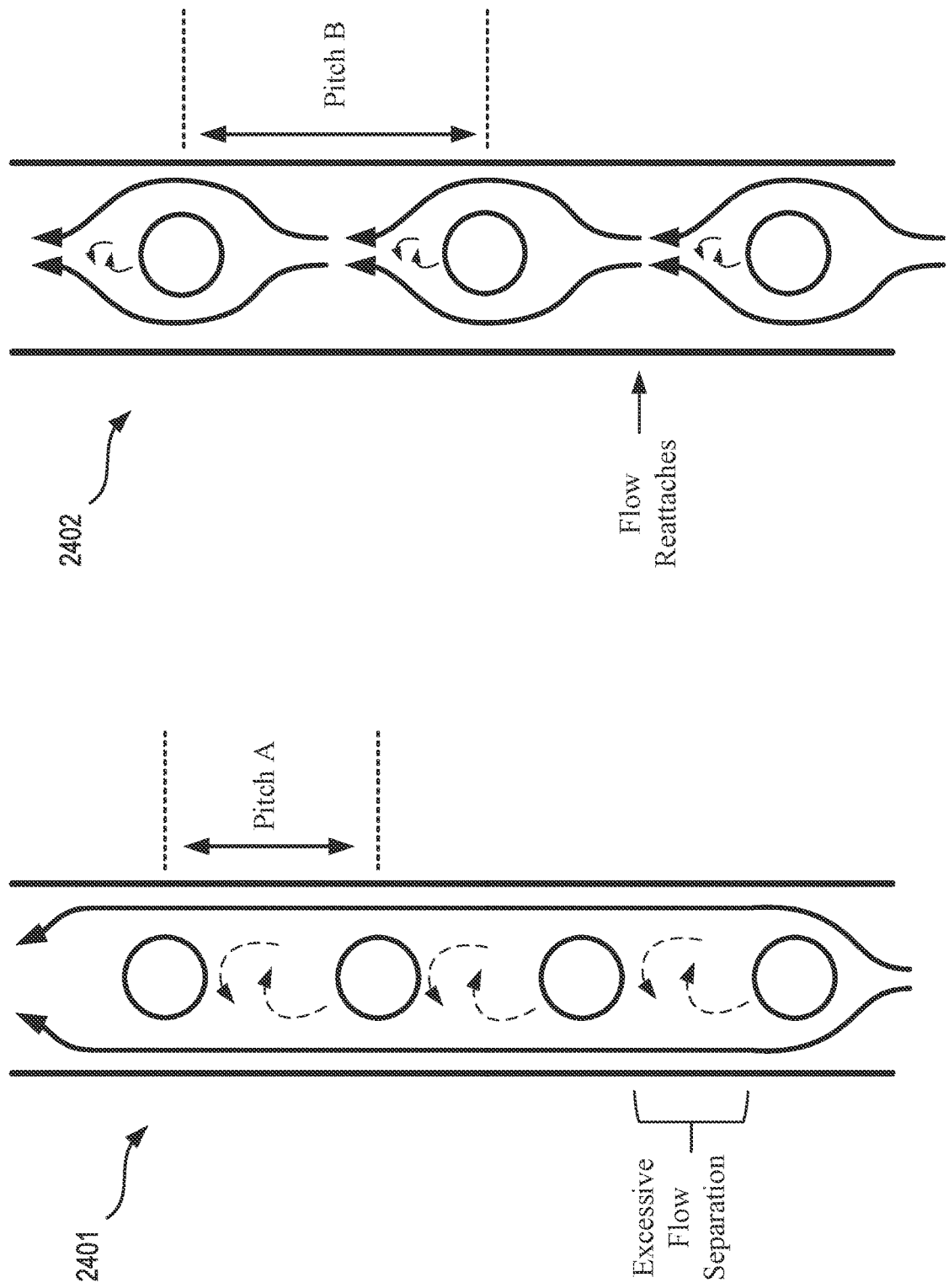
Figure 24B:
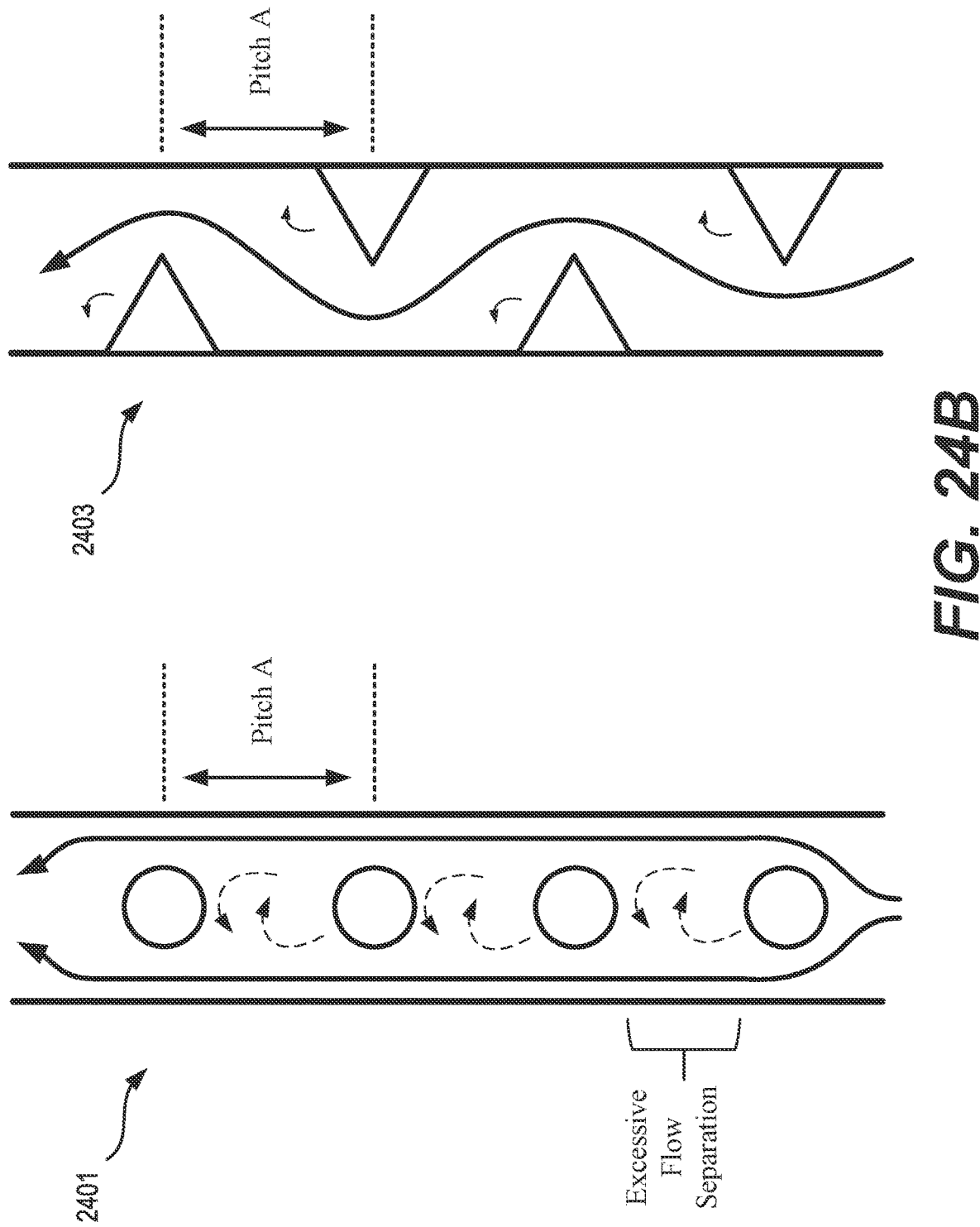

FIGS. 24A-B are diagrams illustrating an example dimple arrangement, consistent with some embodiments of the present disclosure.

DETAILED DESCRIPTION

In the following embodiments, components of a tilt-rotor aircraft primarily for use in a non-conventional aircraft will be addressed. For example, the tilt-rotor aircraft may be intended for frequent (e.g., over 50 flights per workday), short-duration flights (e.g., less than 100 miles per flight) over, into, and out of densely populated regions. The aircraft may be intended to carry 4-6 passengers or commuters who have an expectation of a low-noise and low-vibration experience. Accordingly, it may be desired that their components are configured and designed to withstand frequent use without wearing, that they generate less heat and vibration, and that the aircraft includes mechanisms to effectively control and manage heat or vibration generated by the components. Further, it may be intended that several of these aircraft operate near each other over a crowded metropolitan area. Accordingly, it may be desired that their components are configured and designed to generate low levels of noise interior and exterior to the aircraft, and to have a variety of safety and backup mechanisms.

For example, it may be desired for safety reasons that the aircraft is propelled by a distributed propulsion system, avoiding the risk of a single point of failure, and that the aircraft is capable of conventional takeoff and landing on a runway. Moreover, it may be desired that the aircraft can safely vertically takeoff and land from and into relatively restricted spaces (e.g., vertiports, parking lots, or driveways) compared to traditional airport runways while transporting around 4-6 passengers or commuters with accompanying baggage. These use requirements may place design constraints on aircraft size, weight, operating efficiency (e.g., drag, energy use), which may impact the design and configuration of the aircraft components.

The disclosed embodiments provide new and improved configurations of aircraft components that are not observed in conventional aircraft, and/or identified design criteria for components that differ from those of conventional aircraft. Such alternate configurations and design criteria, in combination addressing drawbacks and challenges with conventional components, yielded the embodiments disclosed herein for various configurations and designs of tilt-rotor aircraft components.

In some embodiments, the tilt-rotor aircraft may be designed to be capable of both vertical and conventional takeoff and landing, with a distributed electrical propulsion system enabling vertical flight, forward flight, and transition. Thrust may be generated by supplying high voltage electrical power to the electrical engines of the distributed electrical propulsion system, which each may convert the high voltage electrical power into mechanical shaft power to rotate a propeller. Embodiments disclosed herein may involve optimizing the energy density of the electrical propulsion system. Embodiments may include an electrical engine connected to an onboard electrical power source, which may include a device capable of storing energy such as a battery or capacitor, or may include one or more systems for harnessing or generating electricity such as a fuel powered generator or solar panel array. Some disclosed embodiments provide for weight reduction and space reduction of components in the aircraft, thereby increasing aircraft efficiency and performance. Given focus on safety in passenger transportation, disclosed embodiments implement new and improved safety protocols and system redundancy in the case of a failure, to minimize any single points of failure in the aircraft propulsion system. Some disclosed embodiments also provide new and improved approaches to satisfying aviation and transportation laws and regulations. For example, the Federal Aviation Administration enforces federal laws and regulations requiring safety components such as fire protective barriers adjacent to engines that use more than a threshold amount of oil or other flammable materials.

In some embodiments, the aircraft may include aft engines, or lifters, that can be of a clockwise (CW) type or counterclockwise (CCW) type. Additional embodiments may include aft electric engines that utilize a multi-blade fixed pitch propeller.

As described herein, the orientation and use of electric propulsion systems may change throughout the operation of the aircraft. In some embodiments, during vertical takeoff and landing, the forward propulsion systems as well as aft propulsion systems may provide vertical thrust during takeoff and landing. During the flight phases where the aircraft is in forward flight-mode, the forward propulsion systems may provide horizontal thrust, while the aft propulsion system propellers may be stowed at a fixed position in order to minimize drag. The aft electric propulsion systems may be actively stowed with position monitoring. Some embodiments may include a transition from vertical flight to horizontal flight and vice-versa. In some embodiments, the transitions may be accomplished via the tilt propeller system (TPS). The TPS redirects thrust between a primarily vertical direction during vertical flight mode to a mostly horizontal direction during forward-flight mode. Additional embodiments may include a variable pitch mechanism that may change the forward propulsion system propeller-hub assembly blade collective angles for operation during the hover-phase, cruise-phase and transition phase. Some embodiments may include a Conventional Takeoff and Landing (CTOL) configurations such that the tilters provide horizontal thrust for wing-borne take-off, cruise and landing. The aft electronic engines are not used for generating thrust during a CTOL mission and the aft propellers are stowed in place.

In some embodiments, an electrical engine as described herein may possess design features which mitigate and protect against uncontained fire, such as utilizing less than one quart, or another non-hazardous quantity, of flammable fluid contained in both the tilt and lift engines, not possessing a nominal ignition source within the electric engines, possessing an engine over temperature operating limit that may be more than 50° C. less than a flammable fluid auto-ignition temperature, overtemperature detection and protection, overvoltage detection and protection, and overcurrent detection and protection. In some embodiments, the design features of the electrical engine may deem it to not be a designated fire zone.

As disclosed herein, an electrical engine may include an inverter and motor; or inverter, gearbox, and motor across various configurations, such as representative configurations as described herein. For example, an electrical engine may include an electrical motor, gearbox, and inverter that all share the same central axis. Additionally, the central axis may be configured along an axis of an output shaft going to the propeller of the aircraft. In such an exemplary configuration, the motor, gearbox, and inverter would all share the output shaft as a central axis and would be circularly oriented around the output shaft. Additional embodiments may include a motor, gearbox, and inverter that are mounted together in a sequence, or a configuration where some of the components are mounted together, such as the motor and gearbox, and another component is located elsewhere, such as the inverter, but wiring systems are used to connect the electrical engine.

As mentioned above, an electrical engine for an aircraft as described here may include some or all of a motor, inverter, and gearbox. Various configurations may include an inverter and motor such that the output shaft of a motor directly provides the speed and torque for a propeller shaft. Additional embodiments of an electrical engine may include a motor, inverter, and a gearbox, wherein the output of a motor may travel through a gearbox that is connected to the output shaft for the propeller; a motor, inverter, and gearbox wherein the output from the motor travels away from the propeller, through a gearbox, where the output shaft for the propeller travels back through the gearbox and motor to the propeller. As described herein, an electrical engine may account for any combination or orientation of some or all of a motor, inverter, and gearbox. Additionally, each configuration or orientation of the electrical engine as disclosed herein may include cooling via air-cooling, coolant liquid, or a mixture of both.

For example, a configuration of an electrical engine may include a motor and inverter wherein the motor is in between the propeller of the aircraft and the inverter. Additionally, a motor may include a gearbox. Further, an inverter may share the same central axis as a motor wherein the inverter may be located in a housing that is cantilevered off of the rear of the motor and may be air cooled. It is recognized that such an inverter orientation would not be an optimum configuration in terms of the housing required to achieve such a cantilevered orientation. Additionally, a motor in this configuration utilizing air cooling may comprise potting material and air fins to assist with cooling of the motor may lead to an even larger increase in mass of the system.

Some embodiments may include an electrical engine, wherein inverter modules may be mounted on the outside of a motor housing. Additional embodiments may include an electrical engine wherein an inverter may be mounted on top of an electrical motor such that the air-cooling fins of the inverter are underneath the propeller. Further embodiments may include an inverter mounted to the back of a motor with air-cooling fins facing out radially, an inverter mounted to the front of a motor with the air-cooling fins facing out radially, an inverter mounted to a motor where the inverter is cooled by a liquid, such as oil, or any other position of the inverter relative to a motor.

Embodiments of an electrical motor may comprise a stator housing, a wound stator assembly, a rotor, various bearings, and any additional components such that to assist in transferring the speed and torque generated by the motor to a propeller.

It is understood that an electrical engine may generate heat during operation and may comprise a heat management system to ensure components of the electrical engine do not fail during operation. In some embodiments, coolant may be used and circulated throughout individual components of the engine, such as an inverter, gearbox, or motor, through some of the components, or through all of the components of the engine to assist with managing the heat present in the engine. Additional embodiments may include using air cooling methods to cool the electrical engine or using a mixture of coolant and air to manage the heat generated during operation in the electrical engine. In some embodiments, the coolant being used may also be the same liquid that is being used as lubricant throughout the inverter, gearbox, or motor. For example, the inverter, gearbox, and motor may be cooled using a liquid or air, or a mixture of air and liquid cooling could be used, such as cooling the motor using air cooling and using liquid cooling in the inverter and gearbox, or any other combination of air and liquid cooling across the inverter, gearbox, and motor or even subsets of those components.

In some embodiments, oil may be used as a lubricant throughout an electrical engine and may also be used as coolant fluid to assist in managing the heat generated by the engine during operation. Further to this example, different amounts of oil may be used to act as both lubricant and coolant fluid in the electrical engine, such as less than one quart, less than two quarts, or any other amount of oil needed to lubricate and cool the electrical engine, in combination with or without the assistance of air cooling. As has been disclosed herein, an electrical engine may have different primary functionalities such as being used only for lifting and landing, and as such only being used in one orientation, or being used during all stages of flight such as lifting, landing, and in-flight. An engine that is used in all stages of flight may experience various orientations throughout flight and may comprise more lubricant and coolant than the engine only used in one orientation. As such, all the engines on an aircraft may not include the same amount of lubricant and coolant. For example, a lifting and landing engine may only require less than one quart of oil while an engine that operates in all stages of flight may require more than one quart of oil. It should be understood that the example embodiments as mentioned herein are representative and do not dictate the bounds of the amount of lubricant and coolant that may be used in an electrical engine.

It is understood that by using oil to not only lubricate the electrical engine but also cool the electrical engine rather than another coolant, additional oil will be added to the system, but that oil will remove traditional components that may be used to cool such an electrical engine. For example, if the electrical engine were cooled by another liquid such as glycol, the engine may comprise separate heat exchangers for both the lubricant fluid and the coolant fluid. As such, in embodiments where a single fluid is being used for both lubrication and cooling, such as oil, an increase in oil would be present but there would only be a need for one heat exchanger, so there may be a decrease in mass, due to using less heat exchangers and potentially other components not being required, of the overall system and a more appealing drag profile may be present. Further, using one substance for the lubrication and cooling of the engine may increase efficiency of the system due to the reduction in mass and the benefits of cooling the engine with a substance rather than relying on air cooling which may have issues traveling throughout the engine.

Additional embodiments of electrical engines may possess various components to ensure any flammable fluids are monitored and prevented from entering certain sections of the electrical engine. Some embodiments may include an electric engine possessing a wet zone enclosure that may be defined by a gearbox, motor, and/or heat exchanger. In some embodiments, an electric engine may possess up to 4 liters of air within the motor-gearbox housing which is in contact with engine oil. Embodiments of a motor-gearbox housing may equalize internal and external pressure using a breather. Embodiments of a breather may include it protruding above nearby design features in order to prevent inadvertent entry of external fluids. Additional embodiments may include a breather that possesses a screen and a circuitous entry path to prevent entry of external debris. Embodiments may include a sight glass being present on both the tilt and lift electric engines in order to check that oil is not overfilled or underfilled during servicing.

Additional embodiments of electrical engines may include active protection features in the forward and aft electrical engines such as monitoring internal temperatures throughout the engine operation, including oil temperature, stator winding sets, inverter bulk capacitors, power modules, control board power modules, control board control processors, control board monitor processors, internal hot-spots, and other various locations throughout the engine. Embodiments may include overtemperature limits that take into account known failure temperatures and operating limits in relation to auto-ignition temperatures of fluids. Some embodiments may include a High Voltage Power System that may have fuses at the high voltage battery terminals which may rapidly disconnect the engine electrical connection irreversibly to mitigate overcurrent events. This overcurrent protection may be activated when the electric engine current draw is greater than the overcurrent operating. As such, in some embodiments, failure conditions which lead to overcurrent may only lead to a transient overheating, arc or spark faults. Some embodiments may include a fire threat characterization test ignition source that may be selected to be a more severe ignition source than a short occurring in the electric engine and being opened by the engine fuse. In some embodiments, an inverter will detect AC overcurrent and isolate the erroneous phase and/or will continuously monitor input DC voltage, and will apply protective actions to keep voltages under the overvoltage operating limit.

Figure 1A:
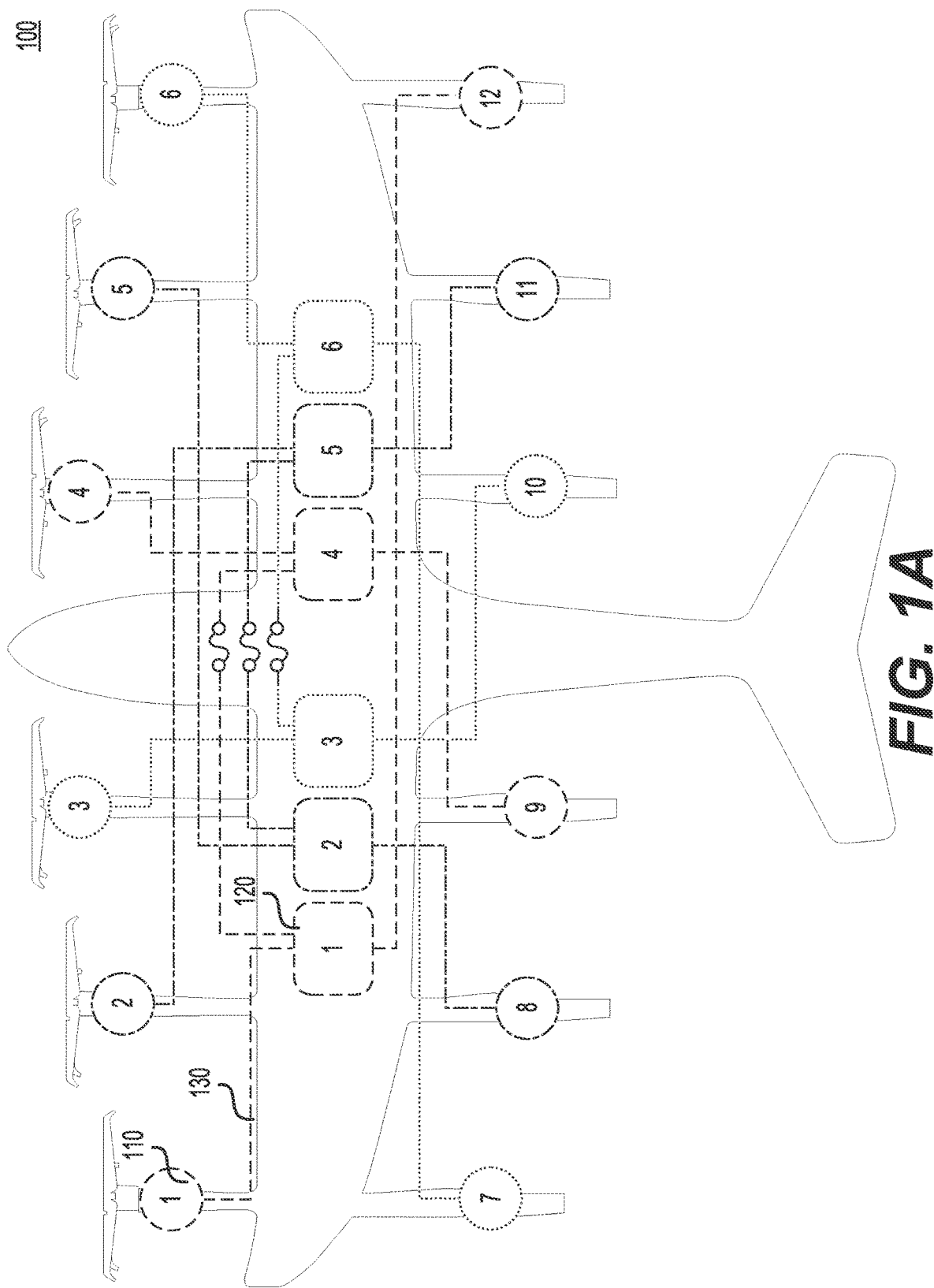
FIG. 1A is a diagram illustrating a tilt-rotor aircraft, consistent with some embodiments of the present disclosure.

Reference is made to FIG. 1A. FIG. 1A is a diagram illustrating a tilt-rotor aircraft 100, consistent with some embodiments of the present disclosure. As shown in FIG. 1A, in some embodiments, the distributed electrical propulsion system of the tilt-rotor aircraft 100 may include twelve electrical engines 110, which may be mounted on booms forward and aft of the main wings of the aircraft 100. The forward electrical engines 110 may be tiltable mid-flight between a horizontally oriented position (e.g., to generate forward thrust) and a vertically oriented position (e.g., to generate vertical lift). The forward electrical engines 110 may be of a clockwise type or counterclockwise type in terms of direction of propeller rotation. The aft electrical engines 110 may be fixed in a vertically oriented position (e.g., to generate vertical lift), and may also be of a clockwise type or counterclockwise type in terms of direction of propeller rotation.

The aircraft 100 may possess various combinations of forward and aft electrical engines 110. For example, in some embodiments, the aircraft 100 may possess six forward electrical engines 110 and six aft electrical engines 110. In some other embodiments, the aircraft 100 may include four forward electrical engines 110 and four aft electrical engines 110, or any other combination of forward and aft engines 110. In some other embodiments, the number of forward electrical engines and aft electrical engines are not equivalent.

In some embodiments, for a vertical takeoff and landing (VTOL) mission, the forward electrical engines 110 as well as aft electrical engines 110 may provide vertical thrust during takeoff and landing. During flight phases where the aircraft 100 is in forward flight-mode, the forward electrical engines 110 may provide horizontal thrust, while the propellers of the aft electrical engines 110 may be stowed at a fixed position in order to minimize drag. The aft electrical engines 110 may be actively stowed with position monitoring. Transition from vertical flight to horizontal flight and vice-versa may be accomplished via the tilt propeller subsystem. The tilt propeller subsystem may redirect thrust between a primarily vertical direction during vertical flight mode to a mostly horizontal direction during forward-flight mode. A variable pitch mechanism may change the forward electrical engine's propeller-hub assembly blade collective angles for operation during the hover-phase, transition phase, and cruise-phase.

In some embodiments, in a conventional takeoff and landing (CTOL) mission, the forward electrical engines 110 may provide horizontal thrust for wing-borne take-off, cruise, and landing. In some embodiments, the aft electrical engines 110 may not be used for generating thrust during a CTOL mission and the aft propellers may be stowed in place.

In some embodiments, an electric engine 110 may be housed or connected to a boom of the aircraft 100 and include a motor, inverter, and gearbox. In some embodiments, the motor, inverter, and gearbox may be interfaced such that they share a central axis. In some embodiments, the torque originating in the motor may be sent away from the propellers of the propulsion system and to a gearbox. In some embodiments, a gearbox may provide a gear reduction and then send the torque, via a main shaft, back through a bearing located inside the motor and to the propeller. In some embodiments, an inverter may be mounted on the rear of a gearbox such that a main shaft does not travel through the inverter when outputting torque to the propeller. In some embodiments, the motor, gearbox, and inverter may be interfaced such that a coolant, such as oil, may be used to service the motor, inverter, and/or gearbox, while sharing a common heat exchanger. In some embodiments, the amount of oil used to lubricate and cool the electric engine may vary, including amounts less than one quart, two quarts, three quarts, or any other measured amount of oil.

In some embodiments, a tilt propeller system may include a linear or rotary actuator to change the orientation of a propulsion system during operation. In some embodiments, the pitch of the propulsion system may be changed as a function of the orientation of the propulsion system. In some embodiments, a rotary actuator may include a motor, inverter, and gearbox. In some embodiments, a gearbox may include various types of gears interfacing to provide a gear reduction capable of orienting the propulsion system. In some embodiments, a tilt propeller system may include a redundant configuration such that multiple motors, inverters, and gearboxes are present and interface using a gear. In some embodiments, a configuration utilizing multiple motors, gearboxes, and inverters may allow a failed portion of the redundant configuration to be driven by the motor, inverter, and gearbox of another portion of the configuration. In some embodiments, a gearbox configuration may also allow the tilt propeller system to maintain a propulsion system orientation with the help of, or without, additional power being provided by the system.

As shown in FIG. 1A, the aircraft 100 is configured with the distributed electric propulsion system enabling vertical flight, forward flight, and transition. The forward 6 electric engines 110 (which are numbered 1-6 from left to right) are with variable pitch propellers tilt to achieve vertical takeoff and landing, transition flight and fully wing-borne flight. The aft 6 electric engines 110 (which are numbered 7-12 from left to right) are equipped with fixed pitch propellers that operate during vertical takeoff and landing and transition and are stowed in a minimum drag position for conventional flight. The flight controls are an integrated fly-by-wire system that features envelope protection and structural load limiting functions. The aircraft 100 will be equipped with advanced cockpit avionics, a flight management system, and the sensors necessary to support the intended operations and system functions.

In some embodiments, an electrical propulsion system (EPS) as described herein may generate thrust by supplying High Voltage (HV) electric power to the electric engine 110, which in turn converts HV power into mechanical shaft power which is used to rotate a propeller. As mentioned above, an aircraft 100 as described herein may possess multiple electric engines 110 which are boom-mounted forward and aft of the wing. The amount of thrust each electric engine 110 generates may be governed by a torque command from the Flight Control System (FCS) over a digital communication interface to each electric engine 110. Embodiments may include forward electric engines 110, and may be able to alter their orientation, or tilt. Additional embodiments include forward engines that may be a clockwise (CW) type or counterclockwise (CCW) type. The forward electric engine propulsion subsystem may consist of a multi-blade adjustable pitch propeller, as well as a variable pitch subsystem.

In some embodiments, the aircraft 100 may include a high voltage power supply (HVPS) system to supply the High Voltage (HV) electric power. The HVPS system is the source of power on the aircraft 100 and configured to distribute the stored electrical energy to other systems on the aircraft 100, including the electrical propulsion system (EPS) for converting electrical power into mechanical rotational shaft power to generate thrust, the environmental control system (ECS) to power equipment needed to control the internal atmosphere within the cabin, and the low voltage system (LVS) to power equipment and LRUs that operate on low voltage power (e.g., 28 VDC). In some embodiments, the HVPS uses an external HV power source to recharge or replenish its energy source on the aircraft 100. Charging the system ensures that sufficient energy is available to power all equipment needs, including the ECS, the EPS, and the low voltage power supply (LVPS), to successfully perform the subsequent flight mission.

Specifically, the high voltage power supply system may include various subsystems, including a Battery Pack Subsystem, an HV Venting Subsystem, an HV Cooling Distribution Subsystem, and an HV Charging Subsystem. The Battery Pack Subsystem may provide requisite power and energy needs for equipment on the aircraft and may include monitoring units that measure performance parameters, perform estimation algorithms and provide active protection against conditions that negatively impact the performance, life and safety of the HVPS. The HV Venting Subsystem is configured to perform a safe removal of battery emissions during abnormal operation to prevent both structural degradation and to minimize the risk of propagation. The HV Cooling Distribution Subsystem is configured to distribute thermally conditioned coolant to the battery pack subsystem in order to reach requisite temperatures for safe charge and discharge operations. The HV Charging Subsystem may provide an interface between the aircraft 100 and an off-board charger and may be responsible for sequencing charging operations and continuously monitoring voltage and current limits during the charging session.

As shown in FIG. 1A, the HVPS system of the aircraft 100 may include a plurality of, e.g., six battery packs 120 (which are numbered 1-6 from left to right) installed within the battery bays in the wing of the aircraft 100. In some embodiments, to simplify the design, manufacturing, and logistics, battery packs 120 may have an identical design. Each battery pack 120 may be connected to, e.g., two diagonally opposite electric engines 110 through HV channels 130. HV channel pairs may be determined by their relative positions in each wing (left, center, right) and indicated by different dotted/dashed lines in FIG. 1A. For example, the first battery pack 120, numbered 1 in FIG. 1A, may be connected to the diagonally opposite electric engines 110 numbered 1 and 12.

Figure 1B:
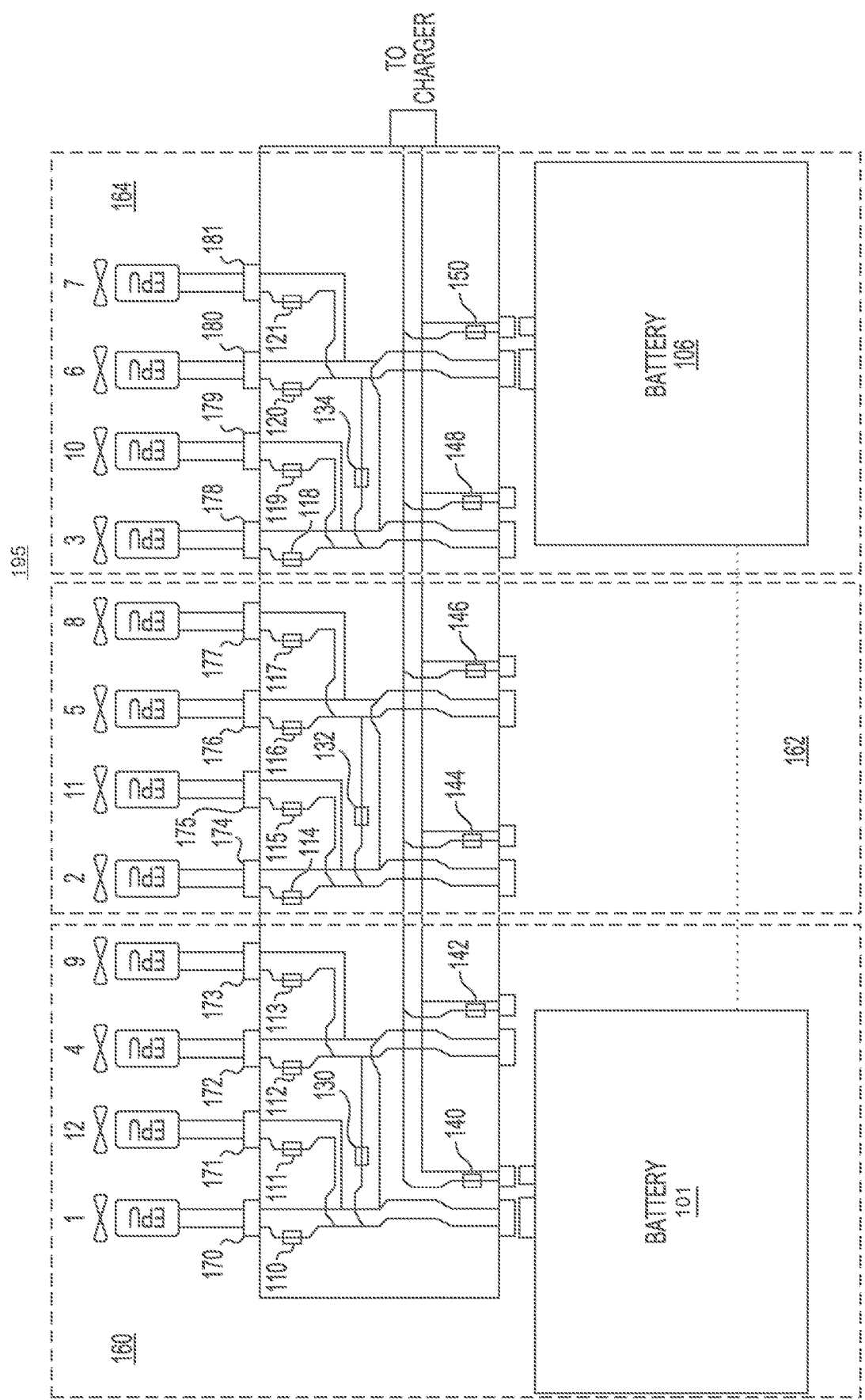
FIG. 1B is a diagram illustrating a tilt-rotor aircraft, consistent with some embodiments of the present disclosure.
Figure 1C:
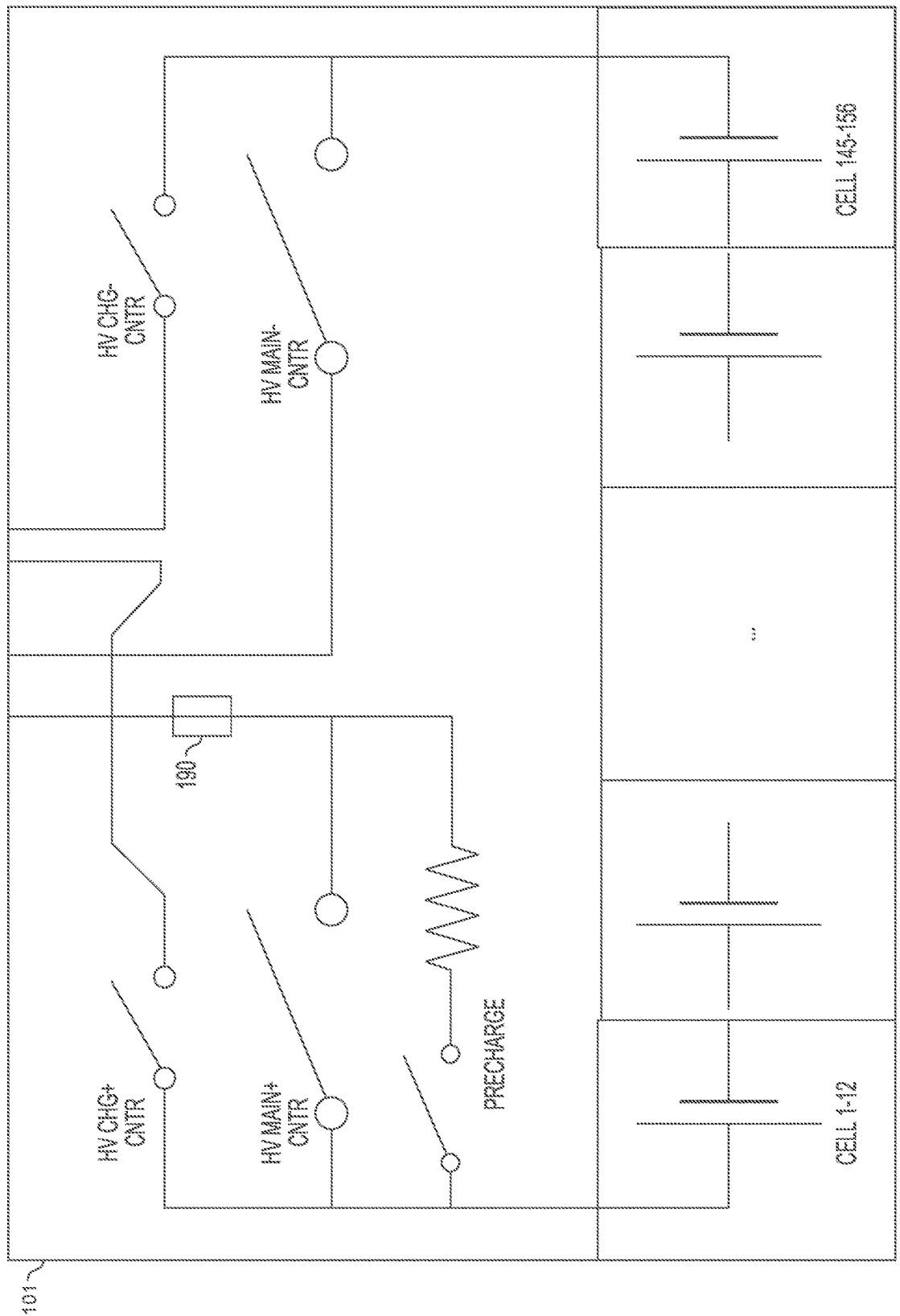
FIG. 1C shows an exemplary embodiment of one of the batteries of FIG. 1B.

Reference is made to FIG. 1B. FIG. 1B is a diagram illustrating a tilt-rotor aircraft 195, consistent with some embodiments of the present disclosure. As shown in FIG. 1B, in some embodiments, a tilt-rotor aircraft may include a battery assembly comprising three (3) electrically separate paired battery pack units 160, 162, and 164. In some embodiments, each paired battery pack unit 160, 162, 164 may include an electrically separate high voltage bus 130, 132, 134 which connects paired batteries out of a set of six total batteries 101-106 of a given paired battery pack unit 160, 162, 164. FIG. 1C shows an exemplary embodiment of one of batteries 101-106. In some embodiments, each set of paired batteries may power four symmetric electrical engines 170-173, 174-177, or 178-181 which, in turn, power four electric propeller units (EPUs) (labelled as 1-12 in FIG. 1B) simultaneously. In some embodiments, the electrical engines 170-181 may correspond to the twelve electrical engines shown in FIG. 1A (labelled as 1-12 in FIG. 1A).

With reference to FIG. 1C, some embodiments may include a pyro-technical fuse 190 located within each one of batteries 101-106. In some embodiments, the pyro-technical fuse may be utilized to prevent a single point of failure upon a short circuit or failure of any one battery of a set of paired batteries by disconnecting the failing battery after activation of the pyro-technical fuse which severs the connection between the failing battery and an operating portion of the electrical system of the tilt-rotor aircraft 195.

With reference to FIG. 1B, in some embodiments, additional fuses may be positioned on HV buses which connect other components of each paired battery pack unit. For example, fuses 110-121 may be located on a HV bus between each battery 101-106 and respective electrical engines 170-181 and EPUs (labelled as 1-12 in FIG. 1B). Each of fuses 110-121 may be utilized to prevent a single point of failure upon a short circuit or failure of any one component of one of the electrical engines 170-181 or EPUs (labelled as 1-12 in FIG. 1B) by, e.g., disconnecting the failing component after activation of a respective one of the fuses 110-121 which acts to sever the connection between the failing component and operable portions of the electrical system of the tilt-rotor aircraft 195. As another example, charge fuses 140, 142, 144, 146, 148, and 150 may be located on a HV bus between each battery 101-106 and a charger or charging system. Each of charge fuses 140, 142, 144, 146, 148, and 150 may be utilized to further prevent a single point of failure upon a short circuit or failure of any one battery while charging by, e.g., disconnecting the failing battery from the charger or charging system after activation of one or more of fuses 140, 142, 144, 146, 148, and 150 which severs the connection between the failing battery and operable portions of the electrical system of the tilt-rotor aircraft 195.

As described herein, the orientation and use of electric propulsion systems may change throughout the operation of the aircraft, depending on various failure scenarios. In some embodiments, each set of paired batteries may power four symmetric electrical engines simultaneously.

For example, and with further reference to FIGS. 1B and 1C, a first battery 101 of a first paired battery pack unit 160 may directly power two of twelve electrical engines 170, 171 which, in turn, power two EPUs (labelled as 1 and 12 in FIG. 1B), and a second battery 102 (not shown) of the paired battery pack unit 160 may directly power two other electrical engines of the twelve electrical engines 172, 173 which, in turn, power two other EPUs (labelled as 4 and 9 in FIG. 1B). In some embodiments, the first battery 101 and the second battery 102 (not shown) of the paired battery pack unit may be cross-linked (i.e., electrically interconnected) via a first high voltage (HV) cross-linking bus 130. In some embodiments, the first HV cross-linking bus 130 may allow for the first battery 101 to act as a backup battery for the second battery 102 (not shown), thereby providing power to the two electrical engines 172, 173 and EPUs (labelled as 4 and 9 in FIG. 1B), which were initially powered by the second battery 102, when the second battery 102 (not shown) fails. In some embodiments, the first HV cross-linking bus 130 may allow for the second battery 102 (not shown) to act as a backup battery for the first battery 101, thereby providing power to the two electrical engines 170, 171 and EPUs (labelled as 1 and 12 in FIG. 1B), which were initially powered by the first battery 101, when the first battery 101 fails. In some embodiments, in the event of a failure of either the first battery 101 or the second battery 102 (not shown) of the first paired battery pack unit 160, the failing battery may be disconnected from the other working battery of the paired battery pack. In some embodiments, the disconnecting may be performed via a pyro-technical fuse 190 located near an output of each battery 101-106 and thus along the HV connection between the first and second batteries 101, 102 of the paired battery pack unit 160. In some embodiments, each battery 101, 102 of the first paired battery pack unit 160 may be electrically separable, e.g., via charge fuses 140, 142, from the remainder of the first paired battery pack unit 160 and any other paired battery pack unit 162, 164 such that, e.g., failures may be isolated events that do not propagate along any connected HV channels.

Continuing the above example, and further with reference to FIGS. 1B and 1C, a third battery 103 (not shown) of a second paired battery pack unit 162 may directly power two additional electrical engines 174, 175 which, in turn, power two other EPUs (labelled as 2 and 11 in FIG. 1B), and a fourth battery 104 (not shown) of the second paired battery pack unit 162 may directly power two other electrical engines 176, 177 which, in turn, power two other EPUs (labelled as 5 and 8 in FIG. 1B). In some embodiments, the third battery 103 and the fourth battery 104 of the second paired battery pack unit 162 may be cross-linked (i.e., electrically interconnected) via a second HV cross-linking bus 132. In some embodiments, the second HV cross-linking bus 132 may allow for the third battery 103 to act as a backup battery for the fourth battery 104, thereby providing power to the two electrical engines 176, 177 and EPUs (labelled as 5 and 8 in FIG. 1B), which were initially powered by the fourth battery 104, when the fourth battery 104 fails. In some embodiments, the second HV cross-linking bus 132 may allow for the fourth battery 104 to act as a backup battery for the third battery 103, thereby providing power to the two electrical engines 174, 175 and EPUs (labelled as 2 and 11 in FIG. 1B), which were initially powered by the third battery 103, when the third battery 103 fails. In some embodiments, in the event of a failure of either the third battery 103 or the fourth battery 104 of the second paired battery pack unit 162, the failing battery may be disconnected from the other working battery of the second paired battery pack unit 162. In some embodiments, the disconnecting may be performed via a pyro-technical fuse 190 located near an output of each one of the batteries 101-106 and thus along the HV connection between the third and fourth batteries 103, 104 of the second paired battery pack unit 162. In some embodiments, each battery 103, 104 of the second paired battery pack unit 162 may be electrically separable, e.g., via charge fuses 144, 146, from the remainder of the paired battery pack unit 162 and any other paired battery pack unit 160, 164 such that, e.g., failures may be isolated events that do not propagate along any connected HV channels.

Further continuing the above example, and further with reference to FIGS. 1B and 1C, a fifth battery 105 (not shown) of a third paired battery pack unit 164 may directly power two additional electrical engines 178, 179 which, in turn, power two other EPUs (labelled as 3 and 10 in FIG. 1B), and a sixth battery 106 of the third paired battery pack unit 164 may directly power two other electrical engines 180, 181 which, in turn, power two other EPUs (labelled as 6 and 7 in FIG. 1B). In some embodiments, the fifth battery 105 and the sixth battery 106 of the third paired battery pack unit 164 may be cross-linked (i.e., electrically interconnected) via a third HV cross-linking bus 134. In some embodiments, the third HV cross-linking bus 134 may allow for the fifth battery 105 to act as a backup battery for the sixth battery 106, thereby providing power to the two electrical engines 180, 181 and EPUs (labelled as 6 and 7 in FIG. 1B), which were initially powered by the sixth battery 106, when the sixth battery 106 fails. In some embodiments, the third HV cross-linking bus 134 may allow for the sixth battery 106 to act as a backup battery for the fifth battery 105, thereby providing power to the two electrical engines 178, 179 and EPUs (labelled as 3 and 10 in FIG. 1B), which were initially powered by the fifth battery 105, when the fifth battery 105 fails. In some embodiments, in the event of a failure of either the fifth battery 105 or the sixth battery 106 of the third paired battery pack unit 164, the failing battery may be disconnected from the other working battery of the third paired battery pack unit 164. In some embodiments, the disconnecting may be performed via a pyro-technical fuse 190 located near an output of each one of the batteries 101-106 and thus along the HV connection between the fifth and sixth batteries 105, 106 of the third paired battery pack unit 164. In some embodiments, each battery 105, 106 of the third paired battery pack unit 164 may be electrically separable, e.g., via charge fuses 148, 150, from the remainder of the paired battery pack unit 164 and any other paired battery pack unit 160, 162 such that, e.g., failures may be isolated events that do not propagate along any connected HV channels.

Continuing with reference to FIG. 1B, in some embodiments, as a result of the above example configuration, the three paired battery pack units (i.e., the first, second, and third paired battery pack units) 160, 162, 164 may allow for an optimization of the power available to operate the twelve electrical engines (labelled as 1-12 in FIG. 1B) by configuring each paired battery pack unit 160, 162, 164 to provide power to particular ones of the twelve electrical engines. As an example, in some embodiments, each one of the three paired battery pack units 160, 162, 164 may be configured such that each set of paired batteries may power any four of twelve electrical engines, e.g., one of the front outboard electrical engines, one of the rear inboard electrical engines, one of the front inboard electrical engines, and one of the rear outboard electrical engines. As another example, in some embodiments, each battery pack unit 160, 162, 164 may be configured that that each set of paired batteries may power any combination of four forward and/or aft electrical engines and/or EPUs. Appendix 1 provides additional information on aspects of a high voltage power supply (HVPS) system.

In some embodiments, as a result of the above example design, particularly the capability of one battery of each paired battery pack to act as a backup battery for a failing battery of that paired battery pack, the backup battery may power four electrical engines simultaneously (i.e., the backup battery may provide power to two electrical engines which are directly electrically connected to the working battery, and also to two electrical engines via a HV cross-linking bus connecting the set of paired batteries of a paired battery pack unit). In some embodiments, the backup battery may provide power to four electrical engines simultaneously but at a slightly lower power level which remains sufficient for proper flight control. As a result of such an exemplary design, all electrical engines continue to receive power, and in turn, all motors and propellers continue to operate even with a first failing battery within any or all of the first, second, and third paired battery pack units. As a further result of such an exemplary design, generally about 20% less battery power may be required, as compared to an independent or common bus structure, to achieve the same result (e.g., to achieve sufficient energy to controllably fly a design mission, and to achieve sufficient thrust to safely perform a hover landing). In some embodiments, as a further result of such an exemplary design and a lowering of the power requirement by about 20%, an increase in energy efficiency may also be achieved due to, e.g., a capability to provide power for a longer period of time, an increase in a range of an aircraft, and a reduction in weight of the aircraft based on the capability to utilize lower power batteries.

It is understood that, in some embodiments, a battery pack unit may comprise one battery which powers any two electrical engines and EPUs, wherein an aircraft may comprise six battery pack units. As another example, in some embodiments, a battery pack unit may comprise three connected batteries, wherein each of the three batteries may directly power any two electrical engines and EPUs, and wherein each battery pack unit comprising three connected batteries may power a total of any six electrical engines and EPUs of the aircraft. As yet another example, in some embodiments, a battery pack unit may comprise four connected batteries, wherein each of the four batteries may directly power any two electrical engines and EPUs, and wherein each battery pack unit comprising four batteries may power a total of any eight electrical engines and EPUs of the aircraft. It is understood that any number of electrical engines and EPUs may refer to electrical engines and EPUs which are located on opposite sides of the aircraft, forward of the aircraft, and/or aft of the aircraft. It is further understood that, in some embodiments, any combination of different sized battery pack units may be utilized to power twelve electrical engines and EPUs. Yet further, it is also understood that any combination of different sized battery pack units may be utilized to power any number of electrical engines and EPUs of an aircraft without limitation to a total number of electrical engines and EPUs.

Figure 2:
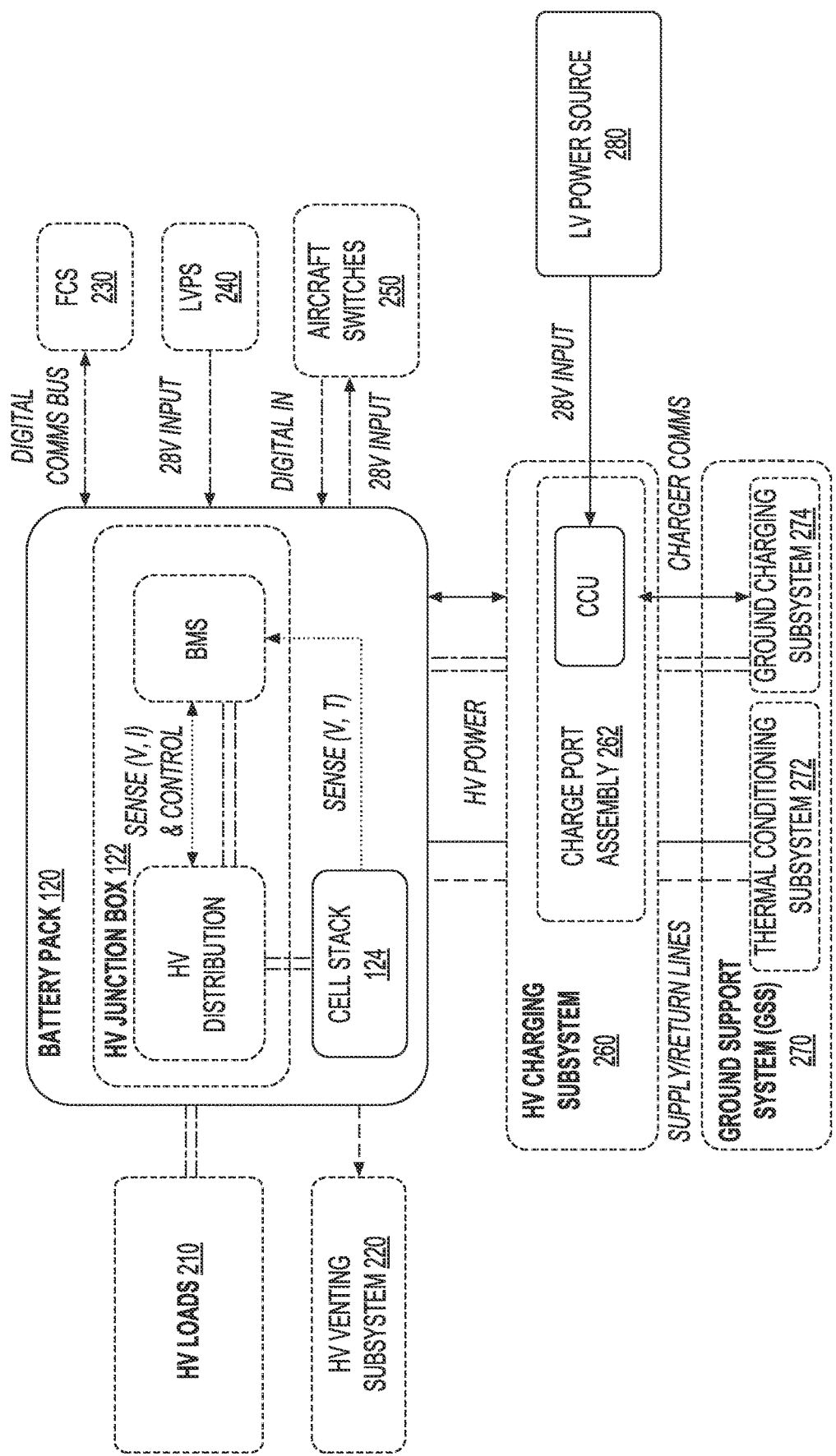
FIG. 2 is a block diagram illustrating a battery pack, consistent with some embodiments of the present disclosure

Reference is made to FIG. 2. FIG. 2 is a block diagram illustrating a battery pack 120, consistent with some embodiments of the present disclosure. As shown in FIG. 2, the battery pack 120 may be electrically and communicatively connected with HV loads 210, an HV venting subsystem 220, the FCS 230, a low voltage power supply (LVPS) system 240, aircraft switches 250, an HV charging subsystem 260, a ground support system (GSS) 270, and an LV power source 280.

In the embodiments of FIG. 2, the battery pack 120 includes an HV Junction Box (HVJB) 122 and a cell stack assembly 124. Each battery pack 120 contains an HV distribution unit and a Battery Management System (BMS) housed within the HVJB 122. Specifically, the BMS is configured to monitor voltages, temperatures, currents, and isolation resistances and control pack contactors and pyro fuses to protect against fault conditions for safe operation. The BMU may also run algorithms to determine the state of the pack (e.g., a state of charge, a state of health, etc.). The BMS may receive voltage and temperature sensing signals from the cell stack assembly 124 and the HV distribution unit, and control the HV distribution unit accordingly. The HV loads 210 receiving the HV power may include electric engines (e.g., two corresponding electric engines 110 connected to the battery pack 120 shown in FIG. 1A), a Tilt Actuator, DC/DC converters, the ECS, or the Cross-Link used to connect pack pairs.

The battery pack 120 may be connected to the FCS 230 through a digital communication bus. The battery pack 120 may receive a low voltage input voltage (e.g., a 28V input) from the LVPS system 240. The battery pack 120 may receive digital input signal(s) from the aircraft switches 250 and provide a supply voltage (e.g., a 28V input) to the aircraft switches 250. HV power can be transmitted between the GSS 270 and the battery pack 120 through the HV charging subsystem 260. In some embodiments, the HV charging subsystem 260 includes a charge port assembly 262 having a Control MCU (CCU) connected to the LV power source 280 for providing the supply voltage (e.g., a 28V input) to the HV charging subsystem 260. In some embodiments, the GSS 270 may include a Thermal Conditioning Subsystem 272 and a Ground Charging Subsystem 274 electrically and communicatively connected with the charge port assembly 262.

Figure 3:
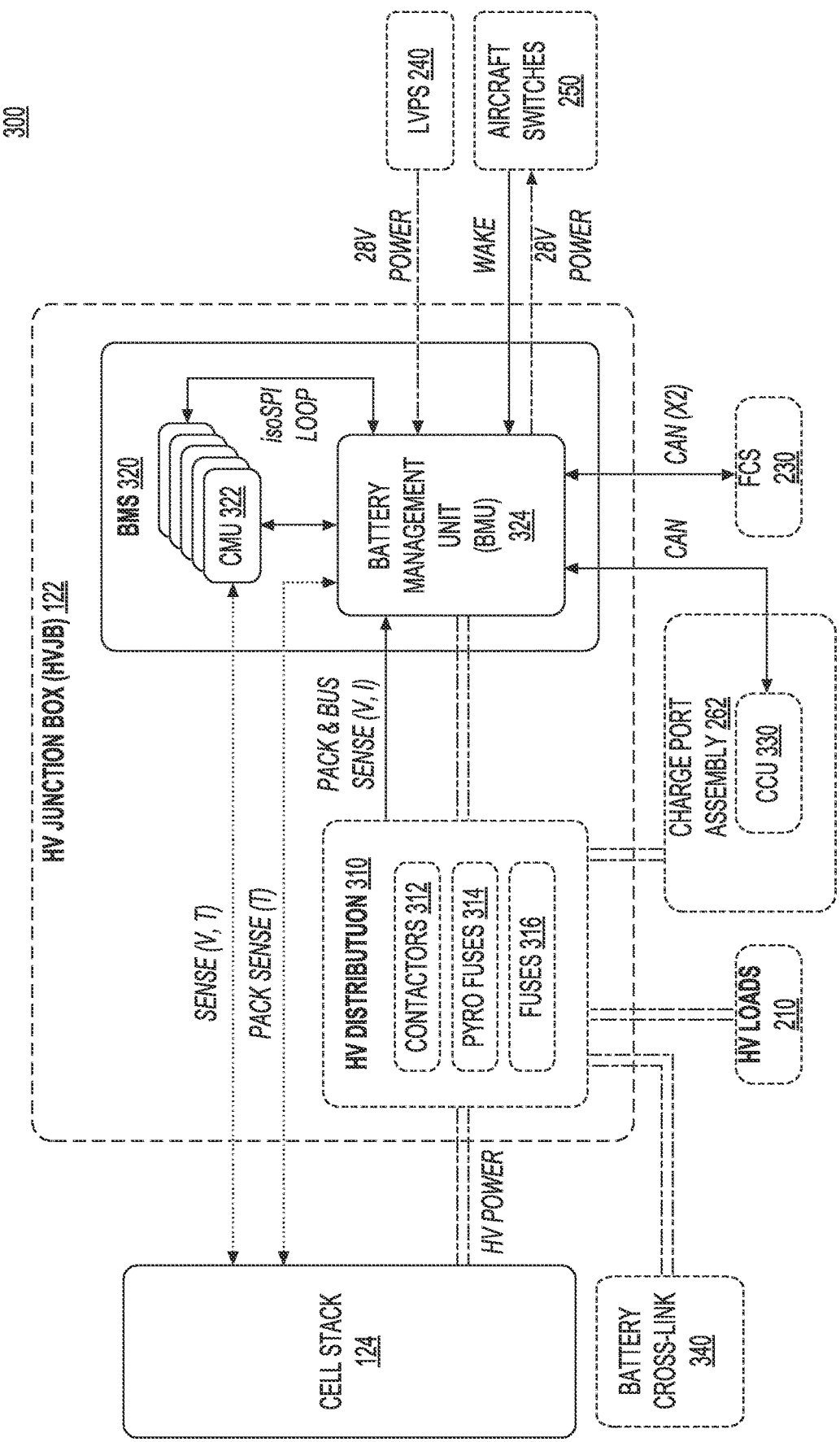
FIG. 3 is a block diagram illustrating aspects of a HV Junction Box (HVJB), consistent with some embodiments of the present disclosure.

Reference is made to FIG. 3. FIG. 3 is a more detailed block diagram 300 illustrating units in the HVJB 122, consistent with some embodiments of the present disclosure. As shown in FIG. 3, in some embodiments, the HV distribution unit 310 in the HVJB 122 may contain HV contactors 312 and a combination of active and passive fuses (e.g., pyro fuses 314 and fuses 316) to protect against overcurrent and short-circuit conditions.

The BMS 320 in the HVJB 122 may include Cell Management Units (CMUs) 322 to monitor the voltages of each set of 7 parallel cells (i.e., a 1S-7P cell group) connected in series in a 14S-7P cell block. The CMU may also be used to monitor a 14S-7P cell block's temperature. The CMUs 322 obtain measurements for all the cell groups in the battery pack 120, communicating the measurements to the Battery Management Unit (BMU) 324 via isoSPI in a daisy-chain configuration. In some embodiments, the CMU 322 does not have an active management or control mechanism for cells within the cell block, but the CMU 322 is able to perform passive cell balancing of the series cell blocks when commanded by the BMU 324. The BMU system architecture may provide the flexibility to command passive balancing both on the ground and in the air.

The BMU Printed Circuit Board Assembly (PCBA) is configured to monitor voltages, currents, and temperatures from the CMUs 322 in addition to the output current for each of the connected loads. The BMU 324 may be internally powered by the battery cell stack assembly 124 and continuously monitor the state of the battery even when it is not installed in the aircraft 100. By monitoring the battery pack 120, cell block, and cell group parameters, the BMU is enabled to protect against conditions that adversely affect safety or performance, such as overvoltage, undervoltage, overtemperature, under-temperature, loss of electrical isolation, short circuit, overcurrent, etc.

The diagnostic function of the BMU 324 allows for fault detection and isolation through built-in-tests (BIT). Fault indications and overall usage are logged in Non-Volatile Memory (NVM) for data retention and prognostics. In addition, the BMU 324 performs computation of the State of Charge (SOC), State of Health (SOH), State of Power (SOP), State of Energy (SOE) and State of Temperature (SOT) of the battery pack 120. The BMU 324 also controls and monitors bus pre-charging and provides contactor commands. In some embodiments, the BMU 324 may use two microcontrollers to perform the state computation and contactor and fuse control functions so that a subset of BMU 324 functions are retained upon failure of a single microcontroller.

The CCU 330 in the charge port assembly 262 may interface with the external battery charger and communicate with the BMUs 324 on the six installed battery packs 120. In some embodiments, the CCU 330 may be a single PCBA with one microcontroller that manages overall power delivery to each battery pack 120 when charging. As shown in FIG. 2, the CCU 330 may perform the handshake between the Ground Charging Subsystem 274 and the BMUs 324, requests the BMUs 324 to open or close contactors 312, and provides active detection and protection features for overvoltage protection. In some embodiments, the CCU 330 is external to the battery packs 120. The BMUs 324 in each battery pack 120 retain full control and continuously monitor their battery packs 120 during charging operations.

Figure 4:
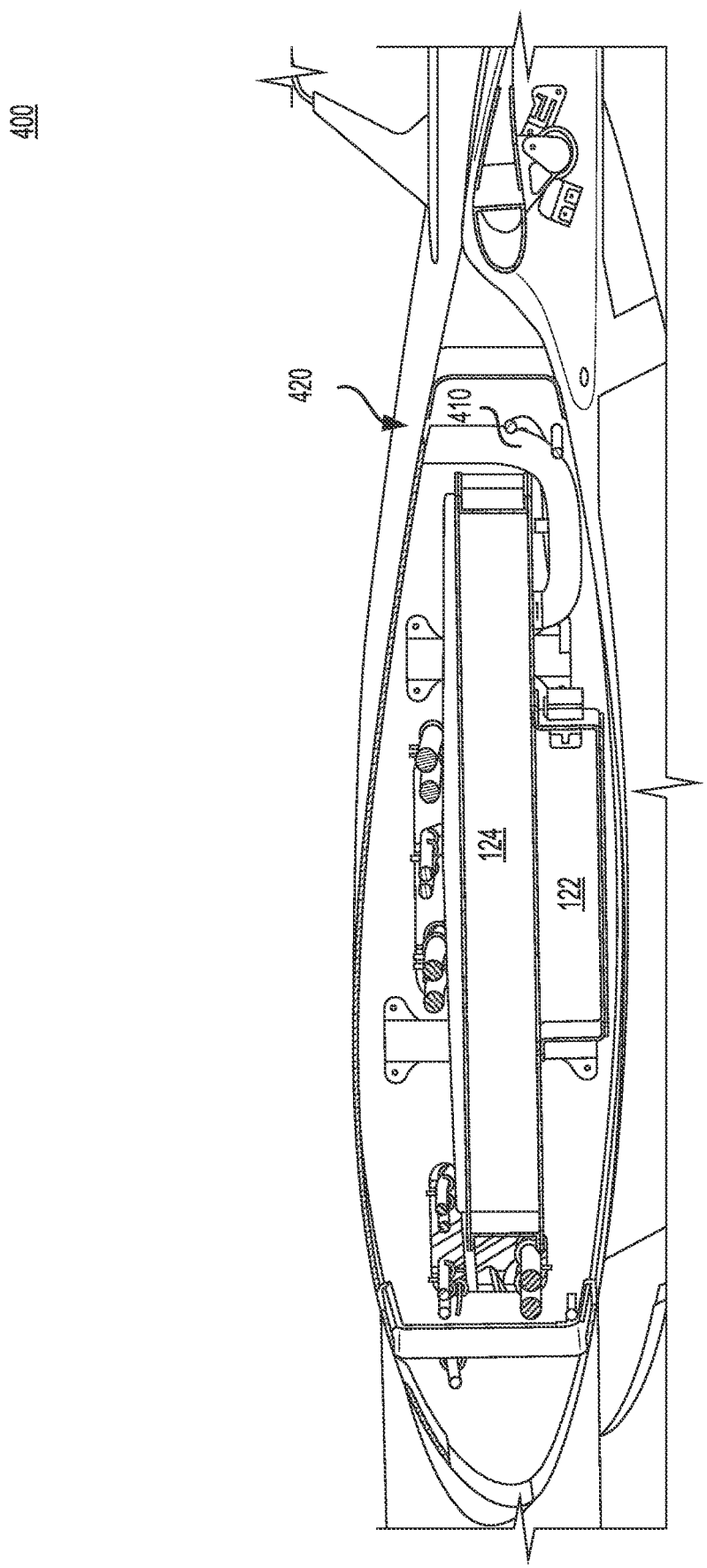
FIG. 4 is a cross section view of a wing of an aircraft with a battery pack installed in the wing, consistent with some embodiments of the present disclosure.
Figure 5A:
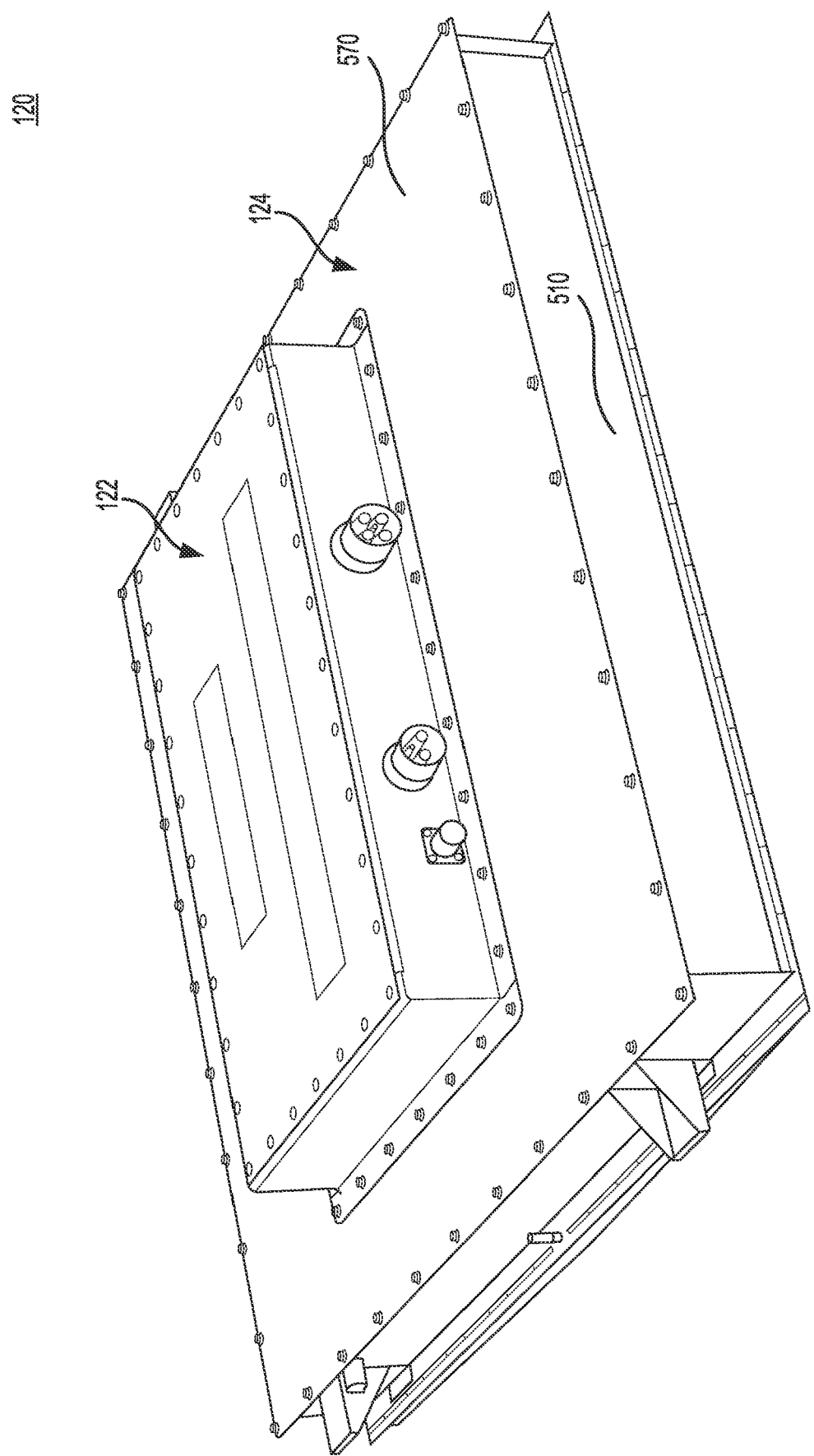
FIG. 5A is a diagram illustrating an overview of a battery pack, consistent with some embodiments of the present disclosure.
Figure 5B:
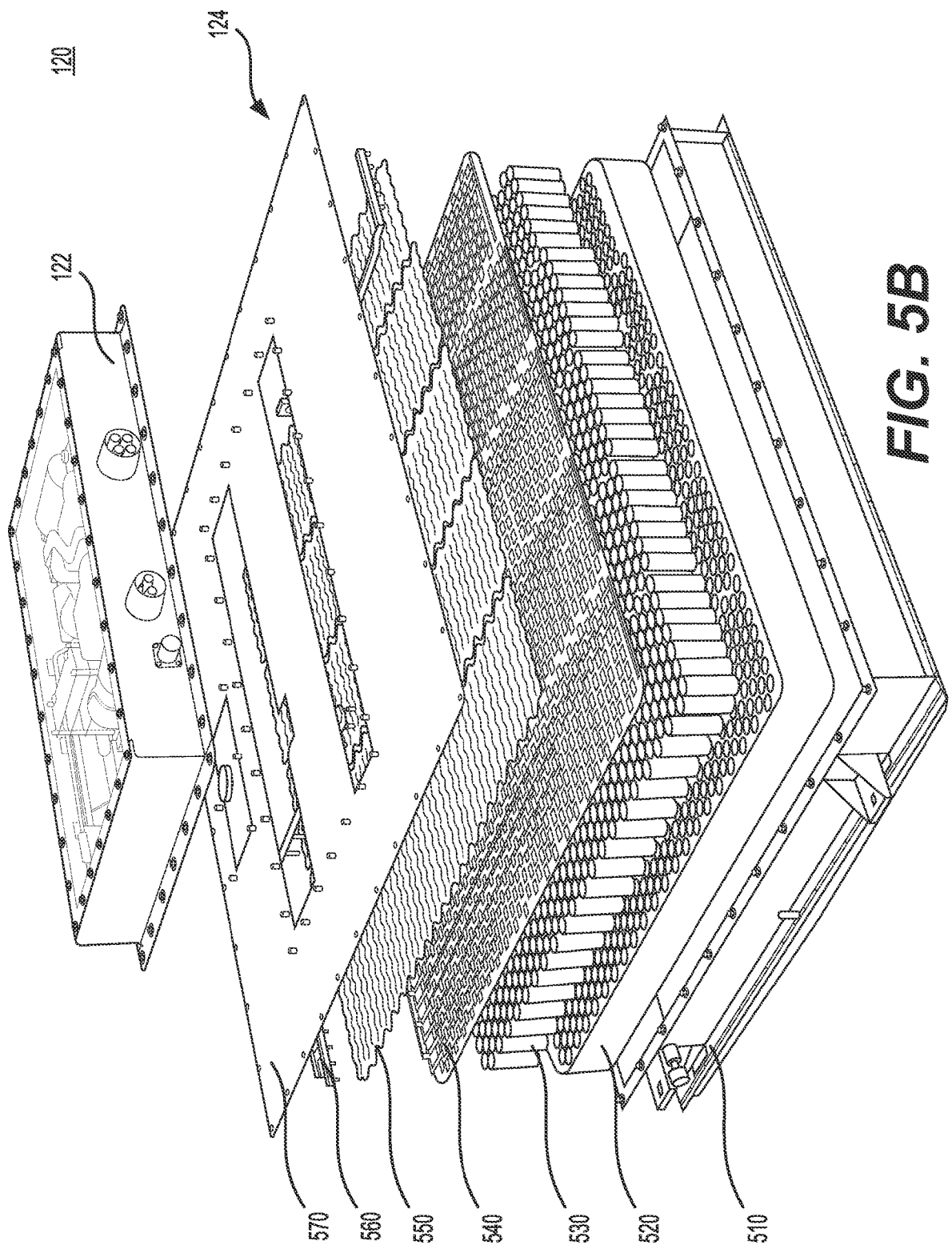
FIG. 5B is a diagram illustrating components and units within a battery pack, consistent with some embodiments of the present disclosure.

Reference is made to FIG. 4 and FIGS. 5A and 5B. FIG. 4 is a cross section view of a wing 400 of the aircraft 100 of FIG. 1A with the battery pack 120 of the battery pack 120 installed in the wing, consistent with some embodiments of the present disclosure. In some embodiment, the battery pack 120 can be removed from service once it has reached a state of health where the battery pack 120 no longer meets the minimum energy and power requirements for the operation. As shown in FIG. 4, in some embodiments, an elbow duct 410 is connected to a vent outlet 420 to exhaust battery emissions upwards. The HVJB 122 of the battery pack 120 is mounted to the battery pack enclosure of the cell stack assembly 124.

FIG. 5A is a diagram illustrating an overview of the battery pack 120, consistent with some embodiments of the present disclosure. FIG. 5B is a diagram illustrating components and units within the battery pack 120 of FIG. 5A, consistent with some embodiments of the present disclosure. In FIGS. 5A and 5B, the battery pack 120 is shown upside down relative to the installed orientation as shown in FIG. 4. As shown in FIGS. 5A and 5B, the battery pack 120 includes the HVJB 122 and the cell stack assembly 124. The cell stack assembly 124 includes an enclosure 510 with a heat exchanger (e.g., a heat exchanger plate), a cell holder 520 including an interstitial foam, a plurality of battery cells 530 (e.g., 1456 cells in each battery pack 120), a current collector assembly 540, a vent flap assembly 550, pack bus bars 560, and a pack lid 570. As shown in FIG. 5A, the HVJB 122 may be mounted to the pack lid 570 using fasteners. Details of the cell stack assembly 124 will be discussed in the following paragraphs with the accompanying drawings.

In some embodiments, battery cells 530 in the battery pack 120 may be Lithium-Ion cells, but the present disclosure is not limited thereto. For example, the battery cells 530 may be 4.5 Ah capacity cells with a 2170 cylindrical form factor. The battery cells 530 can be operated at a voltage range between around 2.5V and around 4.18 V, and each cell has a BOL capacity of 4.5 Ah. In some embodiments, each battery cell 530 contains a Current Interrupt Device (CID) which permanently places the battery cell 530 in an open circuit condition in the event of internal pressure build-up.

Figure 6:
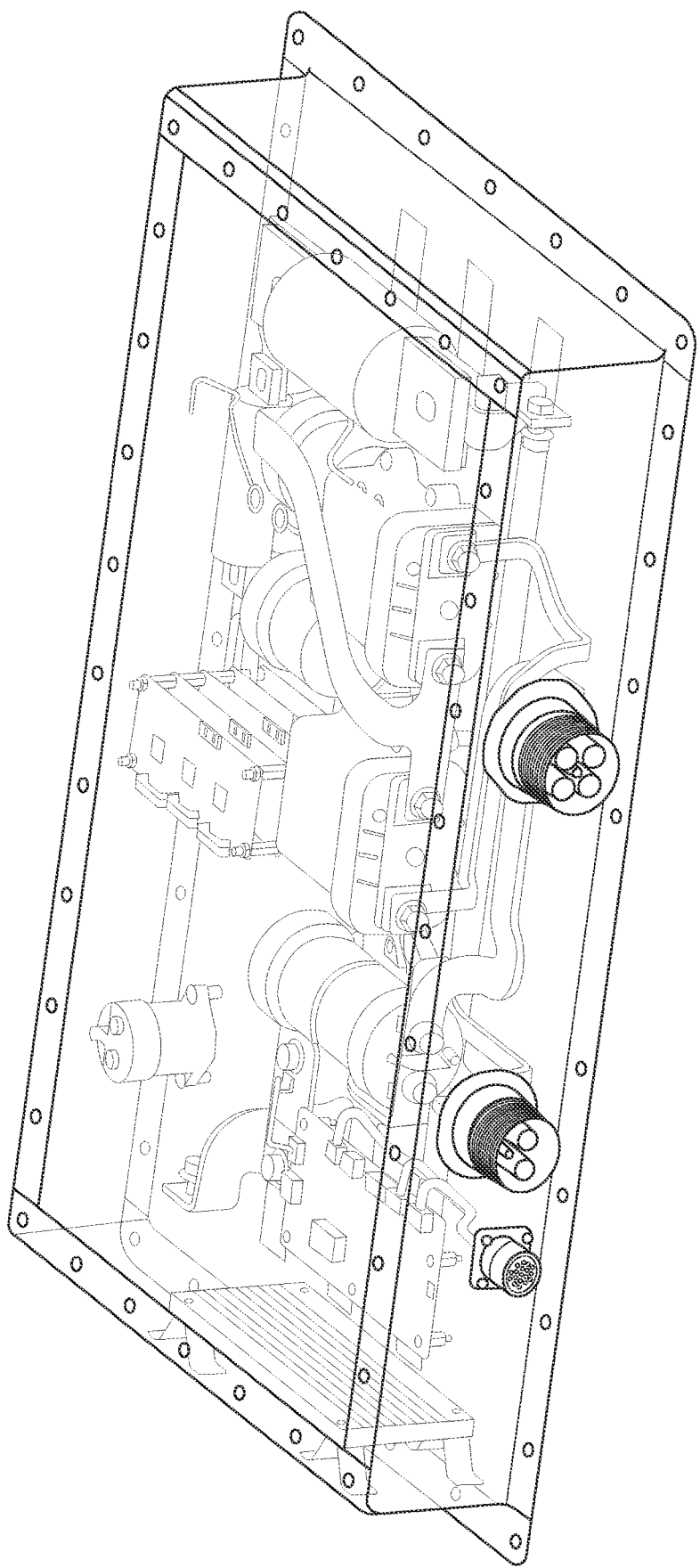
FIG. 6 is a diagram illustrating an exemplary HVJB, consistent with some embodiments of the present disclosure.

FIG. 6 is a diagram illustrating an exemplary HVJB 122, consistent with some embodiments of the present disclosure. As discussed above, the HVJB 122 is configured to distribute high voltage stored electric energy for propulsion and other system needs, and the HVJB 122 may contain precharge resistors and relays, HV bus bars, shunt resistors, HV contactors, connectors, a combination of active and passive fuses to protect against overcurrent and short-circuit conditions, and as determined to be necessary, components to disable high-voltage output in emergency conditions. The components within the HVJB 122 may be enclosed along with the BMU PCBA and mounted to the battery pack enclosure using fasteners.

Figure 7A:
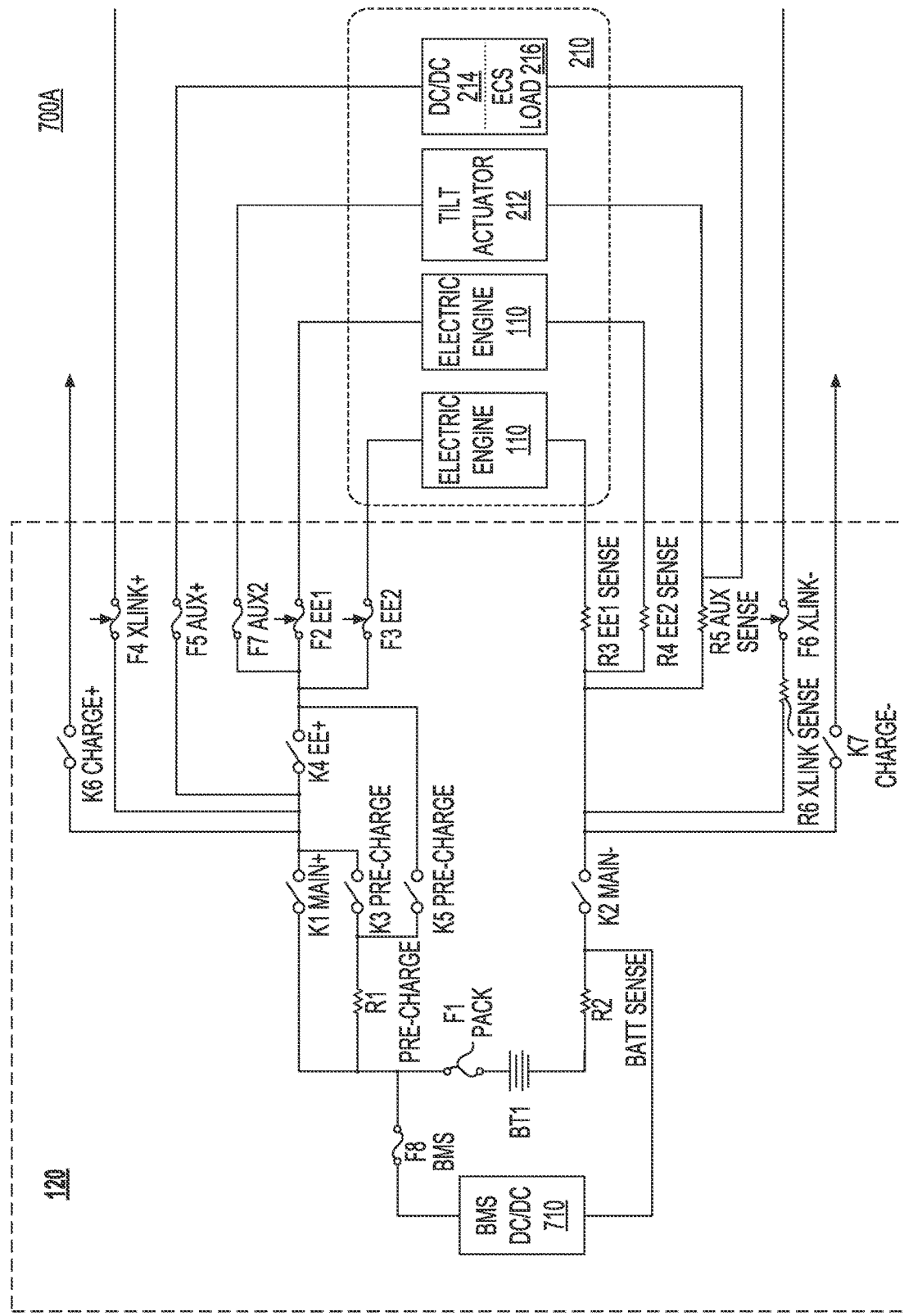
FIG. 7A illustrates an exemplary circuit diagram of a HVJB, consistent with some embodiments of the present disclosure.

FIG. 7A illustrates an exemplary circuit diagram 700A of the HVJB 122, consistent with some embodiments of the present disclosure. As explained above, the HVJB 122 may be electrically connected to the HV loads 210 to provide HV power. Specifically, the DC/DC converter 710 in the BMS 320 and the power storage element BT1 (e.g., the battery cells 530 connected in parallel and in series) can be used to provide the HV power.

As shown in FIG. 7A, the DC/DC converter 710 and the power storage element BT1 are connected to each of the HV loads 210 through pre-charge resistor(s) (e.g., resistor R1) or current sensing resistor(s) (e.g., resistors R2-R6), switching devices K1-K7 (e.g., HV contactors), and a combination of active and passive fuses (e.g., pyro fuses F2, F3, F4 and F6 and fuses F1, F5, F7, and F8) to protect against various failure conditions (e.g., overcurrent, short-circuit, etc.). The active and passive fuses may be arranged in the HV battery pack 120 to safely cut power from the HV battery pack 120 in the event of a short circuit at the load side. The HV loads 210 may include two corresponding electric engines 110, a Tilt Actuator 212, DC/DC converters 214 (e.g., 2.8 kW DC/DC converters), and the ECS load 216.

For example, pyro fuses F2, F3, F4 and F6 may be a type of fuse configured to be activated by an external source when the circuit disconnection and isolation is required. The BMS 320 is used to activate the pyro fuses F2, F3, F4 and/or F6 when a short event occurs. In some embodiments, the BMS 320 in the HVJB 122 can send command signals to the corresponding pyro fuse driver to activate the pyro fuse when the failure occurs, so as to protect against overcurrent and electrically isolate the entire battery pack 120 from the connected loads. In some embodiments, the HVJB 122 may further provide a redundant active trigger configured to enable the pyro fuse driver to activate one or more pyro fuses when the BMS 320 fails to enable the pyro fuse driver, which will be discussed below with accompanying drawings.

Figure 7B:
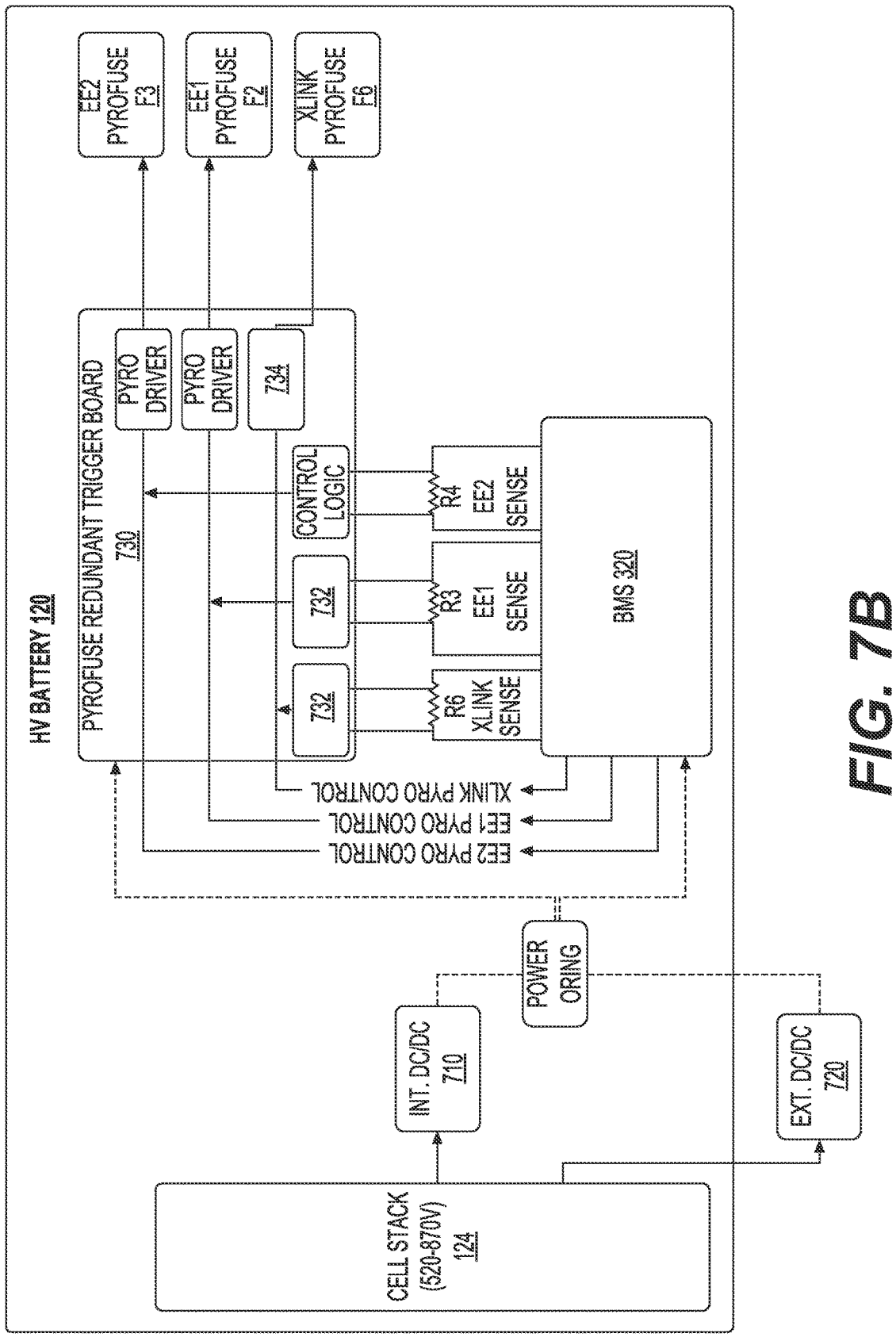
FIG. 7B is an exemplary block diagram illustrating the activation of pyro fuses, consistent with some embodiments of the present disclosure.

FIG. 7B is an exemplary block diagram 700B illustrating the activation of pyro fuses, consistent with some embodiments of the present disclosure. As shown in FIG. 7B, in some embodiments, the voltage output from the battery cell stack assembly 124 may be HV (e.g., 520V-870V). This voltage can be converted by an internal DC-DC converter 710 within the battery pack 120 to supply power for the BMS 320 and a pyro-fuse redundant trigger (PRT) board 730 arranged in the HVJB 122. The PRT board 730 may include various analog components to form multiple control logic circuits 732 to provide redundant active triggers for corresponding pyro fuses (e.g., pyro fuses F2, F3, and F6). In some embodiments, the battery cell stack assembly 124 may also be electrically connected to an external DC-DC converter 720 arranged outside of the battery pack 120. The external DC-DC converter 720 may also be configured to convert the voltage output from the battery cell stack assembly 124 to provide the supply voltage for the BMS 320 and the PRT board 730. In other words, in the embodiments shown in FIG. 7B, a redundant power supply system including the internal DC-DC converter 710 and the external DC-DC converter 720 may ensure the power supply and improve the system stability. When the main power converter (which may be either the internal DC-DC converter 710 or the external DC-DC converter 720) fails, the system can switch to the back-up power converter to supply power to other devices and units in the battery pack 120 to ensure the system operates properly.

As shown in FIG. 7B, multiple pyro fuse drivers 734 configured to activate the corresponding pyro fuses (e.g., pyro fuses F2, F3, and F6) may be located on the PRT board 730, but the present discourse is not limited thereto. In other embodiments, pyro fuse drivers 734 may also be located on another circuit board separately. When the BMS 320 detects an overcurrent failure based on signals sensed by the corresponding current sensing resistor (e.g., resistor R3, resistor R4, or resistor R6), the BMS 320 may output a corresponding pyro-fuse control command signal (e.g., EE1 PYRO CONTROL for the pyro-fuse driver associated with the power line to the first electrical engine, EE2 PYRO CONTROL for the pyro-fuse driver associated with the power line to the second electrical engine, or XLINK PYRO CONTROL for the pyro-fuse driver associated with the power line to the cross-link used to connect pack pairs). Accordingly, the corresponding pyro fuse driver 734, after receiving the pyro-fuse control command signal, may activate the corresponding pyro fuse to electrically isolate the battery pack 120 from the load.

In some embodiments, when the BMS 320 is not functioning and fails to output the pyro-fuse control command signal when the fault occurs, the pyro fuse does not blow and disconnect the power path. In such event, the control logic circuit 732 configured with a different threshold value for triggering the pyro fuse may function as a redundant trigger and output the corresponding command signal to the pyro fuse driver 734 to activate the corresponding pyro fuse. Accordingly, the PRT board 730 is fully independent of the BMS 320 and designed to trigger the pyro fuse to blow based on analog circuitry. By the redundant trigger sources, higher safety levels in the HV battery pack 120 can be achieved.

As shown in FIG. 7B, in some embodiments, both the BMS 320 and the control logic circuits 732 in the PRT board 730 may use the same current sensor (e.g., sensing resistors R3, resistor R4, and resistor R6) to detect the short condition. The BMS 320 may be the primary source sending the activation signal for the pyro fuse, and the PRT board 730 may serve to confirm the safety event and take action only if the BMS 320 fails to activate the pyro fuse.

Figure 8:
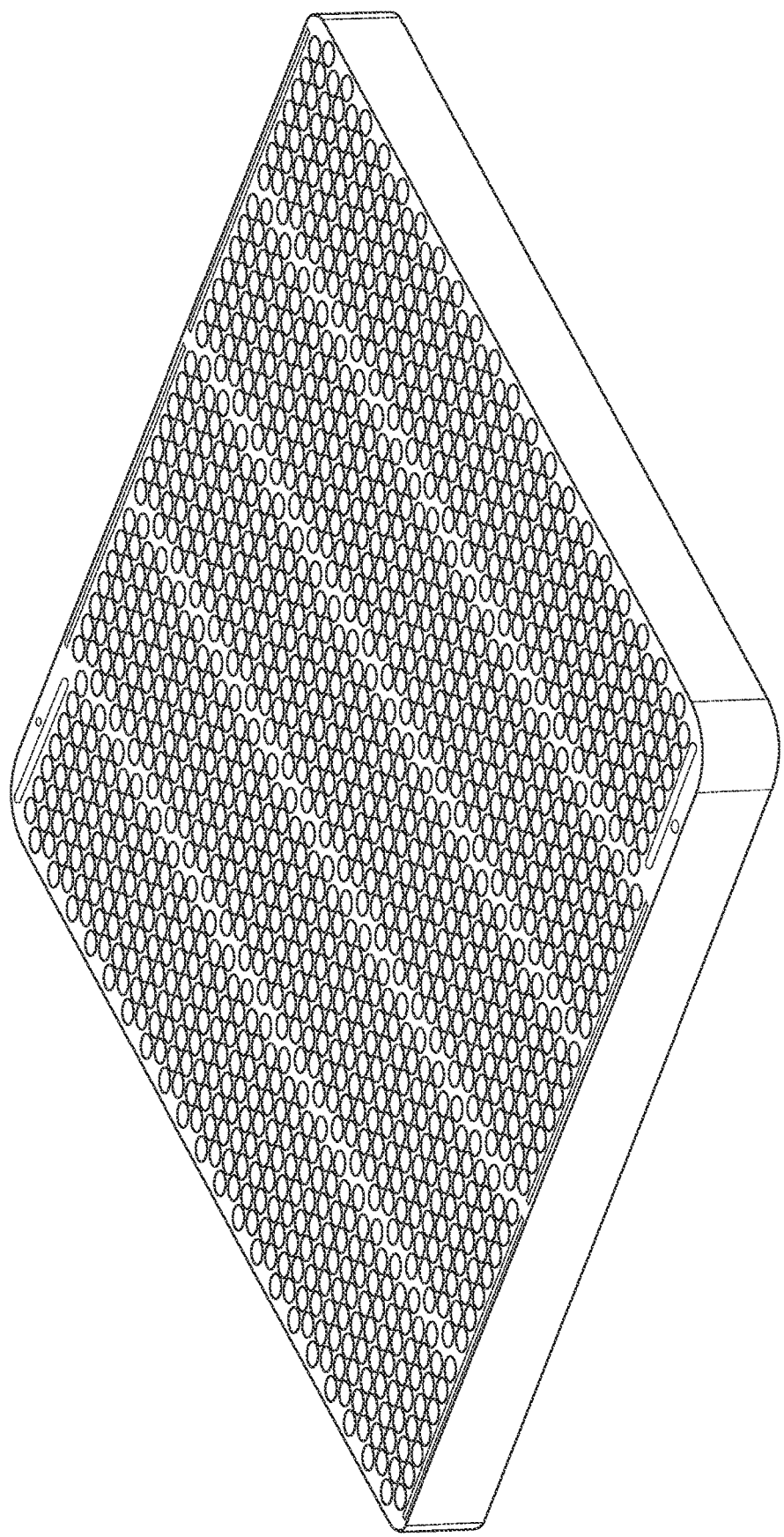
FIG. 8 is a diagram illustrating an exemplary architecture of a foam cell holder, consistent with some embodiments of the present disclosure.

Reference is made to FIG. 8. FIG. 8 is a diagram illustrating an exemplary architecture of the foam cell holder 520, consistent with some embodiments of the present disclosure. In some embodiments, the cell holder 520 may be a machined foam with a FR4 top sheet and embedded busbars. In some embodiments, the cell holder 520 may be a precisely manufactured, rigid, flame-retardant, closed-cell polyurethane foam structure. When selecting the materials for the foam cell holder 520, various properties are taken into account, including, for example, mechanical stiffness (e.g., modulus of elasticity, yield strength, etc.), minimized thermal conductivity, amenability to adhesive bonding, high dielectric constant, high resistance to dielectric breakdown, low density (or low weight), and/or mass manufacturing capability (e.g., the ability to cast into complex shapes while minimizing waste materials). For example, various structural foams may meet the standard in the aerospace industry. The cell holder 520 may be resistant to water absorption and fungal growth and may be self-extinguishing and flame resistant. The closed cell structure of the cell holder 520 acts as an insulator and gas barrier to minimize conduction and convection between battery cells 530. Accordingly, the foam cell holder 520 locates the battery cells 530 and isolates the battery cells 530 from neighboring cells to protect the battery cells 530 from thermal runaway conditions. The cell holder 520 may also contain nested busbars for connecting sections of the battery pack 120.

Figure 9:
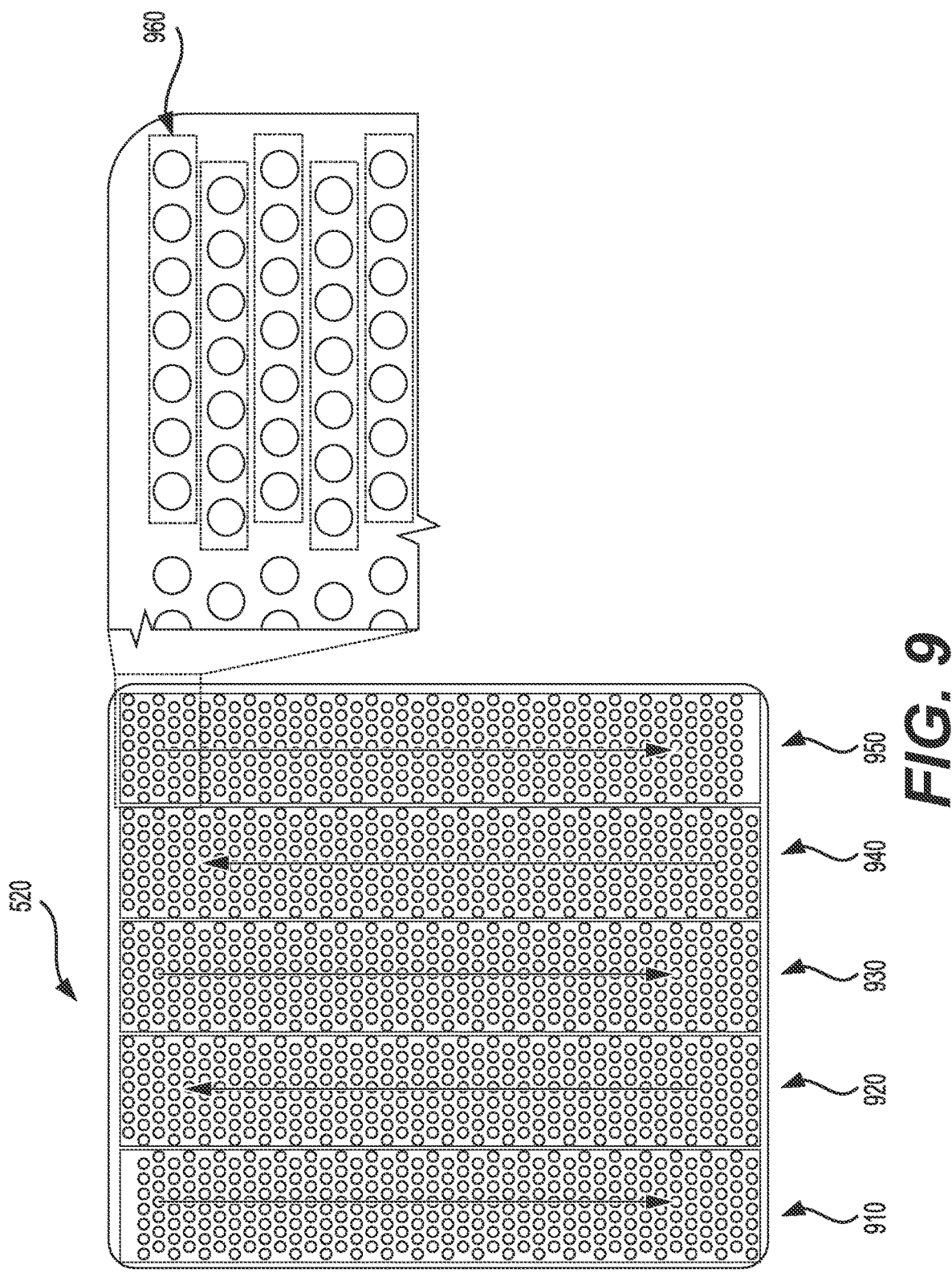
FIG. 9 is a top view of a foam cell holder, consistent with some embodiments of the present disclosure.

FIG. 9 is a top view of the foam cell holder 520, consistent with some embodiments of the present disclosure. In some embodiments, the foam cell holder 520 can be configured to house a total of 1,456 cylindrical battery cells 530. For example, the battery cells 530 may be arranged into five columns 910-950. Each of columns 920-940 contains 42 rows of 7 cells for a total of 294 cells per column. The first and last columns 910 and 950 have one less row for a total of 287 cells each. Each row of 7 parallel cells can be referred to as a cell group 960. Each cell is thermally insulated from adjacent cells in the same cell group or adjacent cell groups by a nominal value of 1.5 mm of foam, reducing conductive heat transfer and the probability of cell sidewall rupture.

In some embodiments, the foam cell holder 520 contains alignment features and holes for positioning the component relative to manufacturing fixtures. Channels along the edge of the foam are used as mounting locations for insulated aluminum bus bars that are bolted and welded to the current collector assembly 540.

Figure 10A:
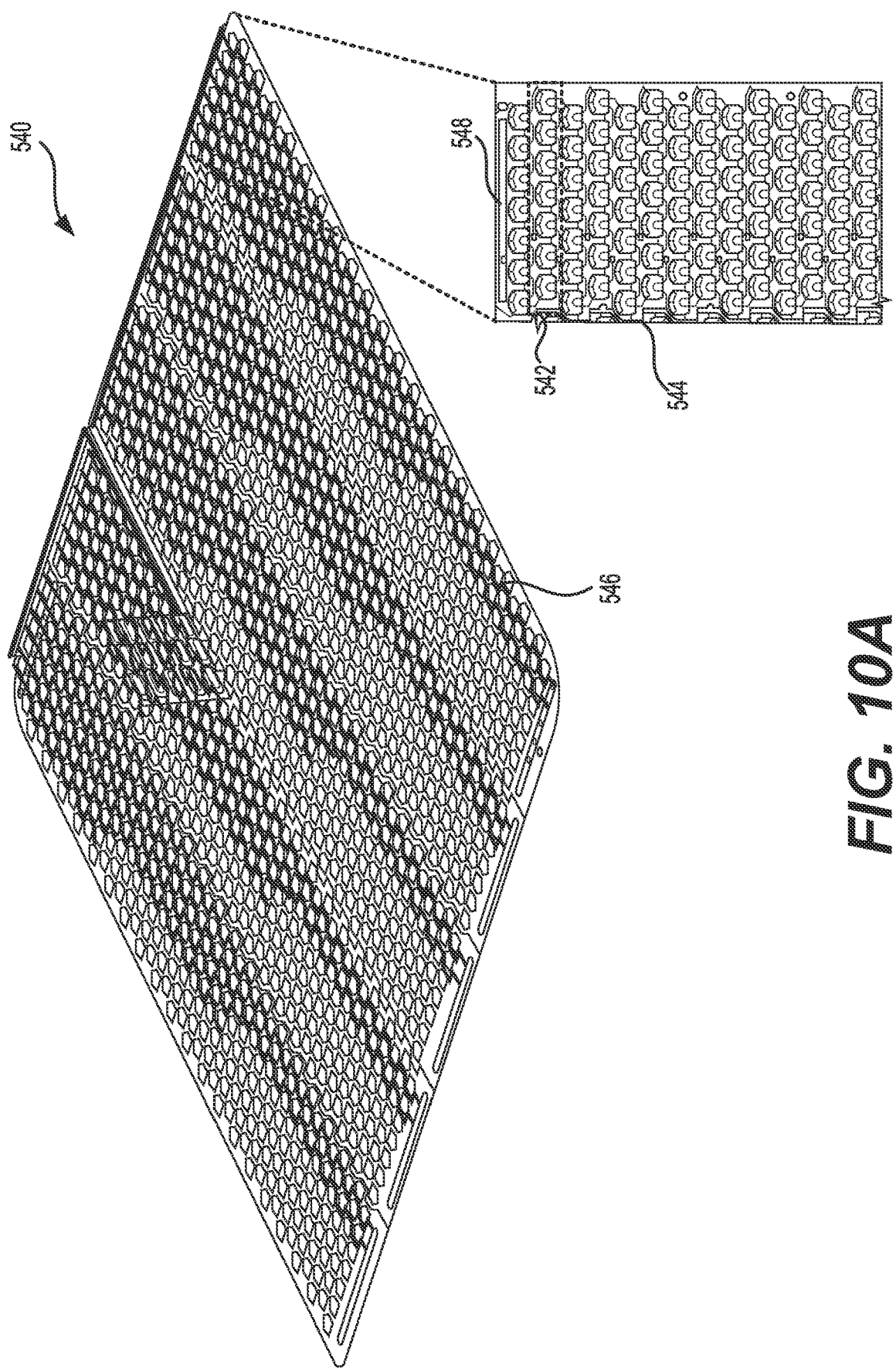
FIG. 10A is a diagram illustrating an exemplary architecture of a current collector assembly, consistent with some embodiments of the present disclosure.

FIG. 10A is a diagram illustrating an exemplary architecture of the current collector assembly 540, consistent with some embodiments of the present disclosure. In some embodiments, the current collector assembly 540 may be a flexible circuit current collector assembly with integrated sense components adhered and laser welded. In some embodiments, the sense components may be directly integrated into a flexible printed circuit board that is part of the current collector assembly, without the need for adhesion or welding. As shown in FIG. 10A, the current collector assembly 540 may include 5 columns of cells and components integrated onto one central cell holder 520. In some embodiments, the current collector assembly 540 may provide a single component integrating the current collectors and sense lines via lamination to implement a laminated busbar with an integrated sensing layer to sense the voltage and/or the temperature of the corresponding cell group 542 or corresponding cell block 544. For example, in each column, voltage and temperature sensing lines 546 may be arranged by lamination and configured to collect voltage traces at one end of the column.

In some embodiments, the current collector assembly 540 is bolted and welded to the aluminum bus bars 548 along with the main pack bus bars 560 used to connect the positive and negative ends of the cell stack assembly 124 to the HVJB 122. In some embodiments, the current collector assembly 540 is made by nickel-plated copper conductors attaching to individual battery cells 530 to form the electrical path for a desired cell combination. For example, the current collector assembly 540 has a 208S-7P pack architecture, which contains a series of 208 cell groups 542, and each cell group 542 includes 7 parallel cells. The current collector assembly 540 may integrate both voltage and temperature sense lines for each 14S-7P cell block 544. Each cell block 544 contains a series of 14 cell groups 542. That is, there are three cell blocks 544 per one column and a total of fifteen cell blocks 544 in the current collector assembly 540.

Figure 10B:
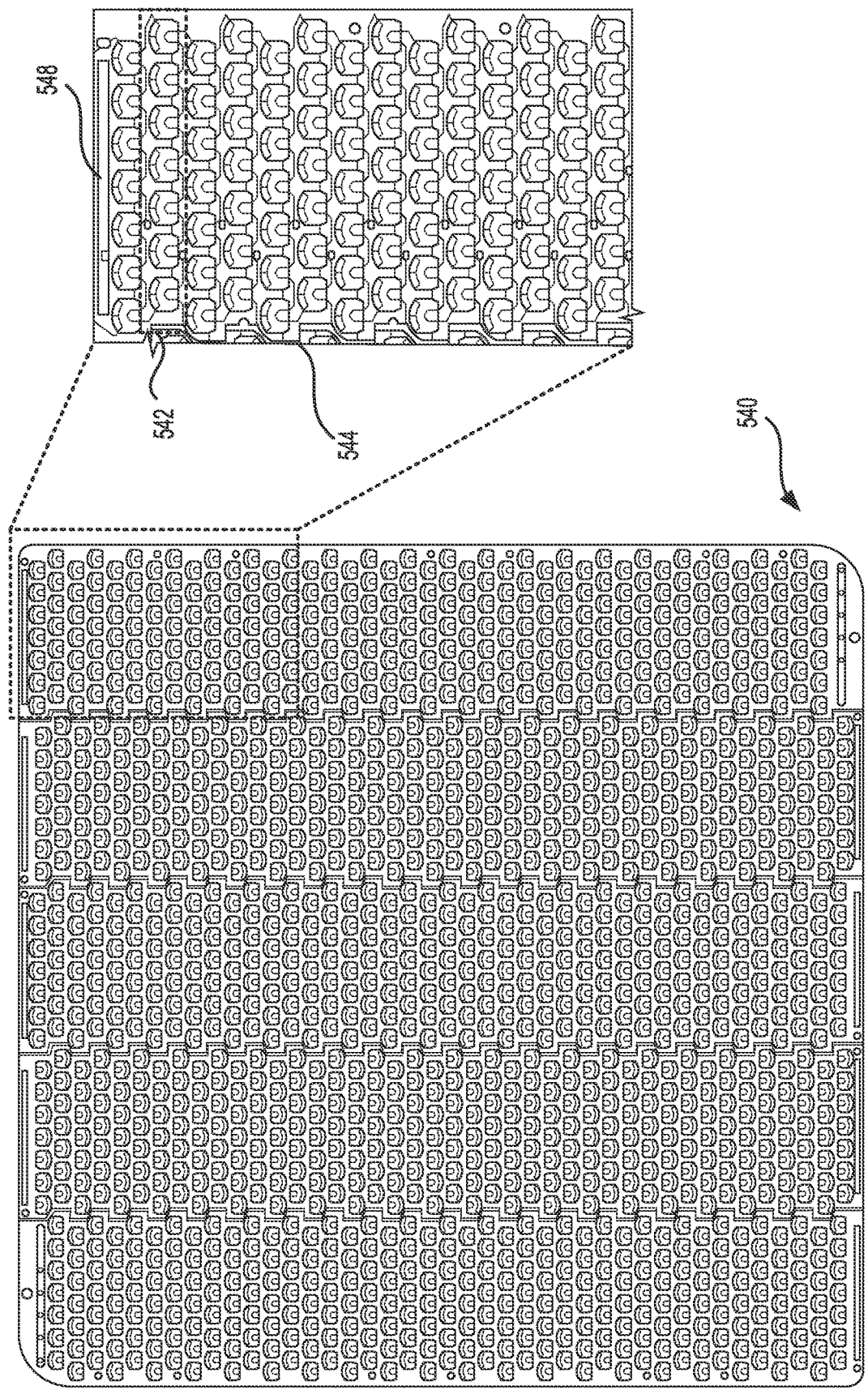
FIG. 10B is a diagram illustrating a top view of the current collector assembly of FIG. 10A at both the pack level and the cell block level, consistent with some embodiments of the present disclosure.

FIG. 10B is a diagram illustrating a top view of the current collector assembly 540 of FIG. 10A at both the pack level and the cell block level, consistent with some embodiments of the present disclosure. The current collector assembly 540 may be attached to the foam cell holder 520 using a pressure sensitive adhesive (PSA). The battery cells 530 within the foam cell holder 520 are welded to the current collector assembly 540 to form the electrical connection.

Figure 11:
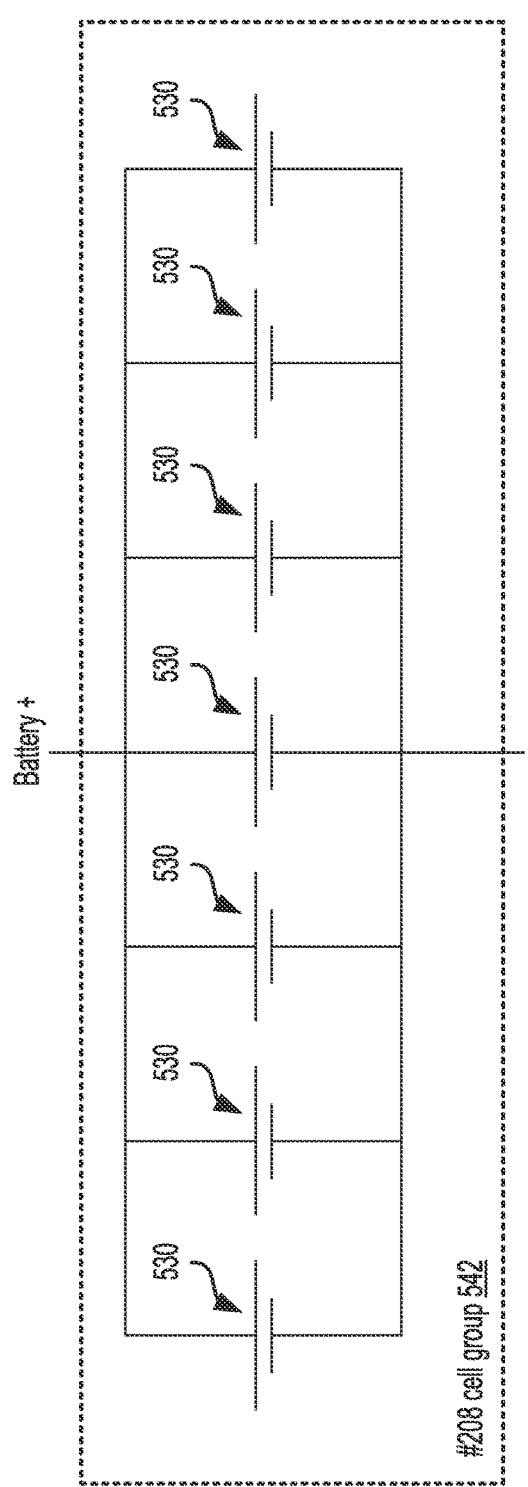
FIG. 11 is an exemplary circuit diagram illustrating the series and parallel arrangements of the battery cells forming the battery pack architecture shown in FIGS. 10A and 10B.
Figure 11:
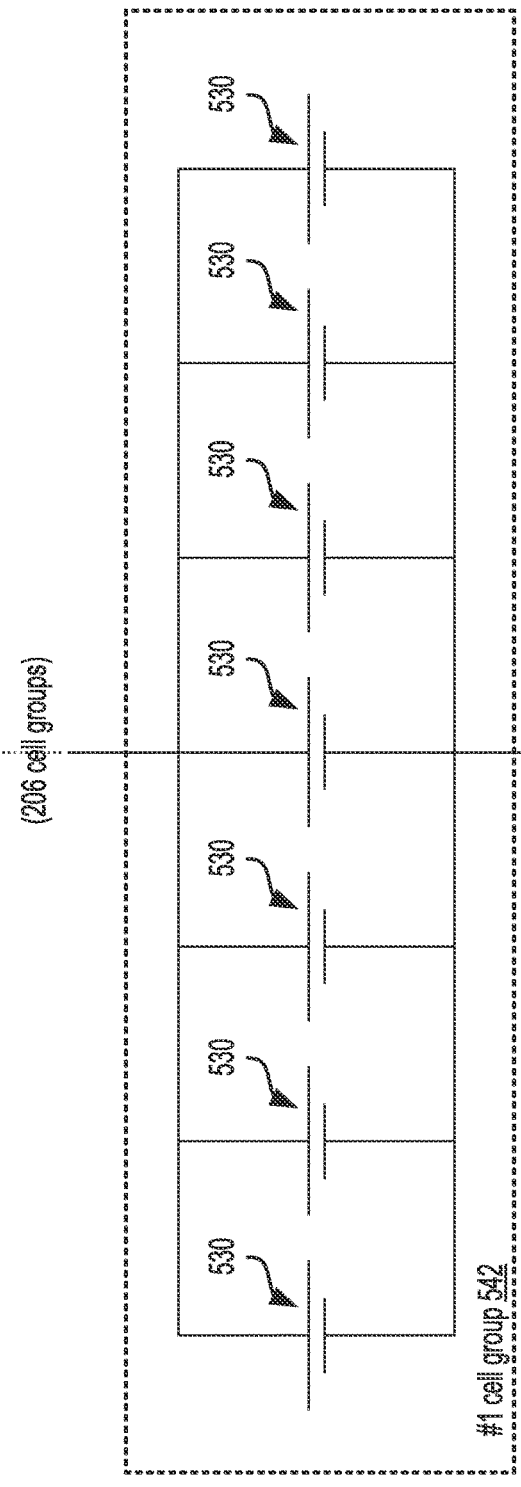

The current collector assembly 540 may form both the parallel and series connections of the battery pack 120 and enable electrical monitoring of each cell group and thermal monitoring of each cell block. Due to the 208S-7P pack architecture, when a battery cell 530 experiences an internal short, only the battery cells 530 in the same 7P cell group are exposed to the short circuit. FIG. 11 is an exemplary circuit diagram illustrating the series and parallel arrangements of the battery cells 530 forming the 208S-7P pack architecture shown in FIGS. 10A and 10B. In some embodiments, by this 208S-7P pack architecture shown in FIG. 11, the battery pack 120 is configured to provide a maximum voltage of 874 V (i.e., 4.2V for each cell group 542).

Figure 12:
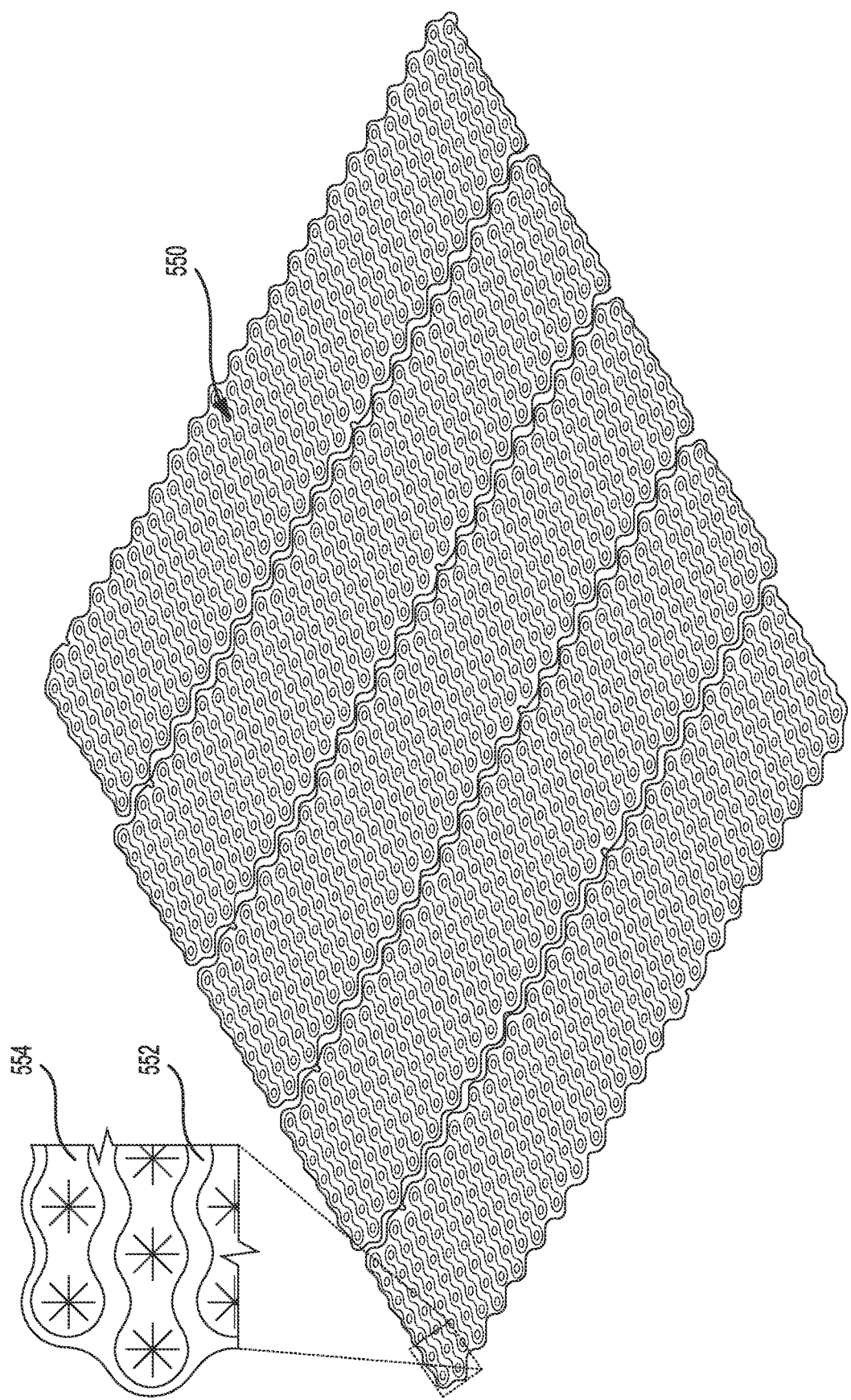
FIG. 12 is a diagram illustrating an exemplary vent flap assembly, consistent with some embodiments of the present disclosure.
Figure 13A:
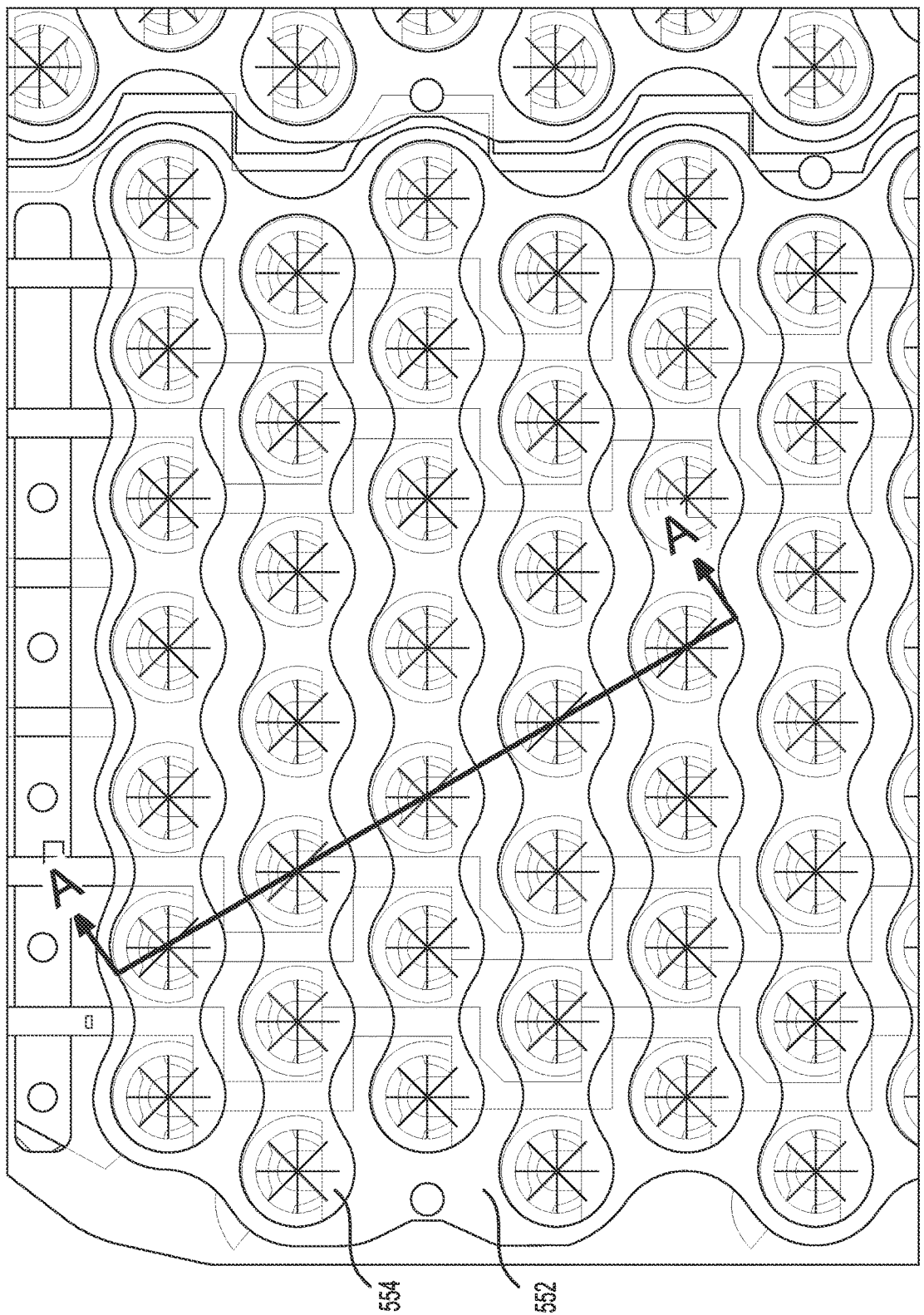
FIG. 13A is a diagram illustrating an enlarged portion of the vent flap assembly of FIG. 12, consistent with some embodiments of the present disclosure.

In some embodiments, insulative vent flaps may be placed over the welded current collector assembly 540. Reference is made to FIG. 12 and FIGS. 13A and 13B. FIG. 12 is a diagram illustrating an exemplary vent flap assembly 550, consistent with some embodiments of the present disclosure. FIG. 13A is a diagram illustrating an enlarged portion of the vent flap assembly 550 of FIG. 12, consistent with some embodiments of the present disclosure. FIG. 13B illustrates a cross-sectional view along the line A-A of FIG. 13A, consistent with some embodiments of the present disclosure. In FIGS. 13A and 13B, the vent flap assembly 550 is shown upside down relative to installed orientation.

Specifically, as shown in FIG. 12 and FIGS. 13A and 13B, the vent flap assembly 550 includes two layers 552 and 554, which may be flexible and able to resist elevated temperatures (e.g., transient high temperatures or continuous high temperatures). For example, when thermal runaway occurs, the temperature may be at around 800 degrees Celsius. The first layer 552 may be a compliant silicone foam layer with the PSA used to secure the vent flap assembly 550 onto the current collector assembly 540, but the present disclosure is not limited thereto. The second layer 554 is configured to protect neighboring cell groups 542 from cell ejecta and can be formed using materials such as flexible ceramics, thermoplastic polyimide, or any other materials in the same class sharing similar properties and characteristics. In addition to the star shape shown in FIG. 12, various designs can be used to achieve the vent flap assembly 550. For example, in some other embodiments, the vent flap assembly 550 may use relatively stiff, un-cantilevered elements to provide the structure which may be burst open by pressure, without extending too far out, in a runaway thermal event. The vent flap assembly 550 may use various shapes that allow a deformation of cantilevered portion(s) for enabling the venting. For example, a honeycomb structure for battery cell arrangement may be applied, but the present disclosure is not limited thereto.

FIGS. 13A and 13B show the series connections, in addition to a venting manifold 556 and a cell headspace 558 in the vent flap assembly 550. In some embodiments, the cell headspace 558 provides an open volume (e.g., with about a height of 20 mm) between the pack lid 570 and the second layer 554 for getting gases out and reducing convective heat transfer between different cell groups. In some embodiments, the battery pack 120 may also provide a battery pack vent (e.g., another one-way valve), which may be an off-the-shelf device. In some embodiments, during a cell outgassing event, the gas released by the affected cell is contained and channeled downward by the foam cell holder 520 where it enters the space below the cell and enclosed by the silicone foam layer 552 and the polyamide thermoplastic layer 554. This space may be referred to as the venting manifold 556 and is interconnected for the cells belonging to one cell group. The venting manifold 556 does not interconnect to other cell groups as it is separated by the PSA compliant silicone foam layer 552. When the pressure in the venting manifold 556 rises, the flaps on the polyamide thermoplastic layer 554 open, allowing gasses and potentially ejecta to enter the headspace 558 below the vent flap assembly 550. Accordingly, the vent flap assembly 550 may provide a one-way valve placed on-top of the cells and the current collector assembly 540 to safely vent a cell that has gone into thermal runaway while also protecting neighboring cells from the heat and ejecta of the failed cell.

Figure 14:
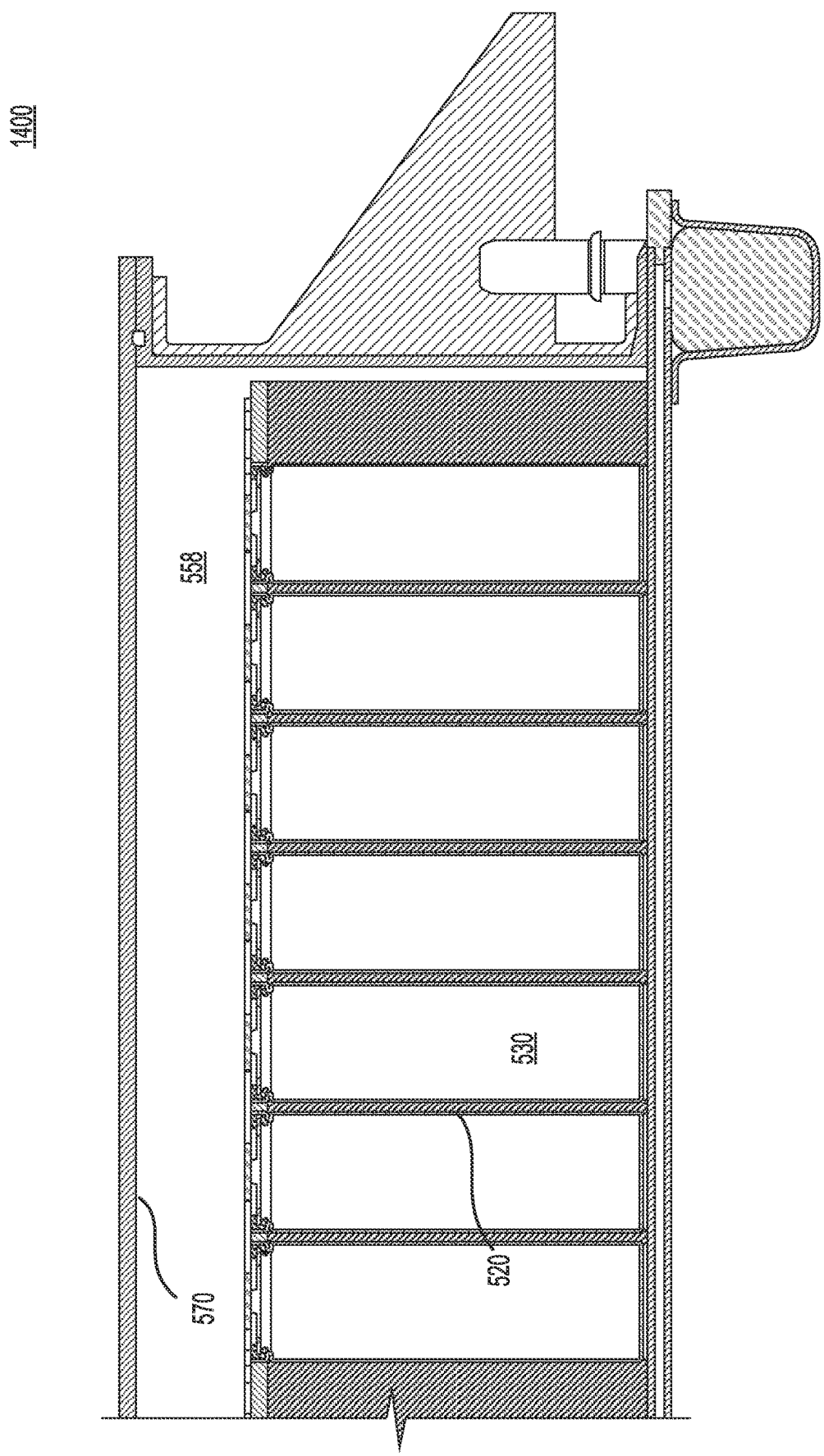
FIG. 14 is a diagram illustrating a cross-sectional view of a battery pack enclosure including head space directly above a vent flap assembly, consistent with some embodiments of the present disclosure.

FIG. 14 illustrates a cross-sectional view of a battery pack enclosure 1400 including the head space directly above the vent flap assembly 550, consistent with some embodiments of the present disclosure. Similar to FIGS. 13A and 13B, the structure in FIG. 14 is shown upside down relative to installed orientation. As shown in FIG. 14, the battery pack enclosure 1400 provides a structural interface for mounting the battery pack 120 to the primary aircraft structure, houses the entire 208S-7P cell stack assembly 124, and is connected to the heat exchanger. In some embodiments, the battery pack enclosure 1400 may provide a 20 mm headspace 558 between the pack lid 570 and the cell stack to reduce convective heat transfer between cell groups.

Accordingly, the battery pack enclosure 1400 includes a defined path for the vent gas to escape through a pressure relief safety device (e.g., a burst valve) that prevents the battery pack 120 from over pressurizing. The pack vent may be a dual stage system that is used to provide pressure equalization between the battery pack 120 and the environment during normal operation. The vent interfaces with a duct that vents battery emissions out of the aircraft 100. Aside from the vent path, the battery pack enclosure 1400 may be sealed such that cell electrolyte leakage is retained in the enclosure and does not drain into the aircraft 100 where it could pose a hazard.

Figure 15:
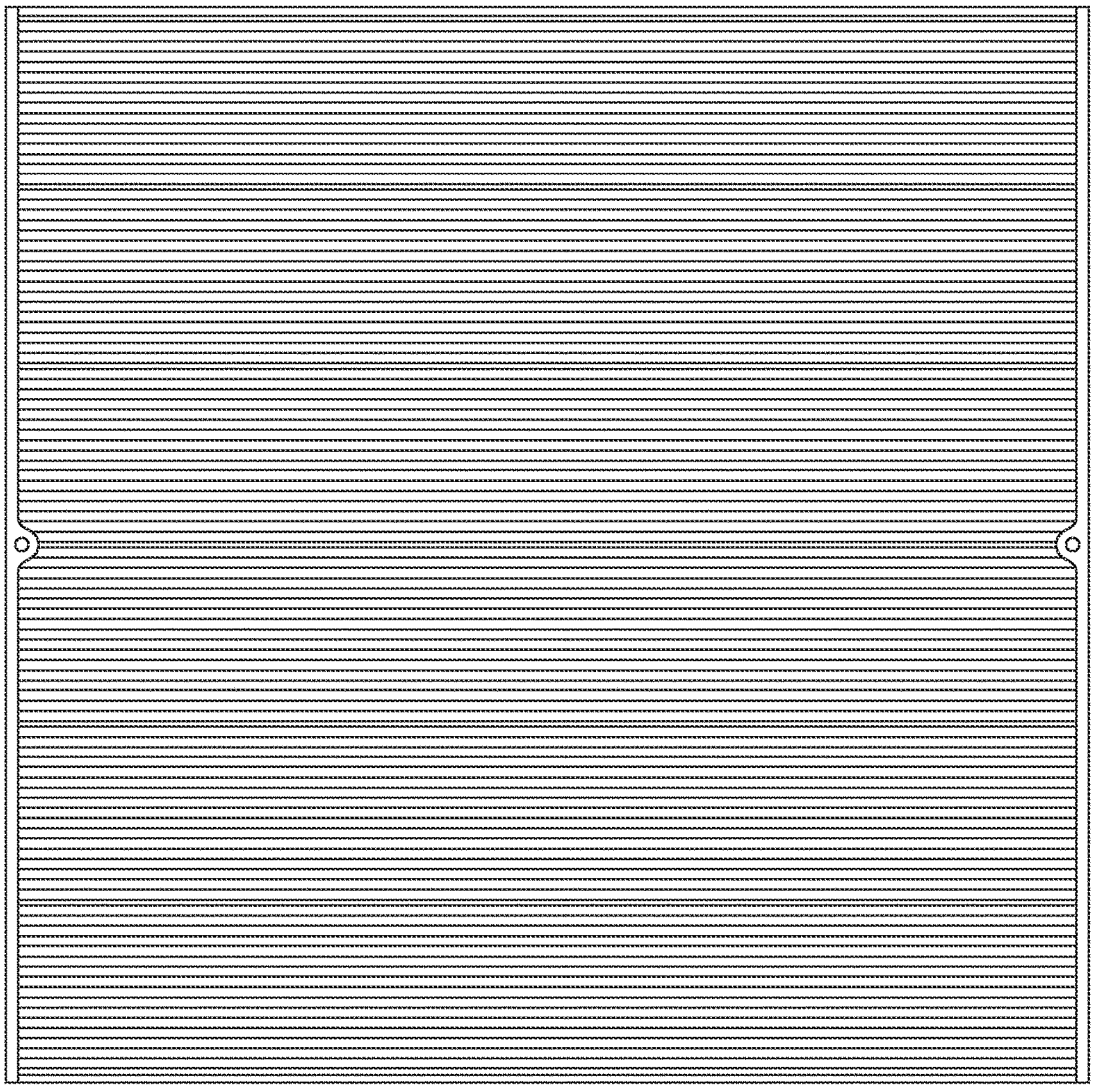
FIG. 15 illustrates an exemplary heat exchanger plate, consistent with some embodiments of the present disclosure.

FIG. 15 illustrates an exemplary heat exchanger plate 1500, consistent with some embodiments of the present disclosure. The heat exchanger plate 1500 may be affixed to the battery pack enclosure 510 to enable regulation of the temperature within the battery pack 120 using thermally conditioned fluid, e.g., Ethylene Glycol Water (EGW), ethylene glycol, polyethylene glycol, water, or any combinations thereof, for heating and cooling. In some embodiments, the active thermal regulation can be used only while the aircraft 100 is on the ground. The heat exchanger plate 1500 may be sized to support the required heating or cooling needs while operating within nominal pressure and flow rate conditions. For example, the heat exchanger plate 1500 can be bonded to the battery pack enclosure 510 using a thermally conductive adhesive (e.g., a flame-retardant acrylic adhesive). The thermally conductive adhesive can be used to conduct the heat generated by the cells to the heat exchanger plate 1500.

FIGS. 16A-16D respectively illustrate different designs for the battery cooling in the HV cooling distribution subsystem, consistent with some embodiments of the present disclosure. Some item numbers may be illustrated at FIG. 16A, and omitted for clarity in subsequent figures. As discussed above, the aircraft 100 may include, e.g., six battery packs 120. In some embodiments, another number of battery packs 120 may be provided such as, e.g., two, four, eight or ten battery packs 120, etc. In some embodiments, an even number of battery packs may be provided to achieve a symmetrical distribution of weight within aircraft 100. In some embodiments, an odd number of battery packs 120 may be provided. For example, for configurations in which a battery pack 120 is able to be safely housed in a central location of aircraft 100, then a central battery pack 120 may be provided having an equal number of battery packs 120 arrayed on either side of it.

Each battery pack 120 may include a heat exchanger inlet 1621 and a heat exchanger outlet 1622 for circulating coolant to achieve the battery cooling. In FIGS. 16A-16D, different coolant line architectures are illustrated, each of which may provide a single main inlet 1610 and main outlet 1650 within the aircraft 100. Main inlet 1610 and main outlet 1650 may be configured receive coolant from, and discharge coolant to, a ground-based coolant supply system and circulate coolant via inlet path 1611 and outlet path 1651. Inlet path 1611 and outlet path 1651 may comprise conduits formed from, e.g., rigid or semi-rigid piping, flexible hoses, integrally formed channels or a combination of these or other suitable materials. The collection of such piping along with associated fixtures, fittings, inlets and outlets for distributing coolant to the heat exchangers in each battery pack 120 may be referred to as a fluid conveyance assembly. Configurations according to embodiments of the present disclosure enable the coolant to be distributed evenly and in parallel to the plurality of battery packs 120 installed inside the wings of the aircraft 100, without a need for active control components. The arrangements of FIGS. 16A-D may be configured to reduce the total diameter, running length and number of fittings of inlet and outlet paths 1611/1651, thereby minimizing both the dry and wet weight of the cooling system. Providing a single main inlet and outlet within the aircraft 100 allows quick attachment to, and detachment from, a ground-based coolant supply, thereby enabling rapid turnaround between landing and takeoff. Thus, flight schedule downtime may be advantageously reduced. Alternatively, cooling time may be effectively increased for a given landing period. In some embodiments, the battery cooling may be achieved without using on-board pumps or other active flow control components. Instead, an external pump (e.g., on a ground-based coolant supply system outside the aircraft 100) may be used to circulate the coolant in the battery packs 120, for example at the same time that the battery packs 120 are charging.

In some embodiments, the cooling operation may be performed without exceeding an overall system pressure limit (e.g., less than 100 psi), and thus no special connectors may be needed. The cooling system may be a passive system without additional components for performing active control methods to balance the flow across multiple battery packs 120. Thus, the weight of the system can be minimized. Furthermore, the passive cooling system may offer a simplified design to lower production costs and remove failure points.

To charge the multiple battery packs 120 installed inside the wings of the aircraft 100 at a certain charging rate, it is desirable to condition the battery packs 120 such that their respective temperatures are as close as possible to one another. Accordingly, coolant line architectures according to the present disclosure may be designed to maintain a substantially uniform rate of cooling by improving the coolant flow distribution and the temperature distribution. In addition, it may be desirable to arrange the main inlet 1610 and main outlet 1650 on a same side of aircraft 100. Stated another way, the main inlet 1610 and main outlet 1650 may be arranged on, e.g., a same side of a center of the fluid conveyance assembly 1601. Stated still another way, the main inlet 1610 and main outlet 1650 may be arranged closer to a first half of the plurality of battery packs 120 than to a second half of the plurality of battery packs 120. This may allow for convenient ingress and egress of passengers, enabling a cooling maintenance operation to be performed in parallel with the loading and unloading of passengers and cargo.

In some embodiments, main inlet 1610 and main outlet 1650 may be located adjacent each other, or within a single fixture so that a supply and return line of the ground-based coolant supply may be attached by a single nozzle attachment. Further, in some embodiments, main inlet 1610 and main outlet 1650 may be made integral with other maintenance attachments such as, e,g., a charging port to enable a rapid connection of all maintenance utilities. This may allow for simpler maintenance operations or enable the operations to be performed by autonomous devices. Furthermore, while reference is made to a ground-based cooling supply, embodiments of the present disclosure are not limited to this. For example, in some embodiments, coolant and electrical power may be provided by, e.g., an air-based coolant supply and rapid charging station. Air-based coolant and charging stations may comprise, e.g., a dedicated VTOL or CTOL aircraft configured to meet and/or follow aircraft 100 midair to provide coolant or charging to aircraft 100. This may, e.g., enable longer uninterrupted flights or provide emergency maintenance service in areas where landing is suboptimal or impossible. Therefore, in some embodiments, main inlet 1610 and main outlet 1650, along with charging ports, etc., may be provided within a self-docking fixture for mid-flight attachment and detachment.

Figure 16A:
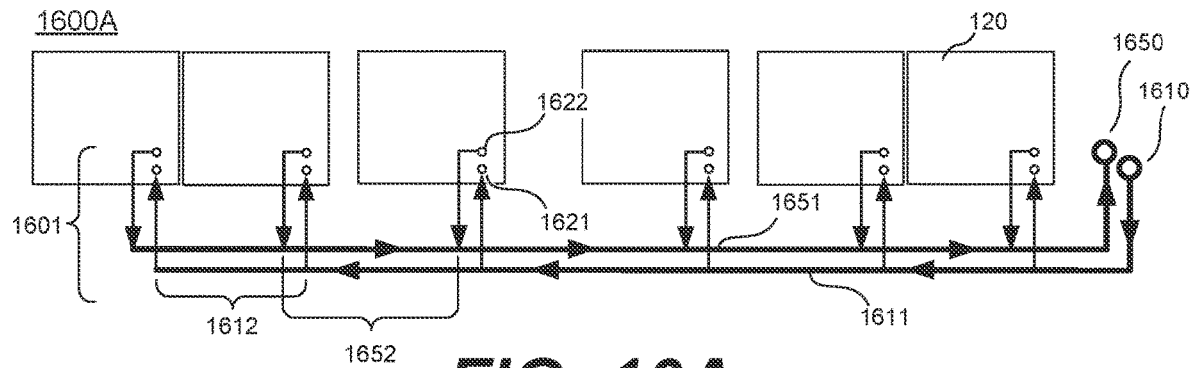
FIGS. 16A-16D illustrate different designs for battery cooling in a HV cooling distribution subsystem, consistent with some embodiments of the present disclosure.

In FIG. 16A, a "U-flow" type cooling system 1600A is provided. Cooling system 1600A may comprise a plurality of heat exchangers corresponding to a plurality of battery packs 120, and a fluid conveyance assembly 1601. In the fluid conveyance assembly 1601 of FIG. 16A, main inlet 1610 and the main outlet 1650 may be arranged in proximity to each other or on the same side of aircraft 100. The coolant flow may enter the battery packs 120 in parallel, and return to the main outlet 1650 to create a structure with a generally "U" shape in the schematic view. In some embodiments, inlet path 1611 and/or outlet path 1651 may comprise a plurality of segments 1612 and 1652, respectively, between each branch leading to a heat exchanger inlet 1621 or heat exchanger outlet 1622. As discussed further below, the segments may be differently sized to provide a balanced flow to each battery pack 120.

In some embodiments, the U-flow design may comprise a "first in last out" architecture, such that the first battery pack 120 to receive coolant from inlet path 1611 in the inlet flow direction may be the final battery pack 120 to discharge coolant to the outlet path 1651 in the outlet flow direction. The result is a difference in path lengths for the individual coolant flow loops running through each individual battery pack. For example, as viewed in FIG. 16A, coolant flowing through the right-most battery pack 120 may follow the shortest loop between main inlet 1610 and main outlet 1650, while coolant flowing through the left-most battery pack 120 may follow the longest loop. While this U-flow arrangement allows a desirable placement of main inlets and outlets 1610/1650 in proximity to each other, it may also result in pressure and flow rate imbalances if not properly accounted for. Some embodiments of the present disclosure provide systems and methods for passively maintaining a balanced flow while still keeping the main inlet 1610 and main outlet 1650 together.

Figure 16B:
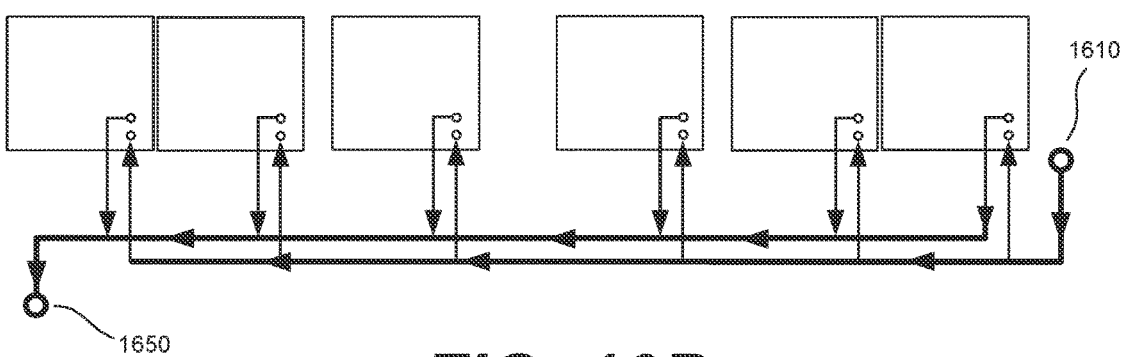

FIG. 16B illustrates an alternative "Z-flow" type cooling system 1600B. In the Z-flow architecture, the main inlet 1610 may be located on one side of aircraft 100 and the main outlet 1650 may be located on the other side to create a structure with a generally "Z" shape in the schematic view. The Z-flow type coolant line architecture 1600B may allow the coolant entering each of the six battery packs 120 to have identical path lengths, which may be desirable for optimized flow distribution and temperature distribution. For example, unlike the U-flow design above, the order of heat exchanger inlets and outlets in the Z-flow design may comprise a "first in first out" architecture, such that, along a coolant flow path, a first battery pack 120 to receive coolant from inlet path 1611 in the inlet flow direction may also be a first battery pack 120 to discharge coolant to the outlet path 1651 in the outlet flow direction. The result is a total coolant path length that is substantially the same for all battery packs. For example, the battery pack having the shortest distance to main inlet 1610 may have the longest distance to main outlet 1650.

In either the U-flow or Z-flow type coolant line architectures 1600A and 1600B, flow distribution in battery packs 120 may be balanced by, e.g. varying an inside diameter among different segments of the inlet or outlet paths. For example, an inlet path segment immediately upstream of the right-most (first in) battery pack 120 in FIG. 16B may be sized to provide coolant to all battery packs 120, while an inlet path segment immediately upstream of the left-most (last in) battery pack 120 may only be sized to accommodate one battery pack. Therefore, in some embodiments an inside diameter of inlet path segments may successively decrease in the inlet path direction. In some embodiments, the reverse arrangement may be configured for the outlet path of FIG. 16B. For example, an inside diameter of outlet path segments may successively increase in the outlet path direction. Thus, a coolant flow architecture may be provided which uses a minimal piping or hose size at each segment along the supply and return paths, thereby further minimizing wet and dry weight of the cooling system.

Figure 16C:
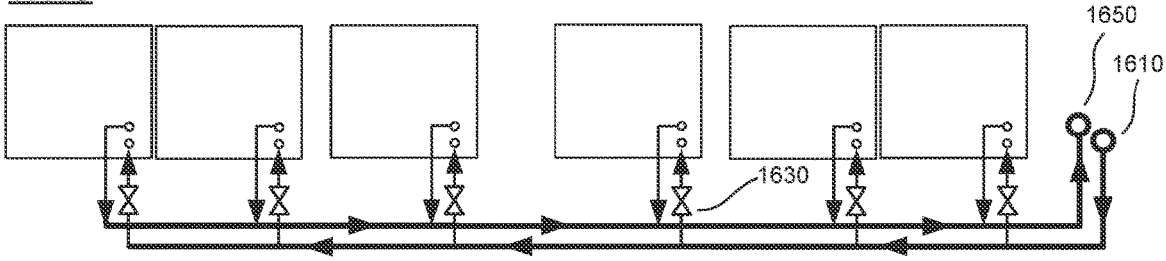

To keep the main inlet 1610 and the main outlet 1650 on the same side of aircraft 100 while simultaneously maintaining a balanced flow, in FIG. 16C a modified "U-flow" type cooling system 1600C is provided, in which customized flow restrictors 1630 may be respectively arranged along the inlet (and/or outlet) path between the main inlet 1610 (and/or main outlet 1650) and one or more of the battery packs 120. In other words, the coolant may flow through the customized flow restrictor 1630 before flowing into the corresponding battery pack 120. Each customized flow restrictor 1630 may provide a desired flow resistance to achieve the proper amount of the coolant flow and balance the flow entering each of the battery packs 120. For example, in the cooling system 1600C, the flow restrictor 1630 may include a sizing orifice to provide equal pressure drops from the common main inlet 1610 to each battery pack 120. This may ensure even flow distribution of the coolant to each battery pack 120. In this way, a cooling architecture may function efficiently without the need to provide multiple different piping diameters or equivalent path lengths.

Figure 16D:
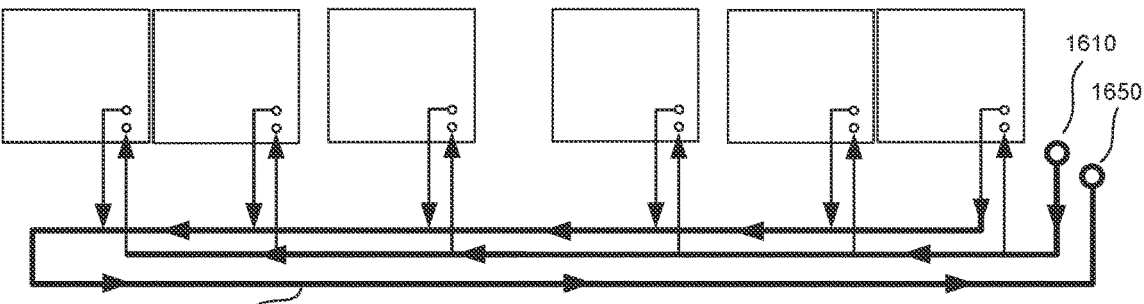

In FIG. 16D, a modified "Z-flow" type cooling system 1600D is illustrated, in which an in-flight return path 1640 is added. The in-flight return path 1640 may comprise an additional leg of the outlet path 1651 installed inside, e.g., a wing of aircraft 100. By providing the in-flight return path 1640, the main inlet 1610 and main outlet 1650 may be located on the same side of aircraft 100, while the flow distribution in battery packs 120 may still be balanced by using, e.g., a Z-flow architecture. Similar to the Z-flow type cooling system 1600B, in some embodiments this this design may comprise differently sized piping segments or a plurality of differently sized orifices.

Additionally, by providing segments with successively increasing/decreasing inside diameters, by using flow restrictors and/or by providing equivalent path lengths for each loop as discussed above, embodiments of the present disclosure may achieve a symmetrical architecture configured to provide even flow characteristics whether the coolant is being circulated in the forward or reverse direction. For example, in some embodiments a coolant architecture may be configured for symmetrical flow in both directions. This may allow for improved cooling uniformity by alternately cycling the coolant in different directions as further discussed below with respect to, e.g., FIG. 20.

Therefore, while elements in FIGS. 16A-D and others may be referred to by terms such as "inlet" and outlet," it should be understood that in some embodiments, said elements may be configured to provide coolant flow in either direction. By way of example, in some embodiments, main inlet 1610 may function as a first main inlet-outlet, main outlet 1650 may function as a second main inlet-outlet, heat exchanger inlet 1621 may function as a first heat exchanger inlet-outlet, and heat exchanger outlet 1622 may function as a second heat exchanger inlet-outlet. Further, in some embodiments the entire cooling system between the first and second main inlet-outlets may be provided without check valves or other unidirectional flow fixtures to allow the performance of such reverse flow operations. Additionally, to ensure symmetrical flow characteristics in forward and reverse flow directions, in some embodiments the inlet path 2011 and the outlet path 1651 may have a substantially equal lengths.

Figure 17:
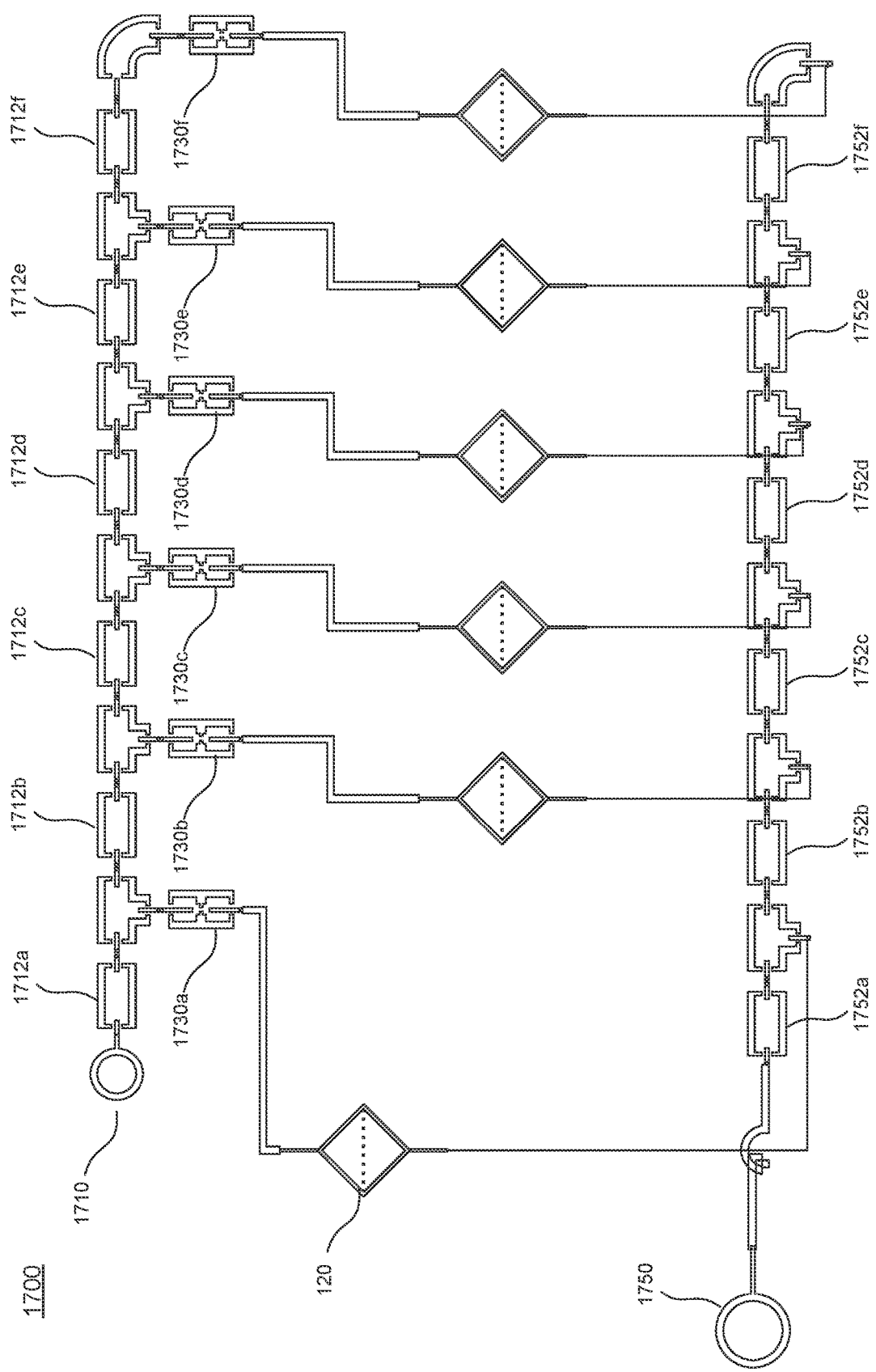
FIG. 17 illustrates an exemplary battery cooling system based on the coolant line architecture of FIG. 16C, consistent with some embodiments of the present disclosure.

FIG. 17 illustrates an exemplary battery cooling system 1700 based on the cooling system of FIG. 16C, consistent with some embodiments of the present disclosure. As discussed above, the aircraft 100 may include a common main inlet 1710 and a common main outlet 1750 for receiving and discharging coolant. Coolant may flow into each of a plurality of battery packs 120 in parallel after flowing through their respective flow restrictors 1730 added to the tubing associated with the plurality of battery packs. In some embodiments, the respective flow restrictors 1730 may have different lengths and/or orifice sizes according to the desired flow characteristics. For example, the orifice sizes may increase along an inlet flow direction to compensate for the pressure drop that occurs as coolant is branched off towards upstream battery packs 120. As a non-limiting example for illustrative purposes, flow restrictors 1730a-f may have orifice sizes in an inlet flow direction of, e.g., 3.7 mm, 4.1 mm, 4.65 mm, 6.8 mm, 10 mm, and 12.5 mm, respectively, with a the tube diameter of, e.g., about 20 mm or 0.5 inches. Flow restrictors may be arranged at an upstream or downstream side of battery packs 120. For example, the flow restrictor embodiment may be compatible with the reverse flow operations disclosed herein, In some embodiments, a total flow rate of the cooling system may be designed to be about, e.g., 60 liters per minute (LPM). That is, an individual flow rate may be about 10 liters per minute for each of six battery packs 120. However, the present disclosure is not limited thereto. In general, any suitable total flow rate may be subdivided substantially equally among battery packs 120 . . . . In some embodiments, for example, the flow rate through the heat exchangers of each battery pack 120 may deviate from the average among all battery packs 120 by no more than, e.g., 5%, 2%, 1%, 0.5% or less. The cooling system may also be robust to coolant flow and distribution errors. For instance, continuing from the example above, if a maldistribution within the cooling system leads to the coolant being distributed among the six battery packs 120 at a doubled flow rate of 120 liters per minute, each pack may receive an average flow rate of 20 liters per minute. The differential pressure of the battery pack 120 may be about 20 psi for the flow rate of 10 liters per minute, and about 40 psi for the flow rate of 20 liters per minute, by way of example.

In some embodiments, alternatively or in addition to providing flow restrictors 1630a-f, various segments 1712 and 1752 of inlet and outlet paths of cooling system 1700 may comprise different inside diameters as discussed above. For example, an inlet path may comprise six segments 1712a-f, and an outlet path may comprise six segments 1752a-f. Inlet segments 1712a-f may be configured to provide successively reduced flow rates in the inlet flow direction. Alternatively or additionally, outlet segments 1752a-f may be configured to provide successively increased flow rates in the outlet flow direction.

Figure 18:
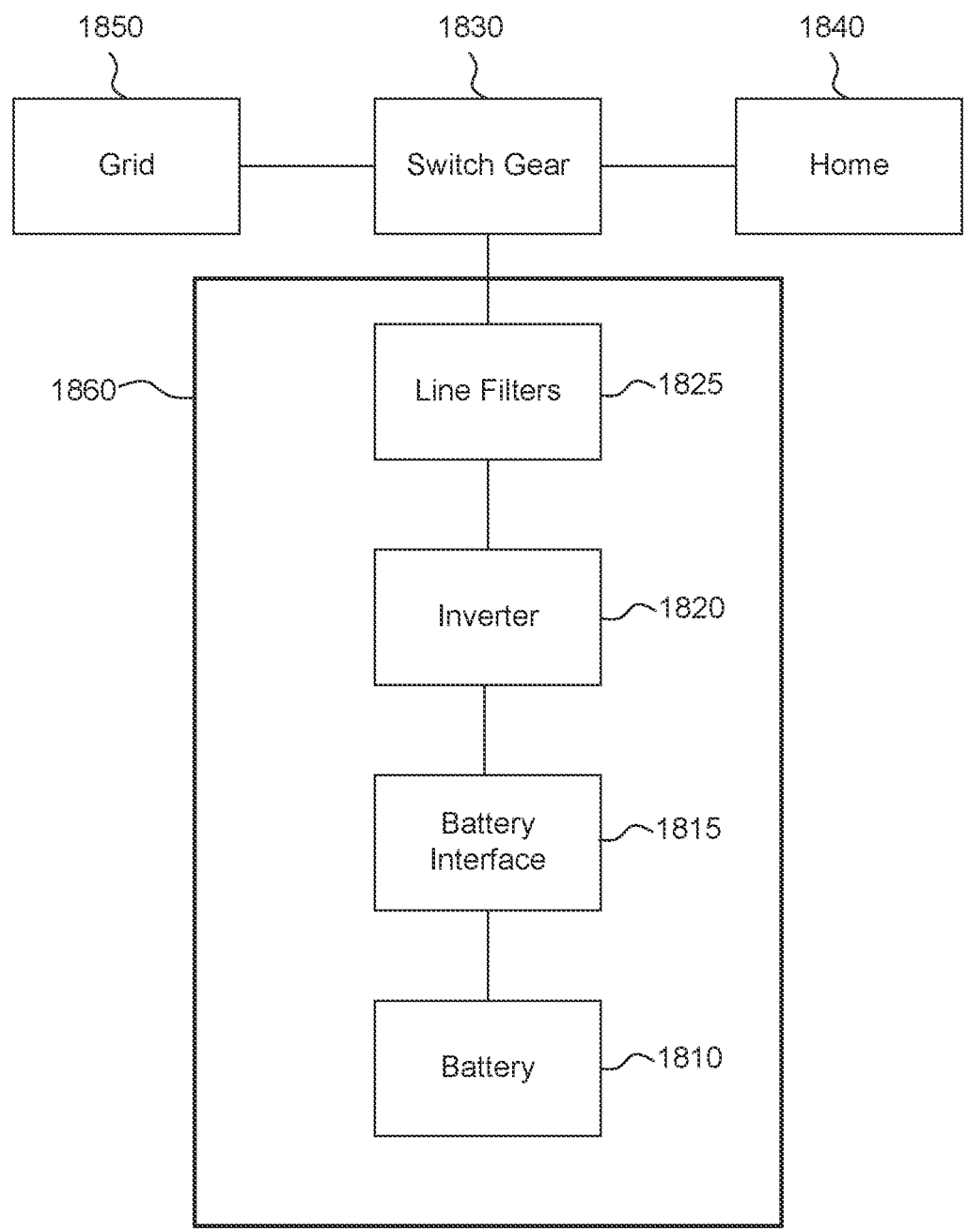
FIG. 18 illustrates an exemplary home system, consistent with some embodiments of the present disclosure.

Reference is made to FIG. 18. FIG. 18 illustrates an exemplary home system 1800, consistent with some embodiments of the present disclosure. It is understood that batteries and/or battery systems used in a demanding application within aircraft, e.g., a high voltage battery produced for primary use in powering an eVTOL aircraft, causes progressive degradation of battery characteristics, and that such batteries and/or battery systems become unusable in that primary application over time. The typical parameters indicating this degradation are reduction in energy storage capacity below a threshold, increased temperature rise under conditions of higher stress (current, power) encountered in aircraft usage, increase in internal resistance/impedance of the battery or battery system, and reduction in power delivery capacity to a level below demands of a host device of the aircraft. Such high voltage batteries or battery systems, however, may continue to be useful in other secondary applications including but not limited to domestic power supply systems, rural energy storage systems, and other backup power systems including large scale power grid and domestic power grid backup systems. For example, a secondary application of such batteries and/or battery systems may comprise providing power to a residence, wherein a repurposed battery or battery system may be used as an energy source for providing power to a residence, and wherein a battery or battery system may directly connect to a home system inverter and power supply.

In some embodiments of the disclosure, a high voltage battery used originally in an aircraft may be repurposed for secondary use with high reliability. In some embodiments, a high voltage battery may be an eVTOL aircraft battery. In some embodiments, the high voltage battery may have been originally designed, ab initio, for the original use and also for repurposing for the secondary use. For example, the high voltage battery may have been originally designed such that minimal modifications may be necessary before it is repurposed for the secondary use. As an example, the high voltage battery may be designed originally to comprise a removable high voltage junction box including a battery management system, such that modification for the secondary use may involve exchanging the original junction box with another junction box (including a different battery management system) that is configured for the secondary use. As another example, the high voltage battery may be designed to work with an inverter that is compatible with both the original use and the secondary use. For example, the inverter's voltage, current, power, temperature, humidity, and other ratings may be configured such that the inverter may be suitable for both the original use and the secondary use. As another example, the high voltage battery may be configured with a battery interface that is compatible with the interfaces in both the original use (e.g., eVTOL aircraft) and the secondary use (e.g., a home energy storage system), such that when the high voltage battery is repurposed for the secondary use, no changes need be made to the battery interfaces.

In some embodiments, a secondary use may be for installation within and providing power for a home system (i.e., a home electrical power system). In some embodiments, a home system may be a utility system which powers various subsystems of a residential home, a group of residential homes, a commercial place of business, or an industrial premise. In some embodiments, a home system may comprise an electronic switching system (ESS). As illustrated in the example of FIG. 18, a home system 1800 may comprise a repurposed battery 1810, which is coupled to a battery interface 1815, which is coupled to an inverter 1820, which is coupled to one or more line filters 1825. In some embodiments, the battery 1810, battery interface 1815, inverter 1820, and the one or more line filters 1825 may comprise an electronic switching system 1860 of the home system 1800. In some embodiments, the battery interface 1815 may be a DC/DC interface. In some embodiments, such an exemplary electronic switching system 1860 may be connected to one or more home electrical lines 1840 via a switching network (i.e., switch gear) 1830. In some embodiments, the switching network 1830 may be configured to allow for powering of the home electrical lines 1840 either via the electronic switching system 1860 or via an external electrical power grid 1850.

Figure 19:
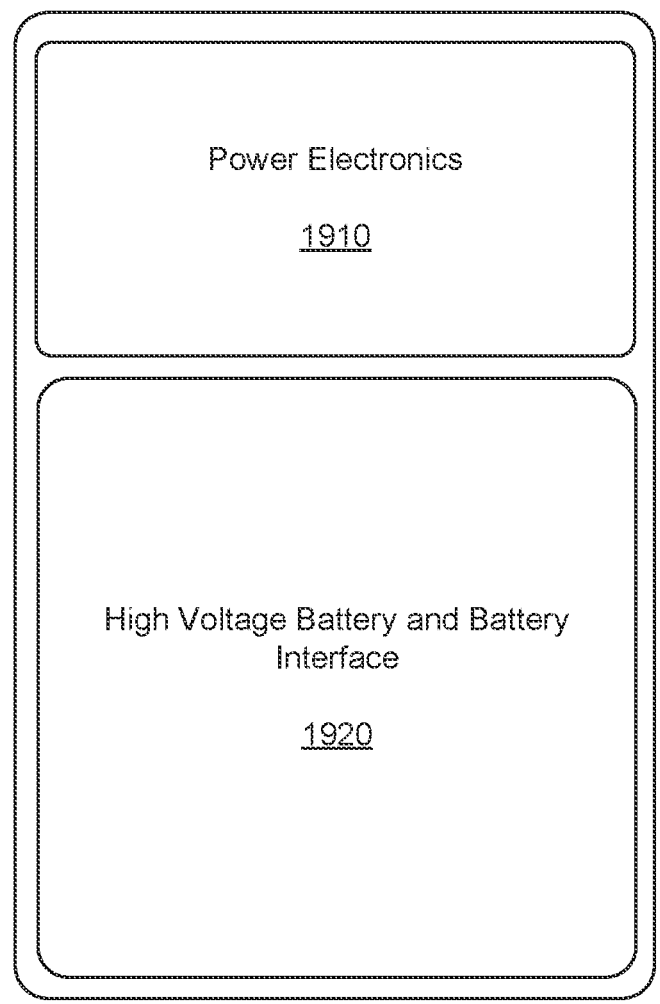
FIG. 19 illustrates an exemplary electronic switching system for the exemplary home system illustrated in FIG. 18, consistent with some embodiments of the present disclosure.

Reference is made to FIG. 19. FIG. 19 illustrates an exemplary electronic switching system 1900 for the home system 1800 illustrated in FIG. 18. As illustrated in the example of FIG. 19, an electronic switching system 1900 may comprise a repurposed HV battery and battery interface 1920, wherein the battery interface comprises a battery management system (BMS), and power electronics 1910 which comprise an inverter and one or more line filters. In some embodiments, such an exemplary electronic switching system 1900 may be connected to one or more home electrical lines via a switching network (i.e., switch gear). In some embodiments, the switching network may be configured to allow for powering of the home electrical lines either via the electronic switching system or via an external electrical power grid. In some embodiments, an inverter within the power electronics 1910 of the electronic switching system 1900 may be configured to have minimal total harmonic distortion (THD) such that minimal filtration is required for connecting the electronic switching system to a utility bus, thereby providing minimal harmonic distortion in any power returned to an external power grid connected to the electronic switching system 1900 and a home system.

Continuing with reference to FIGS. 18 and 19, in some embodiments, the repurposed battery may be a high power (i.e., HV) battery comprising high power cells which may allow for increased power applications in a home electrical system 1840. As an example, one or more of such HV batteries comprising high power cells may be utilized for DC fast charging (DCFC) applications in a home. In some embodiments, a DCFC application may comprise DCFC of an electronic vehicle (EV) at significantly higher rates than currently possible. For example, two high power batteries comprising high power cells, as described herein, may be used in a home system to charge an EV in about 40-80% of the time typically required by a V3 Supercharger, and about 25 times faster than extant home EV charging stations. As another example, in order to further support DCFC applications via an electrical switching system 1900, a custom DC/DC battery interface may be required to support DCFC performance. As a result, in some embodiments, a custom DC/DC battery interface may be minimized in size, optimized for efficiency, and/or include control logic, sensors, and/or communication interfaces which further support, e.g., DCFC of vehicles via an electronic switching system 1900 for a home.

With further reference to FIG. 19, in further embodiments wherein the repurposed battery is a high power battery comprising high power cells, the repurposed battery may further have low resistance. In some embodiments, the repurposed battery may further generate low amounts of heat as compared to extant home electrical switching system batteries. As a result, in some embodiments, the repurposed battery may be utilized as a heat sink for an inverter. As a further result, in some embodiments, such an inverter may not require any additional forced cooling for operation. As yet a further result, in some embodiments, an electrical switching system comprising a high power battery comprising high power cells may be a quieter and/or more compact system.

Continuing with reference to FIGS. 18 and 19, in some embodiments, the home system may comprise batteries 1810 in parallel, wherein at least one of the batteries 1810 in parallel is a repurposed battery. In some embodiments, no additional equipment may be required to add further capacity to the electrical switching system 1860 by including an additional battery connected in parallel to a first battery 1810 of an electrical switching system 1860. For example, in some embodiments, an electrical switching system 1860 may comprise a master battery which further comprises an interface, inverter, and one or more line filters, wherein additional batteries may be coupled to the master battery in parallel. In some embodiments, a specific capacity required by a particular home may be met by including batteries connected in parallel to a master battery.

In some embodiments, a repurposed battery may comprise a majority of the sensors required for proper functioning within an electrical switching system 1900 and/or a home system 1800. For example, a repurposed battery for utilization in an electrical switching system 1900 and/or a home system 1800 may only require an aircraft-specific high voltage junction box (HVJB) to be replaced with a home system-specific HVJB. In some embodiments, a repurposed battery for utilization in an electrical switching system 1900 and/or a home system 1800 may only require a positive battery connector, a negative battery connector, and a 5× cell monitoring unit (CMU) connector.

In some embodiments, a common HVJB may be implemented in the battery from an initial build of the battery for its primary use. In such embodiments, the common HVJB may remove the requirement to replace the HVJB with a home system-specific HVJB prior to a secondary use of the battery. Due to the excess processing and/or storage capacity required for aircraft batteries, such batteries may also have the capacity to be pre-loaded to be configured with home system compatibility and/or functionality during its initial build.

Figure 20:
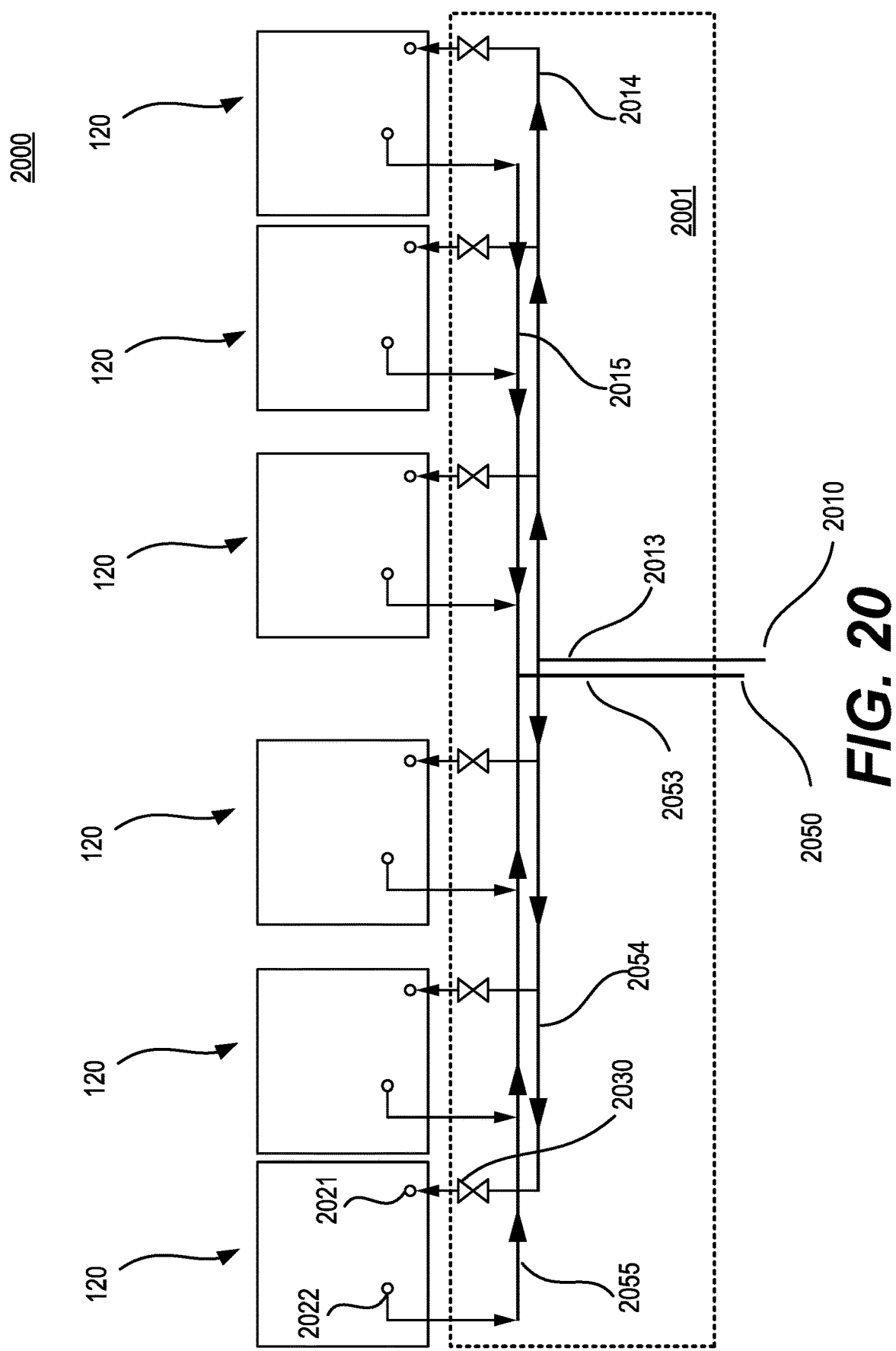
FIG. 20 is a schematic diagram of a cooling system for the battery cooling in the HV cooling distribution subsystem, consistent with some embodiments of the present disclosure.

FIG. 20 is a schematic diagram of a cooling system 2000 for the battery cooling in the HV cooling distribution subsystem, consistent with some embodiments of the present disclosure. As discussed above, the aircraft 100 may include, e.g., six battery packs 120. Each battery pack 120 may include an inlet and outlet for circulating coolant in the heat exchanger assembly of the battery pack 120 to achieve the battery cooling. In FIG. 20, a coolant line architecture providing coolant inlet and outlet ports are proposed to circulate coolant in parallel to the six battery packs 120 installed inside the wing of the aircraft 100 to minimize both dry and wet weight of the cooling system, similar to the embodiments of FIGS. 16-17 discussed above.

In the embodiments of FIG. 20, a cooling system 2000 may include heat exchanger assemblies corresponding to each of the battery packs 120, and a fluid conveyance assembly 2001 coupled to the heat exchanger assemblies. Each heat exchanger assembly may include a first heat exchanger inlet-outlet 2021 and a second heat exchanger inlet-outlet 2022 configured to receive a heat transfer fluid (i.e., coolant) from the fluid conveyance assembly 2001 or discharge the heat transfer fluid to the fluid conveyance assembly 2001. The fluid conveyance assembly 2001 may be configured to circulate the heat transfer fluid in parallel to the heat exchanger assemblies of battery packs 120 in a Dual U-flow scheme.

For example, a Dual U-flow scheme may comprise a first main inlet-outlet 2010 leading to a first trunk path 2013, and a second main inlet-outlet 2050 leading to a second trunk path 2053. The first and second trunk paths may each branch off at, e.g., a central location of aircraft 100 into a first U-flow loop serving a first set of battery packs 120 in a first wing of aircraft 100, and a second U-flow loop serving a second set of battery packs 120 in a second wing of aircraft 100. First trunk path 2013 and second trunk path 2053 may each divide into branches. For example, first trunk path 2013 may divide into a first branch 2014 and a third branch 2015. Second trunk path 2053 may divide into a second branch 2054 and a fourth branch 2055. In some embodiments, to ensure symmetrical flow characteristics in forward and reverse flow directions, first trunk path 2013 and second trunk path 2053 may have a substantially equal lengths, first branch 2014 and second branch 2054 may have a substantially equal lengths, or third branch 2015 and fourth branch 2055 may have a substantially equal lengths As illustrated by arrows in FIG. 20, first trunk path 2013 is being operated as an inlet trunk path, and first and third branches 2014 and 2015 are being operated as inlet paths of their respective U-flow loops. Likewise, second trunk path 2053 is being operated as an outlet trunk path, and second and fourth branches 2054 and 2055 are being operated as outlet paths of their respective U-flow loops. However, in some embodiments, as discussed above with respect to FIGS. 16A-17, cooling system 2000 may be configured as a symmetrical system capable of circulating coolant flow in either direction, such that either sets of trunk paths and branches may be used as inlet or outlet lines.

By providing coolant flow in alternating directions during successive circulation periods, cooling efficiency or uniformity may be improved. For example, in given cooling operation, a flow direction may be reversed once or a plurality of times. For instance, a flow direction may be changed midway through a cooling cycle, or at some other regular or irregular intervals. In some embodiments, coolant may flow predominantly in one direction, while being periodically interrupted by a reciprocating flow. An external coolant supply may be configured to control such flow direction changes by way of, e.g., operation of a pump, a flow-exchanging valve, etc.

The first and second main inlet-outlets of conveyance assembly 2001 may be arranged together at a same location of aircraft 100. For example, first and second main inlet-outlets may be located at, e.g., a top, bottom or side of a fuselage of aircraft 100, or in a wing. For example, a location at the top of a fuselage, such as between or behind the wings, may provide the closest proximity to battery packs 120, thus advantageously reducing a total hose length. However, a location at the sides or bottom of the fuselage may allow for easier connection access. In some embodiments, when providing the first and second main inlet-outlets at an asymmetric location, such as at one side of the fuselage, the inlet trunk path and outlet trunk path may nevertheless be configured to maintain substantially equal lengths before splitting off into first and second U-flow loops. For example, the first and second trunk paths path may terminate into their respective branches at a central location of aircraft 100. In this way, symmetrical flow path lengths may be preserved while providing an asymmetric connection to an external coolant supply. The first and second main inlet-outlets may be configured as a singular connection port so that an external coolant supply may provide balanced coolant flow to all battery packs of aircraft 100 simultaneously by a single connection, as discussed above.

In some embodiments, as discussed above, customized flow restrictors 2030 may be respectively arranged between a branch and one of the first heat exchanger inlet-outlet 2021 or second heat exchanger inlet-outlet 2022. Flow restrictors 2030 may be configured to balance the heat transfer fluid flowing into the heat exchanger assemblies of battery packs 120 as discussed above.

In some embodiments, by way of example, the flow rate of the coolant system may be designed to be about 30 liters per minute (LPM) within each U-flow loop. Thus for a configuration in which each U-flow loop serves three battery packs 120, the flow rate may be about 10 liters per minute for each battery pack 120. However, the present disclosure is not limited thereto. In general, the flow rate through each battery pack 120 may deviate from the average among all battery packs 120 by no more than, e.g., 5%, 2%, 1%, 0.5% or less, as discussed above . . . .

Figure 21A:
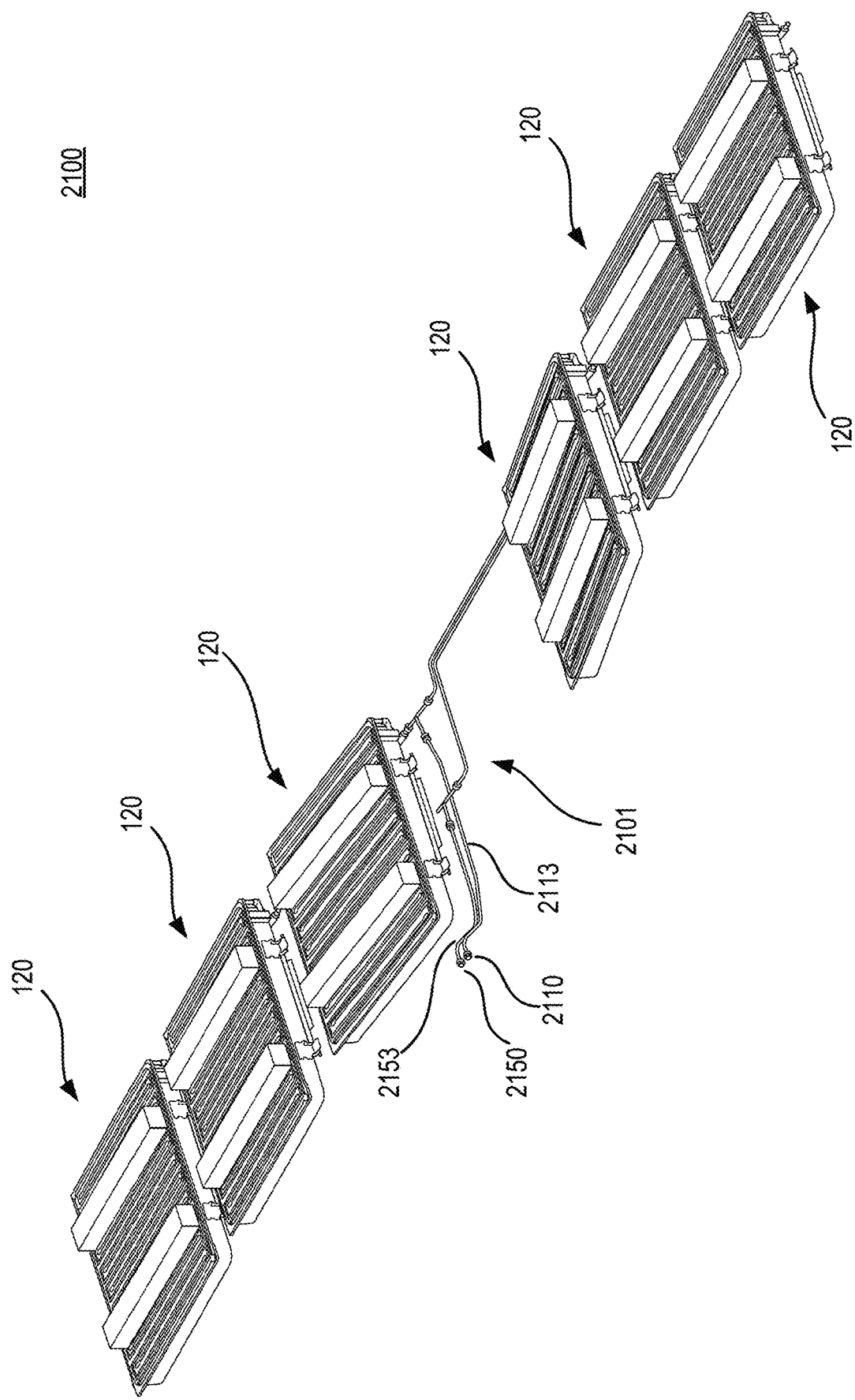
FIGS. 21A-21E illustrate an example design of the cooling system, consistent with some embodiments of the present disclosure.

FIGS. 21A and B illustrate an example design of a cooling system 2100, consistent with some embodiments of the present disclosure. Cooling system 2100 may correspond to, e.g., cooling system 2000 of FIG. 20. As shown in FIG. 21A, a fluid conveyance assembly 2101 may provide battery coolant to each battery pack 120 respectively. Fluid conveyance assembly may comprise a first main inlet-outlet 2110 and first trunk path 2113, and a second main inlet-outlet 2150 and second trunk path 2153. The first and second trunk paths 2113 and 2153 may divide into first, second, third and fourth branches respectively, as discussed above. As shown in FIG. 21A, the first and second main inlet-outlets of the fluid conveyance assembly 2101 may be located at, e.g., on top of the fuselage at a center part of the wingspan of aircraft 100 to achieve a more balanced cooling distribution, with three battery packs 120 located at one side, and three battery packs 120 located at the other side. Alternatively or additionally, as discussed above, first and second main inlet-outlets may be located at, e.g., one side of the fuselage or in one wing.

Figure 21B:
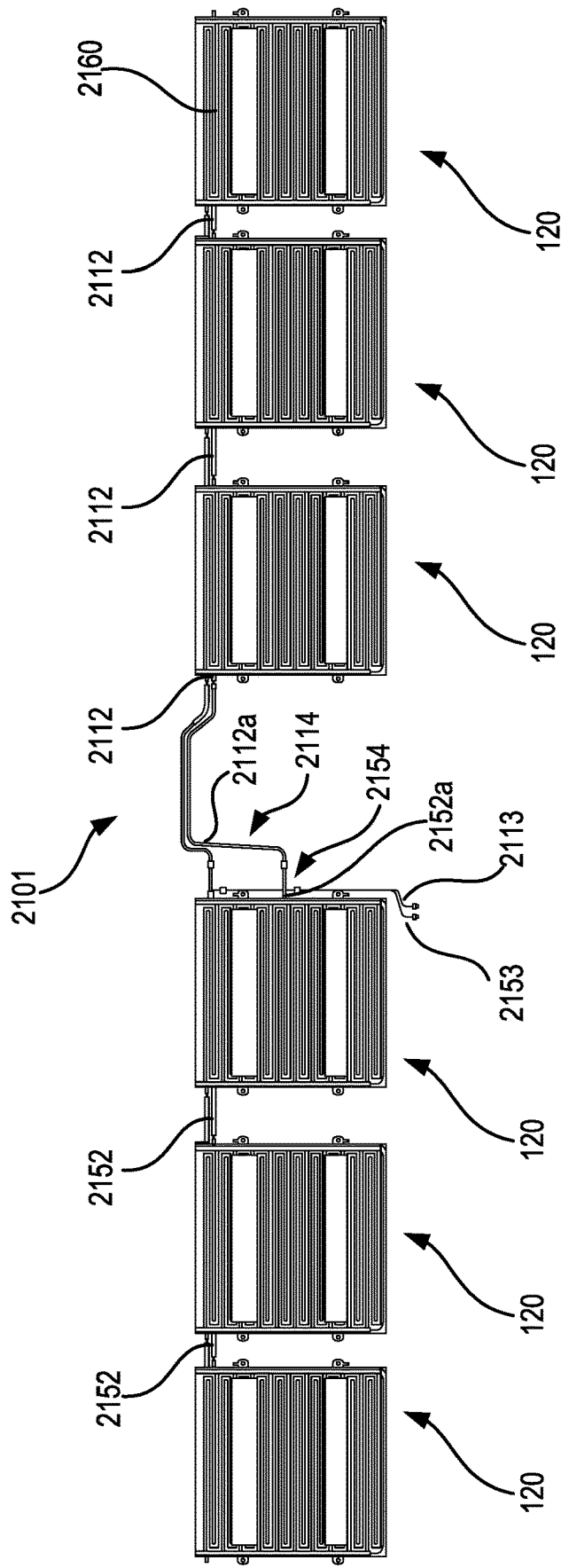
Figure 21C:
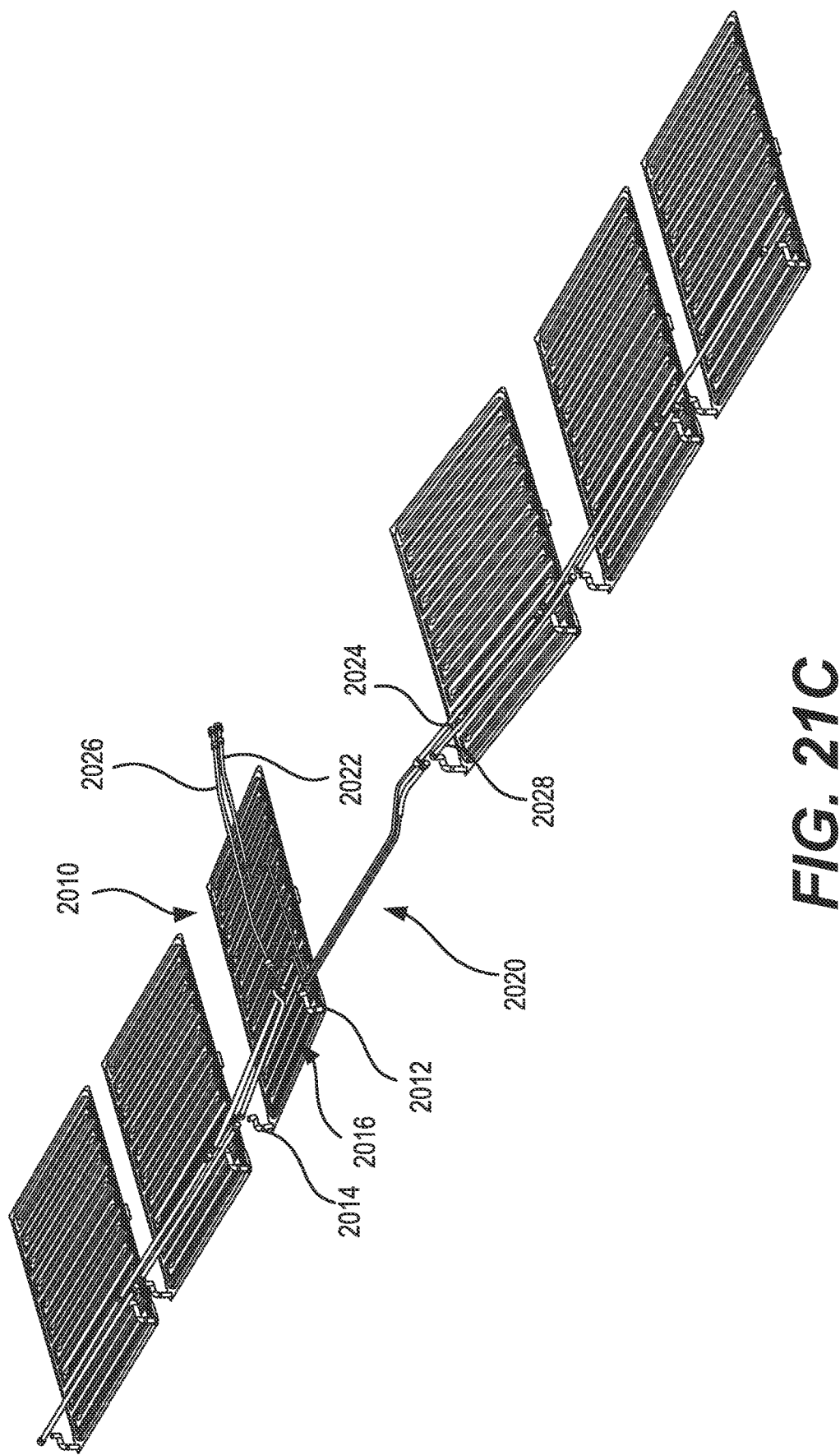
Figure 21D:
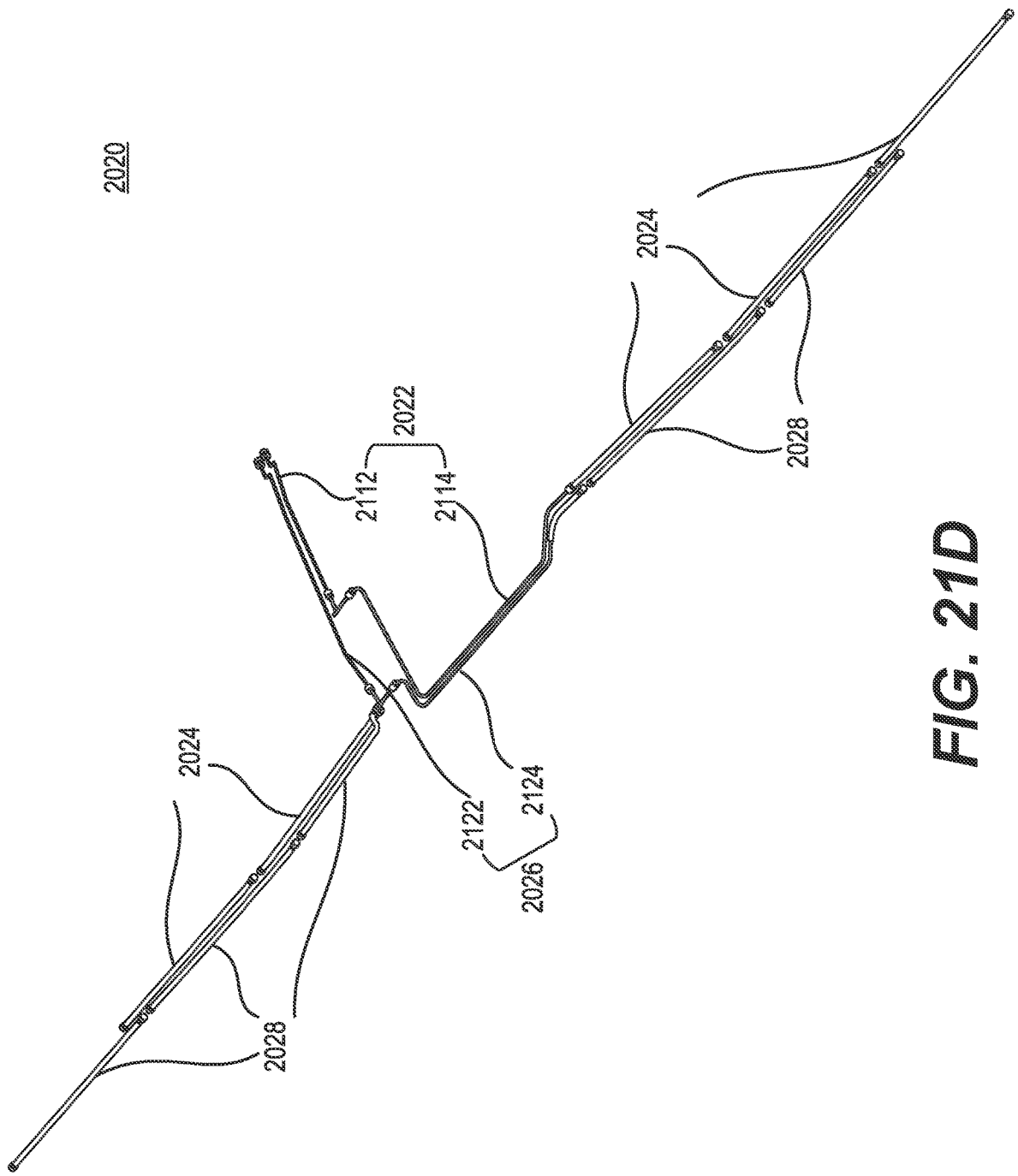
Figure 21E:
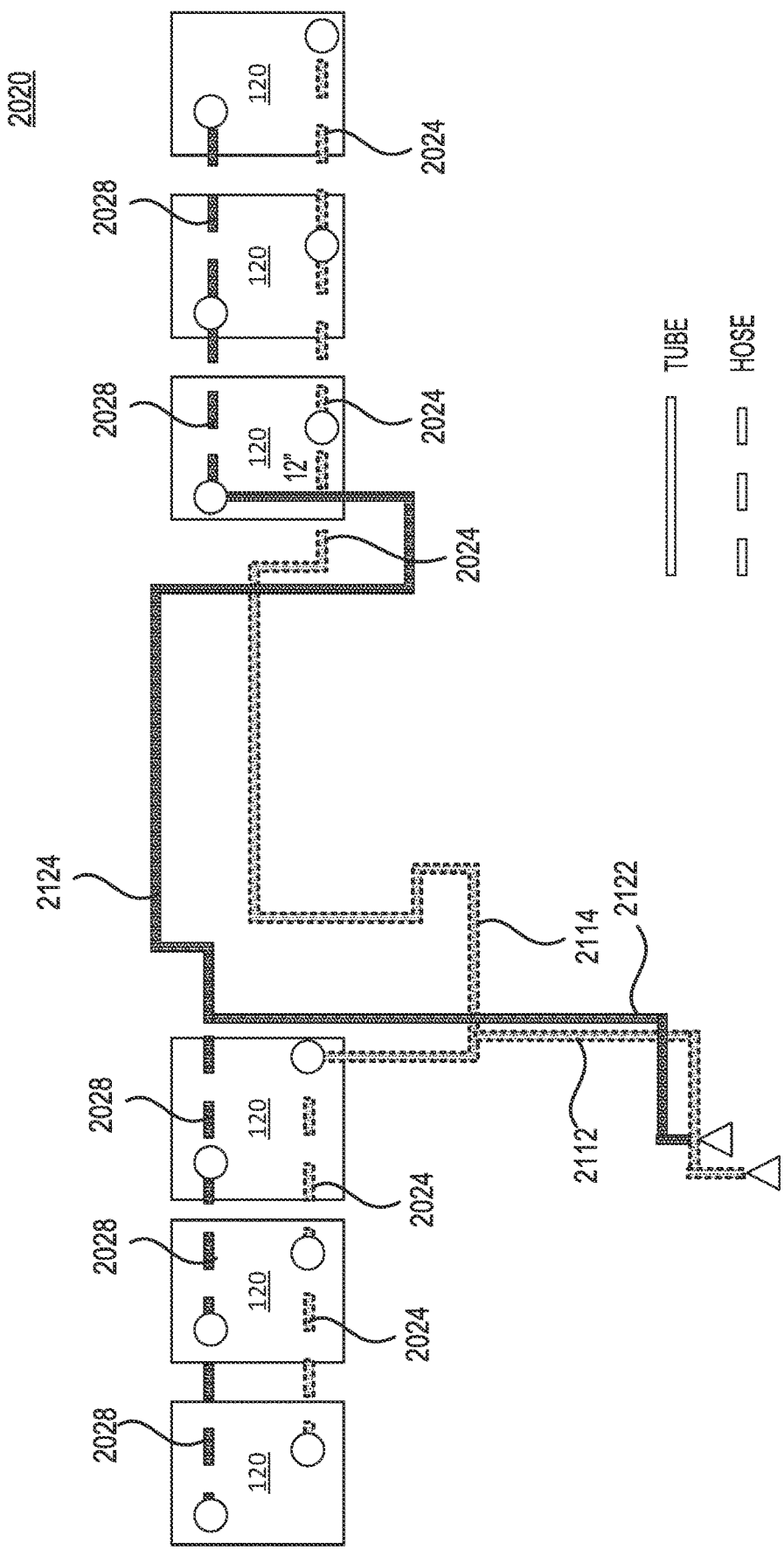

FIG. 21B illustrates a further view of the cooling system 2100, consistent with embodiments of the present disclosure. The view of FIG. 21B may be considered a top plan view of FIG. 21A showing cooling system 2101. FIG. 21B, details various conduit sections of fluid conveyance system 2101 and their connections to heat exchangers 2160. Here, heat exchangers are omitted from a first U-flow loop at the bottom of the figure for clarity. Flow path segments 2112 of first branch 2114 from first trunk path 2113 may connect to, e.g., first heat exchanger inlet-outlets, optionally via customized flow restrictors (not shown). Similarly, flow path segments 2152 of second branch 2154 from second trunk path 2153 may connect to, e.g., second heat exchanger inlet-outlets. In some embodiments conduit portions of fluid conveyance assembly 2101 may comprise various materials. For instance, as shown in FIG. 21B, first trunk path 2113 and second trunk path 2153 may comprise a rigid tubing material, such as, e.g., aluminum or another strong, lightweight material. Additionally, a first segment 2112a of first branch 2114 any be made of the same or a similar material. Subsequent segments 2112 may be made of a different material such as, e.g., a flexible hose. Similarly, a second segment 2152a of second branch 2154 any be made of the same or a similar material. Subsequent segments 2152 may be made of a different material such as, e.g., a flexible hose. Configuring downstream segments of the branches in fluid conveyance assembly may allow for easier installation, maintenance and replacement. In some embodiments, other materials may be used. For example, instead of rigid tubing, channels may be formed integrally in a body of aircraft 100. Instead of hoses, for example, polyethylene or other semi-rigid tubing be provided. In some embodiments, all conduits of a fluid conveyance assembly may be formed of a same material.

Figure 22A:
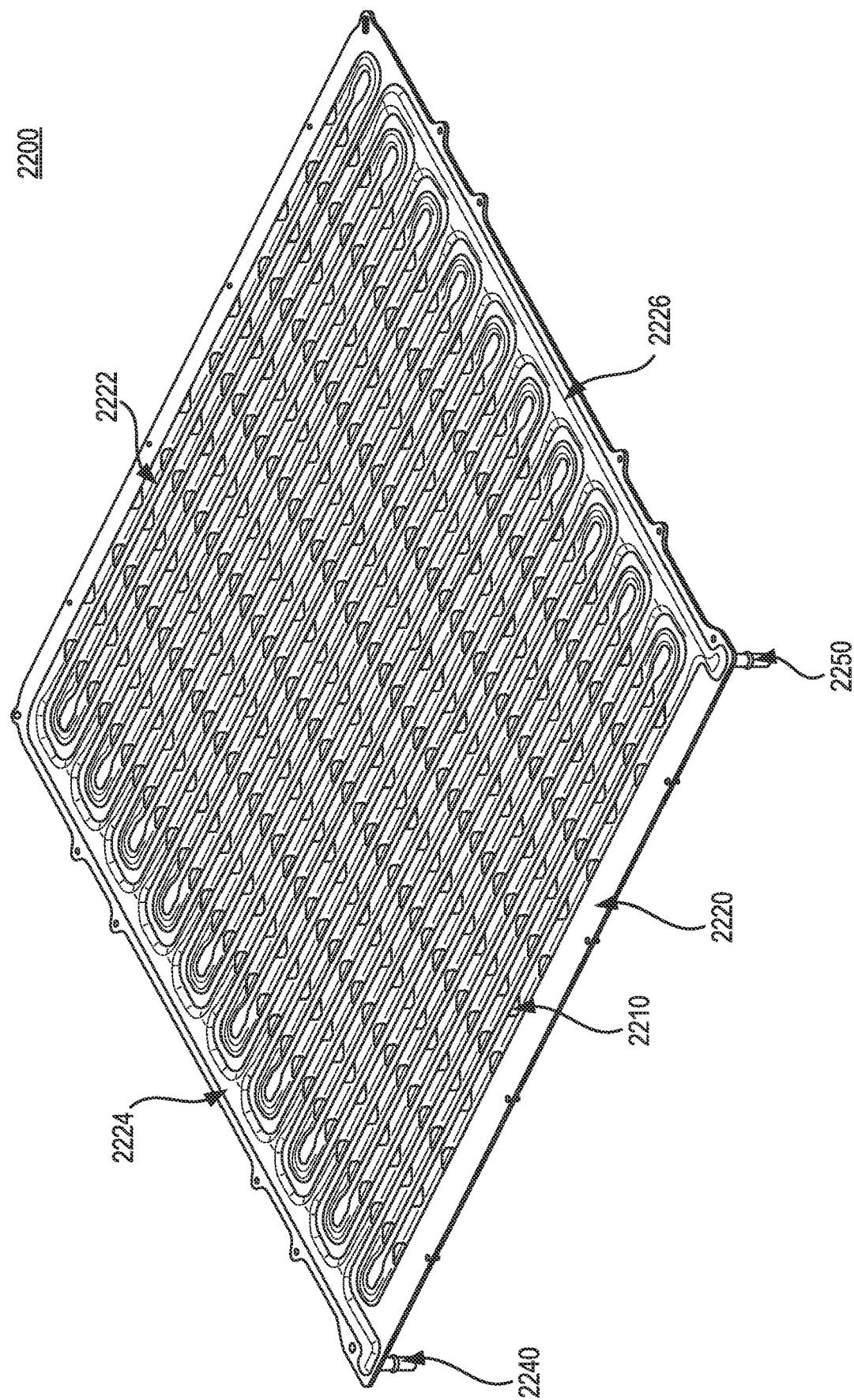
FIG. 22A illustrates an exemplary heat exchanger assembly for the battery cooling in the HV cooling distribution subsystem, consistent with some embodiments of the present disclosure.
Figure 22B:
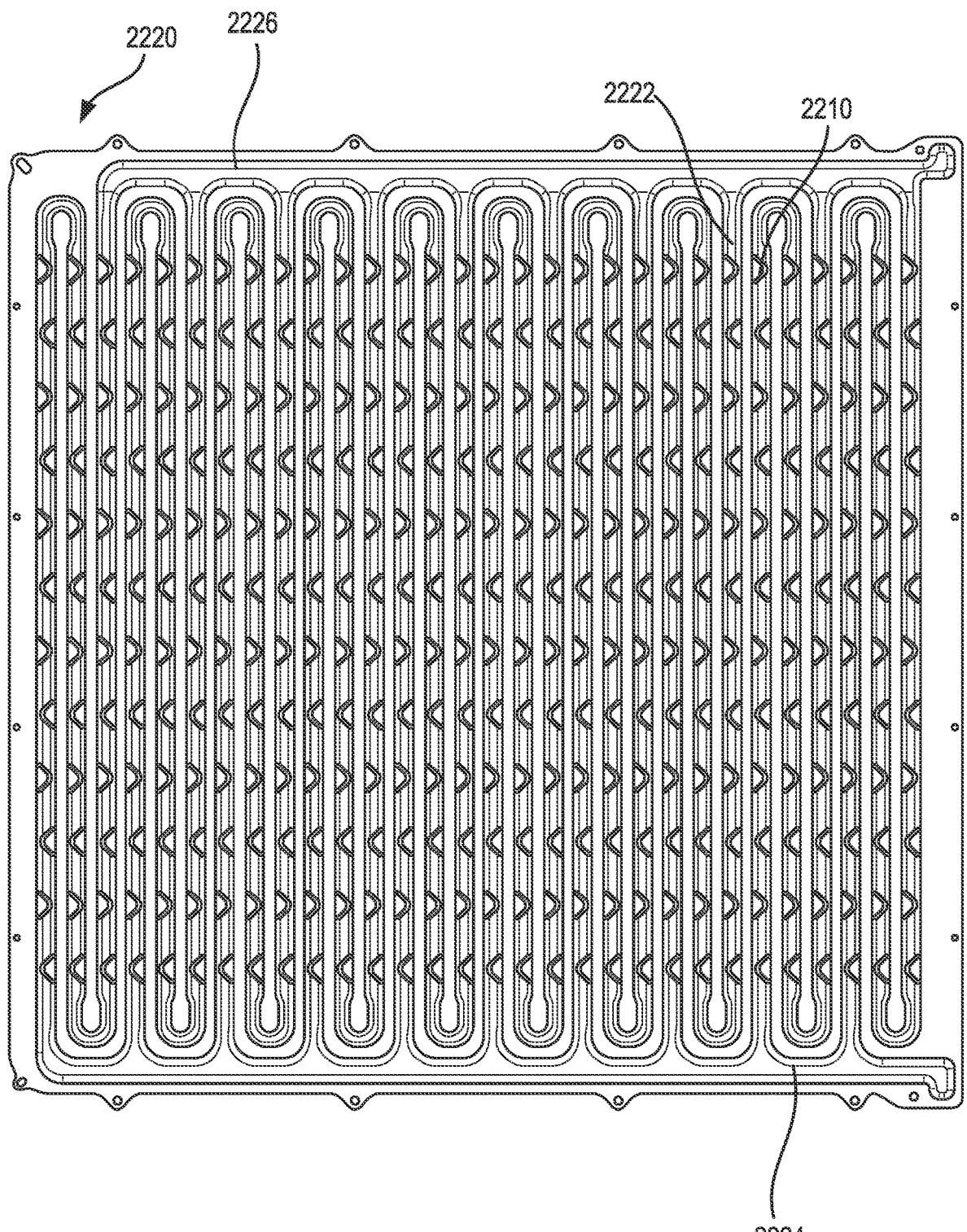
FIG. 22B is a top view of the heat exchanger assembly shown in FIG. 22A, consistent with some embodiments of the present disclosure.

FIG. 22A illustrates an exemplary heat exchanger assembly 2200 for the battery cooling in the HV cooling distribution subsystem, consistent with some embodiments of the present disclosure. FIG. 22B is a top view of the heat exchanger assembly 2200 shown in FIG. 22A, consistent with some embodiments of the present disclosure. The design of the heat exchanger assembly 2200 shown in FIG. 22A and FIG. 22B may provide cooling from the bottom of a plurality of battery cells in a battery pack 120. Heat exchanger assembly 2200 may have a construction and dimensions configured to minimize the dry and wet weight of the battery pack 120. In the embodiments of FIG. 22A and FIG. 22B, the heat exchanger assembly 2200 may be embedded in the thermal management system and ensure maximum cooling capacity without exceeding a desired overall system pressure limit (e.g., below 100 psi), eliminating the need for special or customized connectors. In addition, by minimizing the cell-to-cell thermal gradient, this design may also extend the battery life of the battery pack 120.

In particular, in the heat exchanger assembly 2200, a plurality dimples 2210 are incorporated on a heat exchanger plate (i.e., cooling plate) 2220 to act as turbulators for improving the heat transfer efficiency of the heat exchanger assembly 2200. For example, dimples 2210 may comprise shaped indentations within the cooling channels 2222 of heat exchanger assembly 2200 configured to create calculated distortions within an interior volume to disrupt laminar coolant flow, causing a more even distribution of surface contact between coolant molecules and the interior walls of the cooling channels. In some embodiments, the heat exchanger plate 2220 may be hydro-formed and laser-welded. Dimples 2210 may be, e.g., created in the hydro-forming process or subsequently imprinted. The heat exchanger plate 2220 may be, e.g., an aluminum plate or another lightweight, strong, thermally conductive material that is suitable for cost-effective fabrication. This approach can enable feasible mass production and effective quality control.

Specifically, the heat exchanger plate 2220 may include a plurality of cooling channels 2222, a first manifold channel 2224, and a second manifold channel 2226. The first manifold channel 2224 may be coupled to a first heat exchanger inlet-outlet 2240 for receiving or discharging the heat transfer fluid (i.e., coolant), and the second manifold channel 2226 may be coupled to a second heat exchanger inlet-outlet 2250 for receiving or discharging the heat transfer fluid. The plurality of cooling channels 2222 may be coupled between the first manifold channel 2224 and the second manifold channel 2226, and arranged to allow the heat transfer fluid to flow through the cooling channels 2222.

Each cooling channel 2222 may include a plurality of dimples 2210 configured to provide a turbulent flow of the heat transfer fluid through the cooling channel 2222. The arrangement of dimples 2210 may be configured to serve the particular needs of, e.g., electric aircraft. For example, it may be desirable that dimples 2210 be symmetrical in both shape and arrangement along a flow direction so that their heat transfer characteristics are identical in either flow direction. This may improve the performance of the two-flow-direction cooling operations discussed above.

Further, while dimples 2210 may be configured to introduces localized turbulence in the coolant flow without excessive disruption of laminar flow. For example, if the dimples 2210 excessively separate the coolant flow on the rear side of dimples 2210, this may degrade the overall cooling efficiency and uniformity. It may further make purging of the cooling channels more difficult, which may be desired for electric aircraft in some embodiments to minimize weight. However, it is undesirable to have a fully turbulent flow in the cooling channels, as the resulting pressure drop would make it difficult or infeasible, or even impossible to achieve the high coolant flow rates that may be desired in some embodiments (such as e.g., 100 or 200 liters per minute). Finally, it is desirable to produce a dimple geometry that achieves such advantages while being cost efficient to manufacture.

Therefore, in some embodiments, dimples 2210 may be arranged in a staggered fashion to improve heat transfer and achieve optimal flow characteristics, as illustrated with respect to FIGS. 24A-B. This may provide significant advantages over dimples that are centrally located in a cooling channel. For example, centrally located dimples placed periodically along the length of the channel may cause excessive flow separation at a low pitch (as seen for the dimple arrangement 2401 on the left of FIG. 24A) as compared to a higher pitch (as seen for the dimple arrangement 2402 on the right of FIG. 24A). By staggering the dimples on opposite sides of the channel (as seen for the dimple arrangement 2403 on the right of FIG. 24B), the coolant may follow a serpentine path that does not cause excessive flow separation even for a similarly pitched dimple configuration as dimple arrangement 2401. For example, the dimples may be configured to produce a turbulating coolant flow, in which each dimple introduces localized turbulence in otherwise laminar flow on downstream side of the dimple, without changing the flow entirely out of the laminar regime or entirely into the turbulent regime. In some embodiments, the channels may be configured to produce a flow with a Reynolds number (based on the non-dimpled channel hydraulic diameter) of, e.g., between 100 to 2000.

Furthermore, dimples 2210 may advantageously be configured with flow-symmetric geometries. For example, staggered semicircular shapes may provide desired flow characteristics. Furthermore, dimples 2210 may have substantially flat, forward-sloped faces as viewed in either flow direction within cooling channels 2222. For example, in some embodiments, dimples 2210 may comprise a triangular or trapezoidal shape. Dimples 2210 may be indented from a top side of heat exchanger plate 2220, into a top surface of cooling channels 2222 when viewed in their installed orientation. This may help to minimize the adherence of coolant droplets during a purge and allow for cost-effective fabrication. Further, dimples 2210 in each cooling channel 2222 may be arranged in a staggered or laterally alternating manner. For example, in some embodiments, as further illustrated with respect to FIGS. 23A-B below, any two adjacent dimples may be indented from laterally opposite sides of the top (or bottom) surface of cooling channels to achieve a serpentine, turbulating flow without causing excessive flow separation as discussed above. Alternatively or additionally, the dimples may be indented from, e.g., the sides of cooling channels.

In some embodiments, the cooling channels 2222 arranged in the heat exchanger assembly 2200 may have a relatively small channel height compared to a channel width when viewed in the installed orientation. For example, if the cooling channel height were about, e.g., 1.5 mm, the channel width may be about 18.2 mm. In such a case, the manifold sections (e.g., manifold channels 2224 and 2226), may have a channel height of about 5 mm and a channel width of about 25 mm. In other words, a height of the first manifold channel 2224 or the second manifold channel 2226 may be greater than the height of the cooling channels 2222. The channel heights may be designed to minimize both the dry and wet weight of the heat exchanger assembly 2200, and allow for the option of purging and refilling the coolant as needed during a ground service of the aircraft 100.

In the heat exchanger assembly 2200, the triangular-shaped dimples 2210 are added to enhance the heat transfer efficiency and minimize the thermal gradient in the battery pack 120. As those skilled in the art would understand, in different embodiments, the triangular-shaped dimples 2210 may be formed by using various manufacturing methods.

In the present embodiments, the heat exchanger assembly 2200 may provide symmetric inlet-outlet ports 2240 and 2250 for receiving and returning coolant respectively. That is, heat exchanger inlet-outlet ports 2240 and 2250 may be configured to receive the heat transfer fluid or discharge the heat transfer fluid. Specifically, the symmetric design on the heat exchanger inlet-outlets 2240 and 2250 of the heat exchanger assembly 2200 can enable the implementation of a reversing flow strategy as discussed above. For example, the direction of the coolant flow may be reversed as needed by, e.g., switching the inlet and outlet, by operation of an external pump, or by way of a flow exchanging valve. For example, the heat exchanger plate 2220 may be configured to receive the heat transfer fluid from the first heat exchanger inlet-outlet 2240 and discharge the heat transfer fluid to the second heat exchanger inlet-outlet 2250 in a first operating period, and to receive the heat transfer fluid from the second heat exchanger inlet-outlet 2250 and discharge the heat transfer fluid to the first heat exchanger inlet-outlet 2240 in a second operating period before or after the first operating period.

Figure 22C:
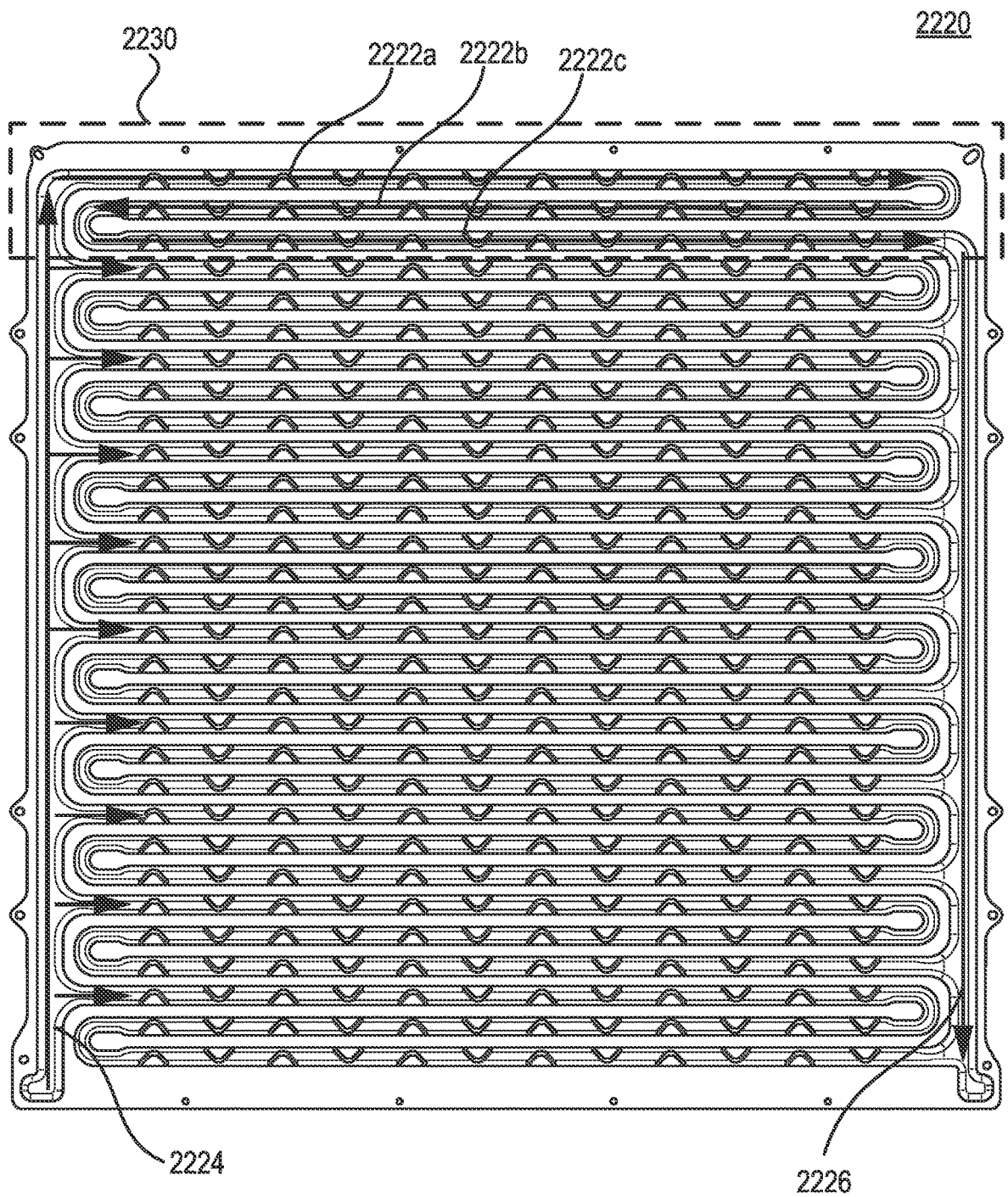
FIG. 22C illustrates exemplary coolant flow paths within the heat exchanger assembly, consistent with some embodiments of the present disclosure.

FIG. 22C illustrates exemplary coolant flow paths within the heat exchanger assembly 2200 for the battery cooling in the HV cooling distribution subsystem, consistent with some embodiments of the present disclosure. As shown in FIG. 22C and consistent with the embodiments of FIG. 22A and FIG. 22B above, for example, the heat exchanger assembly 2200 may apply a "10P3S" or similar topology. Such a topology may include 10 cooling units (e.g., cooling units 2230) connected in parallel, with each cooling unit comprising 3 longitudinal cooling channel runs (e.g., cooling channels 2222a, 2222b, and 2222c) connected in series to form an "S-curve" shape.

In other words, the heat exchanger plate 2220 may be configured to organize the cooling channels (e.g., cooling channels 2222a, 2222b, and 2222c) into cooling units 2230. The cooling units 2230 may be coupled in parallel between the first manifold channel 2224 and the second manifold channel 2226 such that cooling fluid will be distributed substantially evenly among the ten distinct cooling unit pathways, with each subdivision of cooling fluid passing through all three cooling channels 2222a, 2222b, and 2222c of their respective cooling unit 2230. In some embodiments, other related topologies may be applied such as, e.g. 6P6S, 7P5S, etc. In general, heat exchanger assembly 2220 may comprise a plurality of cooling units arranged in parallel between the first manifold channel 2224 and the second manifold channel 2226, each cooling unit comprising an odd number of alternating cooling channel directions in series to achieve an entry and exit at opposing manifold channels.

In some embodiments, a total volume of the coolant within the heat exchanger assembly 2200 (i.e., not including the volume of conduits within the fluid conveyance assembly) may be about 0.7 L. The 10P3S topology may be configured to balance a flow distribution and pressure drop among the parallel cooling channels. In addition, the 3 cooling channels connected in series in the 3S cross-flow design shown in FIGS. 22A-22C can reduce a thermal gradient that occurs when the coolant temperature increases. As shown in FIG. 22C, in a forward flow operation, after the heat exchanger assembly 2200 receives the coolant from the inlet (e.g., heat exchanger inlet-outlet 2240), the coolant flows into a first manifold section (e.g., the first manifold channel 2224), and then is distributed substantially evenly into a plurality of cooling units 2230. Each cooling unit 2230 may include, e.g., 3 cooling channels (e.g., cooling channels 2222a, 2222b, and 2222c) connected in series. The cooling channels within the heat exchanger assembly 2200 may be aligned in parallel to each other. In some embodiments, a center to center distance between two adjacent cooling channels may be, e.g., about 4 mm, 6 mm, 8 mm, 10 mm, 15, mm, 20 mm or more.

As shown in the drawing, in each cooling unit 2230, the flow direction may change when entering the next cooling channel. That is, the heat transfer fluid may flow in opposite directions in any two consecutive cooling channels in the same cooling unit 2230. For example, in the forward flow operation, the coolant within the cooling channels 2222a and 2222c flows toward the right as viewed in FIG. 22C, while the coolant within the cooling channel 2222b flows toward the left. After exiting the last cooling channel 2222c in the cooling unit 2230, the coolant from the 10 cooling units flows into the second manifold section (e.g., the second manifold channel 2226), and exits from the outlet (e.g., heat exchanger inlet-outlet 2250 as seen in FIG. 22A).

On the other hand, in the backward flow operation, the heat exchanger assembly 2200 receives the coolant from the inlet (e.g., heat exchanger inlet-outlet 2250). Then, the coolant flows into the second manifold section (e.g., the second manifold channel 2226), and is distributed into the cooling units 2230 in parallel. The coolant within the cooling channels 2222a and 2222c in each cooling unit 2230 flows toward the left, while the coolant within the cooling channel 2222b in each cooling unit 2230 flows toward the right. After exiting the last cooling channel 2222a in the cooling unit 2230, the coolant from all 10 cooling units flows into the first manifold section (e.g., the first manifold channel 2224), and exits from the outlet (e.g., heat exchanger inlet-outlet 2240 as seen in FIG. 22A).

Figure 23A:
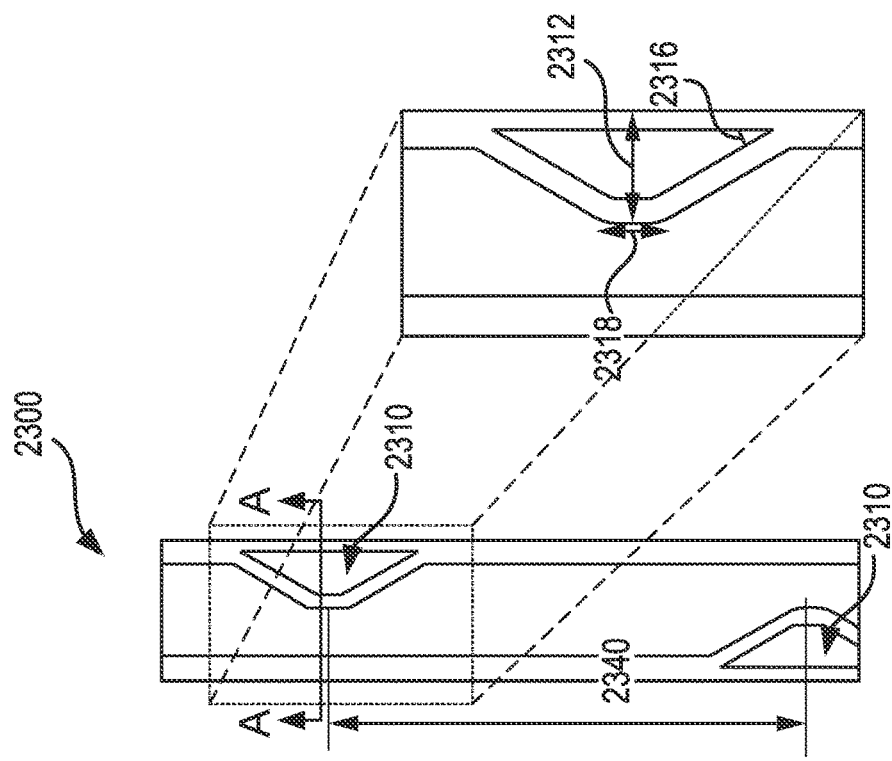
FIG. 23A is a diagram illustrating an enlarged portion of a cooling channel in the heat exchanger assembly, consistent with some embodiments of the present disclosure.
Figure 23B:
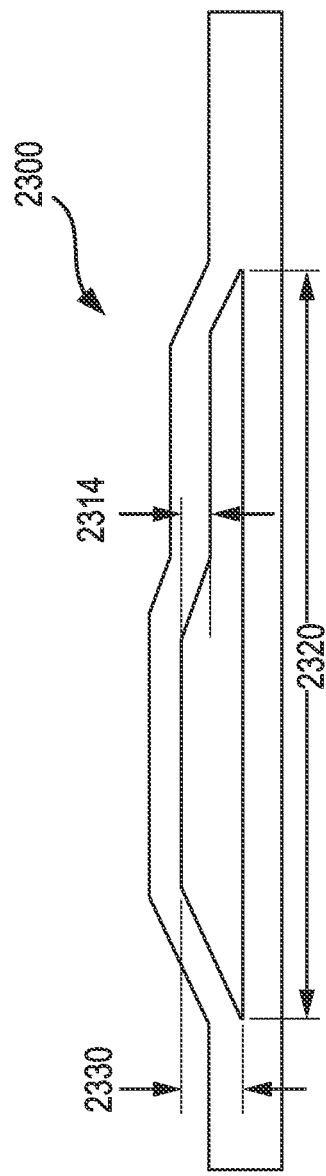
FIG. 23B is a diagram illustrating a cross-sectional view along a line A-A of FIG. 23A, consistent with some embodiments of the present disclosure.

FIG. 23A is a diagram illustrating an enlarged portion of a cooling channel 2300 in the heat exchanger assembly 2200 of FIG. 22A, consistent with some embodiments of the present disclosure. FIG. 23B is a diagram illustrating a cross-sectional view along the line A-A of FIG. 23A, consistent with some embodiments of the present disclosure. As shown in FIG. 23A and FIG. 23B, multiple triangular-shaped dimples 2310 are arranged in a staggered manner, in which two adjacent dimples 2310 are indented from a top surface of cooling channel 2300 and arranged at opposite lateral sides. In various embodiments, the dimensions of the cooling channel 2300 and the dimples 2310 can be designed to accommodate a particular implementation of embodiments of the present disclosure based on actual needs to optimize the overall heat transfer efficiency.

For example, the design parameters affecting the coolant flow characteristics, and thus the heat transfer characteristics, in cooling channel 2300 may include dimensional parameters such as a width 2320 of the cooling channel 2300, a height 2330 of the cooling channel 2300, a distance 2340 between two adjacent dimples 2310 (e.g., the distance between the apexes of two adjacent dimples 2310), a width 2312 of the dimple 2310, a height 2314 of the dimple 2310, a base angle of the dimple 2316 between a sidewall of the cooling channel and a substantially flat, forward-sloped face of the dimple, a length 2318 of the apex region of the dimple 2310, etc. The optimal values for such parameters may depend upon properties of the applied coolant such as viscosity, heat transfer coefficient, pressure, flow rate, etc. In some embodiments, the dimensions (e.g., the width 2312, the height 2314, the length 2318, etc.) of the dimples 2310 may also be expressed by using non-dimensional ratios based on the dimensions of the cooling channel 2300, including the width 2320 and the height 2330.

The cooling architectures disclosed in various embodiments of the present disclosure may provide several beneficial advantages and is suitable for cooling distribution systems for eVTOL aircrafts. For example, the proposed design reduces the mass of the heat exchanger assembly, as well as the required fluid mass in the cooling system. The design with improved flatness can also simplify the manufacturing process accordingly, enhance the overall thermal performance, and meet key cell thermal requirements, such as a low temperature thermal gradient across each pack and a desired maximum temperature for safety and performance reasons.

Embodiments of the present disclosure may be further described by the following clauses:

1. A cooling system for an electric aircraft, comprising:
    a plurality of heat exchanger assemblies corresponding to a plurality of battery packs included in an electric aircraft, each heat exchanger assembly comprising a first heat exchanger inlet-outlet and a second heat exchanger inlet-outlet configured to receive a heat transfer fluid or discharge the heat transfer fluid; and
    a fluid conveyance assembly coupled to the heat exchanger assemblies and comprising a first main inlet-outlet and a second main inlet-outlet, and configured to circulate the heat transfer fluid in parallel to the heat exchanger assemblies, the first main inlet-outlet and a second main inlet-outlet being arranged at a same location of the electric aircraft, the fluid conveyance assembly further comprising:
    a plurality of conduit segments configured to balance the heat transfer fluid flowing into each of the heat exchanger assemblies.

2. The cooling system of clause 1, wherein the plurality of conduit segments comprises a plurality of flow restrictors configured to balance the heat transfer fluid flowing into each of the heat exchanger assemblies.

3. The cooling system of clause 2, wherein each of the plurality of flow restrictors comprises a sizing orifice configured to ensure a substantially equal inlet pressure at each heat exchanger assembly to achieve an even flow distribution of the heat transfer fluid.

4. The cooling system of clause 1, wherein each of the plurality of conduit segments comprises a different inside diameter configured to balance the heat transfer fluid flowing into each of the plurality of heat exchanger assemblies.

5. The cooling system of clause 1, wherein each heat exchanger assembly further comprises:
    a heat exchanger plate comprising:
        a first manifold channel coupled to the first heat exchanger inlet-outlet;
        a second manifold channel coupled to the second heat exchanger inlet-outlet; and 6. The cooling system of clause 5, further comprising:
    a plurality of cooling channels coupled between the first manifold channel and the second manifold channel and arranged to allow the heat transfer fluid to flow through the cooling channels, wherein each cooling channel comprises a plurality of dimples configured to provide a turbulating flow of the heat transfer fluid through the cooling channel, each of the plurality of dimples comprising a symmetric geometry.

7. The cooling system of clause 5, wherein the symmetric geometry comprises a first substantially flat, forward-sloped face as viewed in a first flow direction of the heat transfer fluid, and a second substantially flat, forward-sloped face as viewed in a second flow direction of the heat transfer fluid opposite the first flow direction.

8. The cooling system of clause 5, wherein the symmetric geometry comprises one of a triangular shape or a trapezoidal shape.

9. The cooling system of clause 5, wherein the heat exchanger plate is configured to organize the plurality of cooling channels into a plurality of cooling units, and the plurality of cooling units are coupled in parallel between the first manifold channel and the second manifold channel.

10. The cooling system of clause 5, wherein the heat exchanger plate is configured to receive the heat transfer fluid from the first heat exchanger inlet-outlet and discharge the heat transfer fluid to the second heat exchanger inlet-outlet in a first operating period, and to receive the heat transfer fluid from the second heat exchanger inlet-outlet and discharge the heat transfer fluid to the first heat exchanger inlet-outlet in a second operating period before or after the first operating period.

11. The cooling system of clause 5, wherein the heat exchanger plate comprises aluminum.

12. The cooling system of clause 5, wherein the plurality of dimples in each cooling channel are arranged in a staggered manner such that adjacent dimples in a flow direction are extended from opposite sides of the cooling channels.

13. The cooling system of clause 12, wherein the adjacent dimples in the flow direction are indented from laterally opposite sides of top or bottom surfaces of the cooling channels.

14. The cooling system of clause 12, wherein the adjacent dimples in the flow direction are indented from laterally opposite side surfaces of the cooling channels.

15. The cooling system of clause 1, wherein the heat transfer fluid comprises ethylene glycol water (EGW), ethylene glycol, polyethylene glycol, water, or any combinations thereof.

16. The cooling system of clause 1, wherein the plurality of conduit segments of the fluid conveyance assembly further comprises:
    a first tube and a plurality of first hoses coupled to the first tube; and
    a second tube and a plurality of second hoses coupled to the second tube.

17. The cooling system of clause 16, wherein the first tube comprises a first trunk path leading from the first main inlet-outlet, and the plurality of first hoses comprises a first branch coupled to the first trunk path; and the second tube comprises a second trunk path leading from the second main inlet-outlet, and the plurality of second hoses comprises a second branch coupled to the second trunk path.

18. The cooling system of clause 17, wherein a plurality of flow restrictors are coupled to the first hoses or the second hoses.

19. The cooling system of clause 16, wherein the first tube and the second tube comprise aluminum.

20. The cooling system of clause 1, wherein the first main inlet-outlet and the second main inlet-outlet are located at a top side of the electric aircraft.

21. The cooling system of clause 1, wherein the fluid conveyance assembly further comprises:
    a first trunk path leading from the first main inlet-outlet to a first branch and third branch; and
    a second trunk path leading from the second main inlet-outlet to a second branch and fourth branch, wherein
    the first trunk path and the second trunk path are substantially equal in length.

22. The cooling system of clause 21, wherein the first main inlet-outlet and the second main inlet-outlet are located closer to the first branch than to the second branch.

23. A power supply system for an aircraft, comprising:
    a plurality of battery packs configured to be installed within a wing portion of the aircraft, wherein each battery pack is configured to be connected to an electric engine of the aircraft to provide power;
    a plurality of heat exchanger assemblies respectively connected to battery pack enclosures of the plurality of battery packs; and
    a fluid conveyance assembly coupled to the plurality of heat exchanger assemblies and configured to circulate a heat transfer fluid to the heat exchanger assemblies;
    wherein each heat exchanger assembly comprises a first heat exchanger inlet-outlet and a second heat exchanger inlet-outlet configured to receive or discharge the heat transfer fluid, and a heat exchanger plate comprising a plurality of dimples configured to provide a turbulating flow of the heat transfer fluid,
    wherein each of the plurality of dimples comprises a symmetric geometry having a first substantially flat, forward-sloped face as viewed in a first flow direction of the heat transfer fluid, and a second substantially flat, forward-sloped face as viewed in a second flow direction of the heat transfer fluid opposite the first flow direction.

24. The power supply system of clause 23, wherein the heat exchanger plate comprises;
    a first manifold channel coupled to the first heat exchanger inlet-outlet;
    a second manifold channel coupled to the second heat exchanger inlet-outlet; and
    a plurality of cooling channels coupled between the first manifold channel and the second manifold channel and arranged to allow the heat transfer fluid to flow through the cooling channels.

25. The power supply system of clause 24, wherein each cooling channel comprises the plurality of dimples configured to provide the turbulating flow of the heat transfer fluid through the cooling channel.

26. The power supply system of clause 24, wherein the heat exchanger plate is configured to organize the plurality of cooling channels into a plurality of cooling units, and the plurality of cooling units are coupled in parallel between the first manifold channel and the second manifold channel.

27. The power supply system of clause 24, wherein each cooling channel comprises the plurality of dimples arranged in a staggered manner such that adjacent dimples in the first flow direction or the second flow direction are extended from opposite sides of the cooling channel.

28. The cooling system of clause 27, wherein the adjacent dimples in the first flow direction or the second flow direction are indented from laterally opposite sides of top or bottom surfaces of the cooling channels.

29. The power supply system of clause 27, wherein the adjacent dimples in the first flow direction or the second flow direction are indented from laterally opposite side surfaces of the cooling channels.

30. The power supply system of clause 24, wherein the heat exchanger plate is configured to receive the heat transfer fluid from the first heat exchanger inlet-outlet and discharge the heat transfer fluid to the second heat exchanger inlet-outlet in a first operating period, and to receive the heat transfer fluid from the second heat exchanger inlet-outlet and discharge the heat transfer fluid to the first heat exchanger inlet-outlet in a second operating period before or after the first operating period.

31. The power supply system of clause 24, wherein a height of the first manifold channel and the second manifold channel is greater than a height of the cooling channels.

32. The power supply system of clause 23, wherein the heat exchanger plate comprises aluminum.

33. A method for battery cooling, comprising:
    circulating, by a fluid conveyance assembly, a heat transfer fluid to a plurality of heat exchanger assemblies corresponding to a plurality of battery packs included in an electric aircraft, wherein each heat exchanger assembly comprises a first heat exchanger inlet-outlet and a second heat exchanger inlet-outlet configured to receive or discharge the heat transfer fluid, and a heat exchanger plate; and
    providing a turbulating flow of the heat transfer fluid through cooling channels of the heat exchanger plate by a plurality of dimples, wherein the plurality of dimples in the cooling channels are arranged in a staggered manner such that adjacent dimples in a flow direction of the cooling channels are extended from opposite sides of the cooling channel;
    wherein operations of circulating the heat transfer fluid comprise;
        in a first operating period, receiving the heat transfer fluid from the first heat exchanger inlet-outlet and discharging the heat transfer fluid to the second heat exchanger inlet-outlet; and
        in a second operating period, receiving the heat transfer fluid from the second heat exchanger inlet-outlet and discharging the heat transfer fluid to the first heat exchanger inlet-outlet.

34. The method of clause 33, wherein the adjacent dimples in the flow direction are indented from laterally opposite sides of top or bottom surfaces of the cooling channels.

35. The method of clause 33, wherein the adjacent dimples in the flow direction are indented from laterally opposite side surfaces of the cooling channels.

36. The method of clause 33, wherein each of the plurality of dimples comprising a symmetric geometry having a first substantially flat, forward-sloped face as viewed in a first flow direction of the heat transfer fluid, and a second substantially flat, forward-sloped face as viewed in a second flow direction of the heat transfer fluid opposite the first flow direction.

37. The method of clause 33, further comprising:
balancing, by a plurality of flow restrictors of the fluid conveyance assembly, the heat transfer fluid flowing into the heat exchanger assemblies.

38. The method of clause 37, wherein balancing the heat transfer fluid flowing into the heat exchanger assemblies comprises:
ensuring, by using sizing orifices, a substantially equal inlet pressure at each heat exchanger assembly for an even flow distribution of the heat transfer fluid.

39. The method of clause 33, further comprising:
balancing, by a plurality of differently sized conduit segments of the fluid conveyance assembly, the heat transfer fluid flowing into the heat exchanger assemblies.

40. The method of clause 33, wherein the heat transfer fluid comprises ethylene glycol water (EGW), ethylene glycol, polyethylene glycol, water, or any combinations thereof.

41. The method of clause 33, wherein the dimples comprise a triangular or trapezoidal shape.

42. An aircraft, comprising:
a plurality of battery packs installed within a wing portion of the aircraft, wherein each battery pack is connected to an electric engine of the aircraft to provide power;
a plurality of heat exchanger assemblies respectively connected to battery pack enclosures of the plurality of battery packs; and
a fluid conveyance assembly coupled to the plurality of heat exchanger assemblies and configured to circulate a heat transfer fluid to the heat exchanger assemblies;
wherein each heat exchanger assembly comprises a first heat exchanger inlet-outlet and a second heat exchanger inlet-outlet configured to receive or discharge the heat transfer fluid, and a heat exchanger plate comprising a plurality of dimples configured to provide a turbulent flow of the heat transfer fluid,
wherein each of the plurality of dimples comprises a symmetric geometry having a first substantially flat, forward-sloped face as viewed in a first flow direction of the heat transfer fluid, and a second substantially flat, forward-sloped face as viewed in a second flow direction of the heat transfer fluid opposite the first flow direction.

43. A power supply system for an aircraft, comprising:
a plurality of battery packs configured to be installed within a wing portion of the aircraft, wherein each battery pack is configured to be connected to an electric engine of the aircraft to provide power;
a plurality of heat exchanger assemblies corresponding to the plurality of battery packs included in an electric aircraft, each heat exchanger assembly comprising a first heat exchanger inlet-outlet and a second heat exchanger inlet-outlet configured to receive a heat transfer fluid or discharge the heat transfer fluid; and
a fluid conveyance assembly coupled to the heat exchanger assemblies and comprising a first main inlet-outlet and a second main inlet-outlet, and configured to circulate the heat transfer fluid in parallel to the heat exchanger assemblies, the first main inlet-outlet and a second main inlet-outlet being arranged at a same location of the electric aircraft, the fluid conveyance assembly further comprising:
a plurality of conduit segments configured to balance the heat transfer fluid flowing into each of the heat exchanger assemblies.

44. A power supply system for an aircraft, comprising:
a plurality of battery packs configured to be installed within a wing portion of the aircraft, wherein each battery pack is configured to be connected to an electric engine of the aircraft to provide power;
a plurality of heat exchanger assemblies respectively connected to battery pack enclosures of the plurality of battery packs, each heat exchanger assembly comprising a cooling channel; and
a fluid conveyance assembly coupled to the plurality of heat exchanger assemblies and configured to circulate a heat transfer fluid through the cooling channels in the heat exchanger assemblies;
wherein each cooling channel comprises a plurality of dimples arranged in a staggered manner such that adjacent dimples in a flow direction of the cooling channels are extended from opposite sides of the cooling channels.

45. The power supply system of clause 44, wherein the adjacent dimples in the flow direction are indented from laterally opposite sides of top or bottom surfaces of the cooling channels.

46. The power supply system of clause 44, wherein the adjacent dimples in the flow direction are indented from laterally opposite side surfaces of the cooling channels.

47. The power supply system of clause 44, wherein each of the plurality of dimples comprises a symmetric geometry having a substantially flat, forward-sloped face as viewed in the flow direction.

48. The power supply system of clause 47, wherein the dimples comprise a second substantially flat, forward-sloped face as viewed in a direction opposite the first flow direction.

49. The power supply system of clause 44, wherein the dimples comprise a triangular or trapezoidal shape.

50. An aircraft, comprising:
the power supply system of claim 44.

The foregoing description has been presented for purposes of illustration. It is not exhaustive and does not limit the disclosure to the precise forms or embodiments disclosed. Modifications and adaptations of the disclosure will be apparent to those skilled in the art from consideration of the specification and practice of the disclosed embodiments of the disclosures disclosed herein.

What is claimed is:
1. A cooling system for an electric aircraft, comprising:
a plurality of heat exchanger assemblies corresponding to a plurality of battery packs of the electric aircraft, each heat exchanger assembly comprising a first heat exchanger inlet-outlet and a second heat exchanger inlet-outlet configured to receive a heat transfer fluid or discharge the heat transfer fluid; and
a fluid conveyance assembly coupled to the heat exchanger assemblies and comprising a first main inlet-outlet and a second main inlet-outlet, and configured to circulate the heat transfer fluid in parallel to the heat exchanger assemblies, the first main inlet-outlet and a second main inlet-outlet being arranged at a same location of the electric aircraft, the fluid conveyance assembly further comprising:
a plurality of conduit segments configured to passively balance the heat transfer fluid flowing into each of the heat exchanger assemblies,
wherein each heat exchanger assembly comprises a heat exchanger plate configured to receive the heat transfer fluid from the first heat exchanger inlet-outlet and discharge the heat transfer fluid to the second heat exchanger inlet-outlet in a first operating period, and to receive the heat transfer fluid from the second heat exchanger inlet-outlet and discharge the heat transfer fluid to the first heat exchanger inlet-outlet in a second operating period before or after the first operating period.

2. The cooling system of claim 1, wherein the plurality of conduit segments comprises a plurality of fixed flow restrictors configured to balance the heat transfer fluid flowing into each of the heat exchanger assemblies.

3. The cooling system of claim 2, wherein each of the plurality of fixed flow restrictors comprises a sizing orifice configured to ensure an equal inlet pressure at each heat exchanger assembly to achieve an even flow distribution of the heat transfer fluid.

4. The cooling system of claim 1, wherein each of the plurality of conduit segments comprises a different inside diameter configured to balance the heat transfer fluid flowing into each of the plurality of heat exchanger assemblies.

5. The cooling system of claim 1, wherein each heat exchanger plate further comprises:
a first manifold channel coupled to the first heat exchanger inlet-outlet; and
a second manifold channel coupled to the second heat exchanger inlet-outlet.

6. The cooling system of claim 5, further comprising:
a plurality of cooling channels coupled between the first manifold channel and the second manifold channel and arranged to allow the heat transfer fluid to flow through the cooling channels, wherein each cooling channel comprises a plurality of dimples configured to provide a turbulating flow of the heat transfer fluid through the cooling channel, each of the plurality of dimples comprising a symmetric geometry.

7. The cooling system of claim 6, wherein the symmetric geometry comprises a first flat, forward-sloped face as viewed in a first flow direction of the heat transfer fluid, and a second flat, forward-sloped face as viewed in a second flow direction of the heat transfer fluid opposite the first flow direction.

8. The cooling system of claim 6, wherein the symmetric geometry comprises one of a triangular shape or a trapezoidal shape.

9. The cooling system of claim 6, wherein the heat exchanger plate is configured to organize the plurality of cooling channels into a plurality of cooling units, and the plurality of cooling units are coupled in parallel between the first manifold channel and the second manifold channel.

10. The cooling system of claim 1, wherein the heat exchanger plate comprises aluminum.

11. The cooling system of claim 6, wherein the plurality of dimples in each cooling channel are arranged in a staggered manner such that adjacent dimples in a flow direction are extended from opposite sides of the cooling channels.

12. The cooling system of claim 11, wherein the adjacent dimples in the flow direction are indented from laterally opposite sides of top or bottom surfaces of the cooling channels.

13. The cooling system of claim 11, wherein the adjacent dimples in the flow direction are indented from laterally opposite side surfaces of the cooling channels.

14. The cooling system of claim 1, wherein the heat transfer fluid comprises ethylene glycol water (EGW), ethylene glycol, polyethylene glycol, water, or any combinations thereof.

15. The cooling system of claim 1, wherein the plurality of conduit segments of the fluid conveyance assembly further comprises:
a first tube and a plurality of first hoses coupled to the first tube; and
a second tube and a plurality of second hoses coupled to the second tube.

16. The cooling system of claim 15, wherein the first tube comprises a first trunk path leading from the first main inlet-outlet, and the plurality of first hoses comprises a first branch coupled to the first trunk path; and the second tube comprises a second trunk path leading from the second main inlet-outlet, and the plurality of second hoses comprises a second branch coupled to the second trunk path.

17. The cooling system of claim 16, wherein a plurality of fixed flow restrictors are coupled to the first hoses or the second hoses.

18. The cooling system of claim 15, wherein the first tube and the second tube comprise aluminum.

19. The cooling system of claim 1, wherein the first main inlet-outlet and the second main inlet-outlet are located at a top side of the electric aircraft.

20. The cooling system of claim 1, wherein the fluid conveyance assembly further comprises:
a first trunk path leading from the first main inlet-outlet to a first branch and third branch; and
a second trunk path leading from the second main inlet-outlet to a second branch and fourth branch, wherein the first trunk path and the second trunk path are equal in length.

21. The cooling system of claim 20, wherein the first main inlet-outlet and the second main inlet-outlet are located closer to the first branch than to the second branch.

22. A method for battery cooling, comprising:
circulating, by a fluid conveyance assembly, a heat transfer fluid to a plurality of heat exchanger assemblies corresponding to a plurality of battery packs included in an electric aircraft, wherein each heat exchanger assembly comprises a first heat exchanger inlet-outlet and a second heat exchanger inlet-outlet configured to receive or discharge the heat transfer fluid, and a heat exchanger plate; and
providing a turbulating flow of the heat transfer fluid through cooling channels of the heat exchanger plate by a plurality of dimples, wherein the plurality of dimples in the cooling channels are arranged in a staggered manner such that adjacent dimples in a flow direction of the cooling channels are extended from opposite sides of the cooling channel;
wherein operations of circulating the heat transfer fluid comprise;
in a first operating period, receiving the heat transfer fluid from the first heat exchanger inlet-outlet and discharging the heat transfer fluid to the second heat exchanger inlet-outlet; and
in a second operating period, receiving the heat transfer fluid from the second heat exchanger inlet-outlet and discharging the heat transfer fluid to the first heat exchanger inlet-outlet.

23. A power supply system for an aircraft, comprising:
a plurality of battery packs configured to be installed within a wing portion of the aircraft, wherein each battery pack is configured to be connected to an electric engine of the aircraft to provide power;

a plurality of heat exchanger assemblies corresponding to the plurality of battery packs of the aircraft, each heat exchanger assembly comprising a first heat exchanger inlet-outlet and a second heat exchanger inlet-outlet configured to receive a heat transfer fluid or discharge the heat transfer fluid; and a fluid conveyance assembly coupled to the heat exchanger assemblies and comprising a first main inlet-outlet and a second main inlet-outlet, and configured to circulate the heat transfer fluid in parallel to the heat exchanger assemblies, the first main inlet-outlet and a second main inlet-outlet being arranged at a same location of the aircraft, the fluid conveyance assembly further comprising:

a plurality of conduit segments configured to passively balance the heat transfer fluid flowing into each of the heat exchanger assemblies, wherein each heat exchanger assembly comprises a heat exchanger plate configured to receive the heat transfer fluid from the first heat exchanger inlet-outlet and discharge the heat transfer fluid to the second heat exchanger inlet-outlet in a first operating period, and to receive the heat transfer fluid from the second heat exchanger inlet-outlet and discharge the heat transfer fluid to the first heat exchanger inlet-outlet in a second operating period before or after the first operating period.

24. A power supply system for an aircraft, comprising:
a plurality of battery packs configured to be installed within a wing portion of the aircraft, wherein each battery pack is configured to be connected to an electric engine of the aircraft to provide power;

a plurality of heat exchanger assemblies respectively connected to battery pack enclosures of the plurality of battery packs, each heat exchanger assembly comprising a cooling channel; and a fluid conveyance assembly coupled to the plurality of heat exchanger assemblies and configured to circulate a heat transfer fluid through the cooling channels in the heat exchanger assemblies;

wherein each cooling channel comprises a plurality of dimples arranged in a staggered manner such that adjacent dimples in a flow direction of the cooling channels are extended from opposite sides of the cooling channels; and wherein the adjacent dimples in the flow direction are partially indented from laterally opposite sides of top or bottom surfaces of the cooling channels such that a first height of the cooling channels in a region not having a dimple is greater than a second height of the cooling channels in a region having a dimple.

25. The power supply system of claim 24, wherein the adjacent dimples in the flow direction are indented from laterally opposite side surfaces of the cooling channels.

26. The power supply system of claim 24, wherein each of the plurality of dimples comprises a symmetric geometry having a flat, forward-sloped face as viewed in the flow direction.

27. The power supply system of claim 26, wherein the dimples comprise a second flat, forward-sloped face as viewed in a direction opposite the flow direction.

28. The power supply system of claim 24, wherein the dimples comprise a triangular or trapezoidal shape.

29. The method of claim 22, wherein the adjacent dimples in the flow direction are indented from laterally opposite sides of top or bottom surfaces of the cooling channels.

30. The method of claim 22, wherein the adjacent dimples in the flow direction are partially indented from laterally opposite sides of top or bottom surfaces of the cooling channels.

31. The method of claim 22, wherein the adjacent dimples in the flow direction are indented from laterally opposite side surfaces of the cooling channels.

32. The method of claim 22, wherein each of the plurality of dimples comprises a symmetric geometry having a first flat, forward-sloped face as viewed in a first flow direction of the heat transfer fluid, and a second flat, forward-sloped face as viewed in a second flow direction of the heat transfer fluid opposite the first flow direction.

33. The method of claim 22, further comprising:
balancing, by a plurality of flow restrictors of the fluid conveyance assembly, the heat transfer fluid flowing into the heat exchanger assemblies.

34. The method of claim 33, wherein balancing the heat transfer fluid flowing into the heat exchanger assemblies comprises:
ensuring, by using sizing orifices, a equal inlet pressure at each heat exchanger assembly for an even flow distribution of the heat transfer fluid.

35. The method of claim 22, further comprising:
balancing, by a plurality of differently sized conduit segments of the fluid conveyance assembly, the heat transfer fluid flowing into the heat exchanger assemblies.

36. The method of claim 22, wherein the heat transfer fluid comprises ethylene glycol water (EGW), ethylene glycol, polyethylene glycol, water, or any combinations thereof.

37. The method of claim 22, wherein the dimples comprise a triangular or trapezoidal shape.

38. The power supply system of claim 24, wherein the fluid conveyance assembly comprises:
a first main inlet-outlet;
a second main inlet-outlet; and
a plurality of conduit segments configured to passively balance the heat transfer fluid flowing into each of the heat exchanger assemblies,
wherein the first main inlet-outlet and a second main inlet-outlet are arranged at a same location of the electric aircraft.

39. The power supply system of claim 38, wherein the plurality of conduit segments comprises a plurality of fixed flow restrictors configured to balance the heat transfer fluid flowing into each of the heat exchanger assemblies.

40. The power supply system of claim 39, wherein each of the plurality of fixed flow restrictors comprises a sizing orifice configured to ensure an equal inlet pressure at each heat exchanger assembly to achieve an even flow distribution of the heat transfer fluid.

41. The power supply system of claim 38, wherein each of the plurality of conduit segments comprises a different inside diameter configured to balance the heat transfer fluid flowing into each of the plurality of heat exchanger assemblies.

42. The power supply system of claim 24, wherein each heat exchanger assembly further comprises:
a heat exchanger plate, comprising:
a first manifold channel coupled to a first heat exchanger inlet-outlet; and a second manifold channel coupled to a second heat exchanger inlet-outlet.

43. The power supply system of claim 42, wherein the plurality of cooling channels are coupled between the first manifold channel and the second manifold channel.

44. The power supply system of claim 42, wherein the heat exchanger plate is configured to organize the plurality of cooling channels into a plurality of cooling units, and the plurality of cooling units are coupled in parallel between the first manifold channel and the second manifold channel.

45. The power supply system of claim 42, wherein the heat exchanger plate is configured to receive the heat transfer fluid from the first heat exchanger inlet-outlet and discharge the heat transfer fluid to the second heat exchanger inlet-outlet in a first operating period, and to receive the heat transfer fluid from the second heat exchanger inlet-outlet and discharge the heat transfer fluid to the first heat exchanger inlet-outlet in a second operating period before or after the first operating period.

46. The power supply system of claim 42, wherein the heat exchanger plate comprises aluminum.

47. The power supply system of claim 24, wherein the heat transfer fluid comprises ethylene glycol water (EGW), ethylene glycol, polyethylene glycol, water, or any combinations thereof.

48. The power supply system of claim 38, wherein the plurality of conduit segments of the fluid conveyance assembly further comprises:
a first tube and a plurality of first hoses coupled to the first tube; and
a second tube and a plurality of second hoses coupled to the second tube.

49. The power supply system of claim 48, wherein the first tube comprises a first trunk path leading from the first main inlet-outlet, and the plurality of first hoses comprises a first branch coupled to the first trunk path; and the second tube comprises a second trunk path leading from the second main inlet-outlet, and the plurality of second hoses comprises a second branch coupled to the second trunk path.

50. The power supply system of claim 49, wherein a plurality of fixed flow restrictors are coupled to the first hoses or the second hoses.

51. The power supply system of claim 48, wherein the first tube and the second tube comprise aluminum.

52. The power supply system of claim 38, wherein the first main inlet-outlet and the second main inlet-outlet are located at a top side of the aircraft.

53. The power supply system of claim 38, wherein the fluid conveyance assembly further comprises:
a first trunk path leading from the first main inlet-outlet to a first branch and third branch; and
a second trunk path leading from the second main inlet-outlet to a second branch and fourth branch, wherein the first trunk path and the second trunk path are equal in length.

54. The power supply system of claim 53, where the first main inlet-outlet and the second main inlet-outlet are located closer to the first branch than to the second branch.

* * * * *